US008611458B2

(12) United States Patent
Roth et al.

(10) Patent No.: US 8,611,458 B2
(45) Date of Patent: Dec. 17, 2013

(54) ELECTRONIC DEVICE, ELECTRONIC SYSTEM, AND METHOD OF PROVIDING INFORMATION USING THE SAME

(75) Inventors: Erik Roth, Seoul (KR); Jinyung Park, Seoul (KR); Jaehwa Lee, Seoul (KR); Wookjin Chung, Seoul (KR); Stanley Kim, Seoul (KR); Soyoung Han, Seoul (KR); Heeyoung Hwang, Seoul (KR); Jiyeong Ku, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/243,539

(22) Filed: Sep. 23, 2011

(65) Prior Publication Data
US 2012/0019367 A1 Jan. 26, 2012

Related U.S. Application Data

(63) Continuation of application No. 13/023,374, filed on Feb. 8, 2011, which is a continuation-in-part of application No. PCT/KR2010/007101, filed on Oct. 15, 2010.

(60) Provisional application No. 61/365,790, filed on Jul. 20, 2010.

(51) Int. Cl.
*H04B 1/38* (2006.01)

(52) U.S. Cl.
USPC ........... 375/295; 375/146; 375/147; 375/219; 375/316

(58) Field of Classification Search
USPC .......... 375/295, 146, 147, 219, 296; 707/754, 707/783, 821; 725/40; 386/248
See application file for complete search history.

(56) References Cited

U.S. PATENT DOCUMENTS

| 6,725,303 | B1 | 4/2004 | Hoguta et al. | |
|---|---|---|---|---|
| 6,771,290 | B1 | 8/2004 | Hoyle | |
| 6,983,244 | B2 * | 1/2006 | Junqua et al. | 704/231 |
| 7,636,365 | B2 * | 12/2009 | Chang et al. | 370/401 |
| 7,734,148 | B2 * | 6/2010 | Lee | 386/244 |
| 7,996,412 | B2 * | 8/2011 | Bae et al. | 707/754 |
| 8,131,763 | B2 * | 3/2012 | Tuscano et al. | 707/783 |
| 2003/0236770 | A1 | 12/2003 | Kurapati et al. | |
| 2004/0172588 | A1 | 9/2004 | Mattaway | |
| 2005/0030708 | A1 | 2/2005 | Kawasaki et al. | |
| 2005/0091595 | A1 | 4/2005 | Shappell et al. | |
| 2006/0117001 | A1 | 6/2006 | Jung et al. | |

(Continued)

FOREIGN PATENT DOCUMENTS

EP 1835384 A2 9/2007
JP 2004-38283 A 2/2004

(Continued)

*Primary Examiner* — Dhaval Patel
(74) *Attorney, Agent, or Firm* — Birch, Stewart, Kolasch & Birch, LLP

(57) ABSTRACT

There is described an electronic system including a first electronic device and a second electronic device communicating with each other. The first electronic device includes a first output unit, a first communication unit, and a first controller automatically transmitting supplementary information related to multimedia contents to the second electronic device through the first communication unit while playing the multimedia contents through the first output unit. The second electronic device includes a second output unit, a second communication unit, and a second controller outputting supplementary contents, related to the multimedia contents, through the second output unit on the basis of the supplementary information received from the first electronic device.

19 Claims, 72 Drawing Sheets

(56) References Cited

U.S. PATENT DOCUMENTS

| | | |
|---|---|---|
| 2006/0271618 A1 | 11/2006 | Kokubo et al. |
| 2007/0005707 A1 | 1/2007 | Teodosiu et al. |
| 2007/0027926 A1 | 2/2007 | Kinouchi et al. |
| 2007/0050778 A1 | 3/2007 | Lee et al. |
| 2007/0156664 A1 | 7/2007 | Norton et al. |
| 2007/0180396 A1 | 8/2007 | Yajima et al. |
| 2007/0294357 A1 | 12/2007 | Antoine |
| 2008/0082936 A1 | 4/2008 | Helvick |
| 2008/0310510 A1* | 12/2008 | Hiwasa et al. ........... 375/240.16 |
| 2009/0023395 A1 | 1/2009 | Chang et al. |
| 2009/0049380 A1 | 2/2009 | Rehling et al. |
| 2009/0094531 A1 | 4/2009 | Danieli et al. |
| 2009/0157513 A1 | 6/2009 | Bonev et al. |
| 2009/0158170 A1 | 6/2009 | Narayanan et al. |
| 2009/0299960 A1 | 12/2009 | Lineberger |
| 2009/0307168 A1 | 12/2009 | Bockius et al. |
| 2009/0313004 A1 | 12/2009 | Levi et al. |
| 2010/0030578 A1 | 2/2010 | Siddique et al. |
| 2010/0043061 A1 | 2/2010 | Martin et al. |
| 2010/0066698 A1 | 3/2010 | Seo |
| 2010/0088634 A1 | 4/2010 | Tsuruta et al. |
| 2010/0122184 A1 | 5/2010 | Vonog et al. |
| 2010/0138767 A1 | 6/2010 | Want et al. |
| 2010/0169823 A1 | 7/2010 | Audet |
| 2010/0174993 A1 | 7/2010 | Pennington et al. |
| 2010/0241980 A1 | 9/2010 | Sosnosky et al. |
| 2010/0241989 A1 | 9/2010 | Wen |
| 2010/0295992 A1* | 11/2010 | Lee et al. ........................ 348/473 |
| 2010/0299628 A1 | 11/2010 | Har'El et al. |
| 2011/0066957 A1 | 3/2011 | Prats et al. |
| 2011/0113385 A1 | 5/2011 | Sayers et al. |
| 2012/0092253 A1 | 4/2012 | Irani et al. |

FOREIGN PATENT DOCUMENTS

| | | |
|---|---|---|
| JP | 2004-62369 A | 2/2004 |
| JP | 2005-285274 A | 10/2005 |
| JP | 2007-42173 A | 2/2007 |
| JP | 2007-272625 A | 10/2007 |
| JP | 4564488 B2 | 10/2010 |
| KR | 10-2005-0055101 A | 6/2005 |
| KR | 10-2005-0099741 A | 10/2005 |
| KR | 10-2008-0023575 A | 3/2008 |
| KR | 10-2009-0062371 A | 6/2009 |
| KR | 10-2009-0113508 A | 11/2009 |
| KR | 10-2010-0002758 A | 1/2010 |
| WO | WO 2008/048008 A1 | 4/2008 |

* cited by examiner

| Subsupplementary information | Image frame | Play start |
|---|---|---|
| First subsupplementary information | #25 | 02:30 |
| Second subsupplementary information | #50 | 05:05 |
| Third subsupplementary information | #80 | 08:00 |
| Fourth subsupplementary information | #92 | 09:10 |

| Information | Detailed information |
|---|---|
| AA | AA-1, AA-2 |
| BB | BB-1, BB-2, BB-3 |
| CC | CC-1 |
| DD | DD-1, DD-2 |

| Electronic device | User information | Specified supplementary information |
|---|---|---|
| 500 | Father | News |
| 501 | Mother | Shopping, culture |
| 502 | Son | Sports, game |

# ELECTRONIC DEVICE, ELECTRONIC SYSTEM, AND METHOD OF PROVIDING INFORMATION USING THE SAME

CROSS-REFERENCE TO RELATED APPLICATIONS

This application is a Continuation of U.S. Application Serial No. 13/023,374 filed on Feb. 8, 2011, which is a continuation-in-part of PCT International Application No. PCT/KR2010/007101 filed on Oct. 15, 2010, which claims the benefit of U.S. Provisional Patent Application No. 61/365,790, filed on Jul. 20, 2010. The entire contents of each of these applications are hereby incorporated by reference.

BACKGROUND OF THE INVENTION

1. Field of the Invention

This document relates to an electronic device, an electronic system comprising a plurality of electronic devices, and a method of providing information which is capable of providing various pieces of information using the same.

2. Discussion of the Related Art

With the breakthrough development of hardware, software, and contents industry sectors, common consumers have become supplied with various contents through a variety of hardware and software.

Accordingly, a problem that a user can be supplied with a variety of contents how efficiently and can enjoy the contents has emerged as a very important technical issue.

SUMMARY OF THE INVENTION

An aspect of this document is directed to provide an electronic device, an electronic system, and a method of providing information using the same, in which a second electronic device different from a first electronic device can provide supplementary information or supplementary contents or both which are relevant to multimedia contents being output by the first electronic device.

In accordance with a first aspect of this document, there is provided an electronic device, comprising an output unit, a communication unit, and a controller operatively connected to the output unit and the communication unit, the controller configured to automatically transmit supplementary information via a wireless connection to a second electronic device via the communication unit while reproducing multimedia contents via the output unit, wherein the supplementary information is related to one or more items of the multimedia contents.

In accordance with a second aspect of this document, there is provided an electronic device, comprising an output unit, a communication unit configured to wirelessly receive supplementary information from a second electronic device, the supplementary information related to one or more items of multimedia contents being reproduced by the second electronic device, and a controller operatively connected to the output unit and the communication unit, the controller configured to output supplementary contents related to the multimedia contents through the output unit based on the received supplementary information.

In accordance with a third aspect of this document, there is provided an electronic system comprising a first electronic device and a second electronic device which can communicate with each other. The first electronic device comprises a first output unit, a first communication unit, and a first controller operatively connected to the first output unit and the first communication unit, the first controller configured to automatically transmit the supplementary information via a wireless connection to the second electronic device via the first communication unit while reproducing the multimedia contents via the first output unit, wherein the supplementary information is related to one or more items of the multimedia contents. The second electronic device comprises a second output unit, a second communication unit configured to wirelessly receive the supplementary information, and a second controller operatively connected to the second output unit and the second communication unit, the second controller configured to receive the supplementary information from the second communication unit, and output the supplementary contents related to the multimedia contents through the second output unit based on the received supplementary information.

In accordance with a fourth aspect of this document, there is provided a method of controlling an electronic device including an output unit, a communication unit and a controller, the method comprising reproducing multimedia contents via the output unit, automatically transmitting the supplementary information via a wireless connection to a second electronic device via the communication unit while reproducing the multimedia contents via the output unit, wherein the supplementary information is related to one or more items of the multimedia contents.

In accordance with a fifth aspect of this document, there is provided a method of controlling electronic device including an output unit, a communication unit and a controller, the method comprising wirelessly receiving supplementary information from a second electronic device, the supplementary information related to one or more items of multimedia contents being reproduced by the second electronic device, obtaining the supplementary contents related to the multimedia contents based on the supplementary information; and outputting the obtained the supplementary contents through the output unit.

In accordance with a sixth aspect of this document, there is provided a method for controlling an electronic system, the electronic system including a first electronic device and a second electronic device, the first electronic device including a first output unit, a first communication unit and a first controller, the second electronic device including a second output unit, a second communication unit and a second controller, the method comprising reproducing multimedia contents via the first output unit, automatically transmitting, by the first electronic device, the supplementary information via a wireless connection to the second electronic device while reproducing the multimedia contents via the first output unit, wherein the supplementary information is related to one or more items of the multimedia contents, wirelessly receiving, by the second electronic device, the supplementary information, obtaining the supplementary contents related to the multimedia contents based on the supplementary information, and outputting the obtained supplementary contents through the second output unit.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

Figure 1:
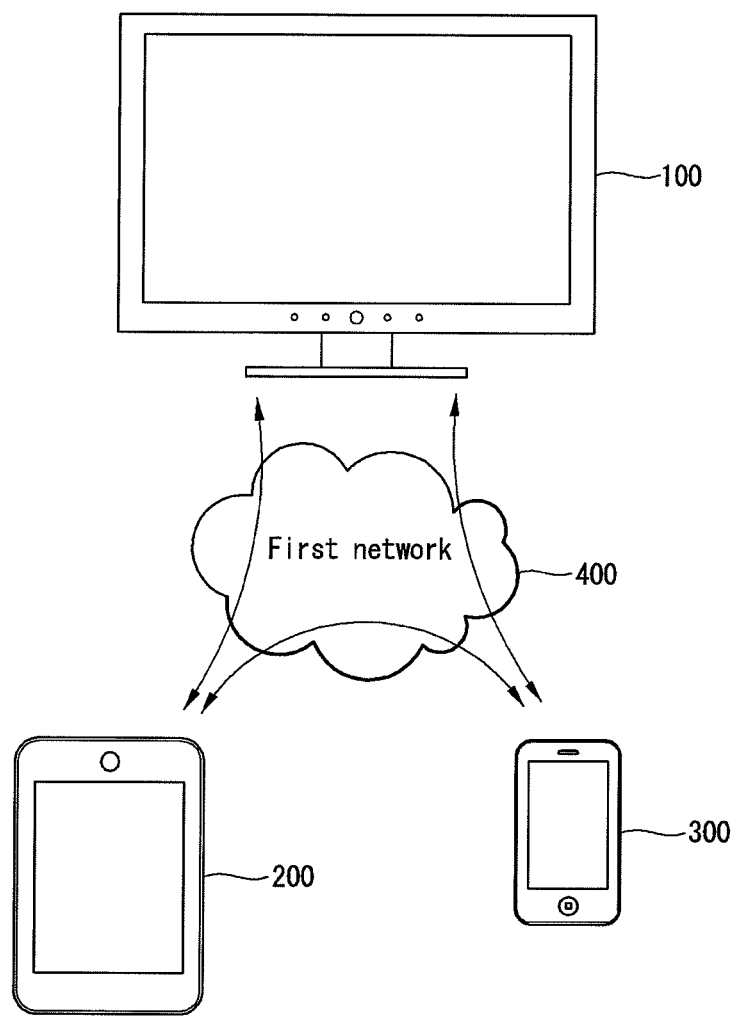
FIG. 1 is a schematic diagram showing a system environment to which an embodiment of this document can be applied.

The above objects, characteristics, and merits of this document will become more apparent from the following detailed description taken in conjunction with the accompanying drawings. However, this document can be modified in various ways and it can have several embodiments. Thus, only specific embodiments are illustrated in the drawings and described in detail. The same reference numerals, in principle, designate the same elements throughout the drawings. Further, a detailed description of the known functions or constructions is omitted if it is deemed to make the gist of this document unnecessarily vague.

Hereinafter, an electronic device and a mobile terminal according to some embodiments of the present invention are described in detail with reference to the accompanying drawings. It is to be noted that the suffixes of elements used in the following description, such as "module" and "unit," are assigned or mixed in use by taking only the easiness of writing this specification into consideration, but are not particularly given importance and roles.

FIG. 1 is a schematic diagram showing a system environment to which an embodiment of this document can be applied.

Referring to FIG. 1, the system environment to which this document is applied can consist of a plurality of electronic devices 100, 200, and 300 and a first network 400 over which the plurality of electronic devices 100, 200, and 300 can communicate with each other.

Although, in FIG. 1, the first electronic device 100, the second electronic device 200, and the third electronic device 300 are illustrated as the plurality of electronic devices, the technical spirit of this document is not limited to the number of the plurality of electronic devices.

For example, the system environment to which this document is applied can comprise at least some of electronic devices (for example, mobile terminals, such as a handheld phone and a Mobile Internet Device (MID)) which are respectively owned by the family members of a house and electronic devices (for example, Digital TV (DTV), a personal computer, and a notebook computer) which are jointly used by a family. Specifically, the first electronic device 100 may be a digital TV, the second electronic device 200 may be a tablet device, and the third electronic device 300 may be a smart telephone.

In this document, it is assumed that the first electronic device 100 is DTV, Internet Protocol TV (IPTV), or a personal computer, the second electronic device 200 is an MID, and the third electronic device 300 is a mobile terminal.

The first network 400 can be based on a variety of communication methods.

For example, the first network 400 can be a network based on WiFi. For another example, the first network 400 can be a network based on a local area communication method. For another example, the first network 400 can be a network based on a mobile communication method. For another example, the first network 400 can be a network based on a mobile Internet according to WiBro/WiMAX.

Figure 2:
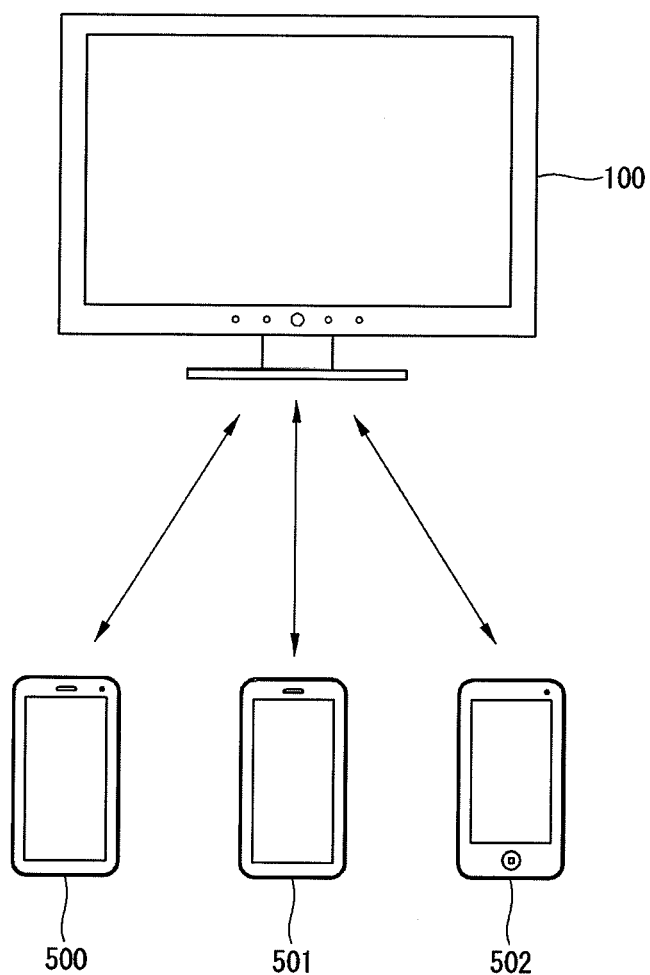
FIGS. 2 and 3 show detailed examples of a system environment to which this document is applied.
Figure 3:
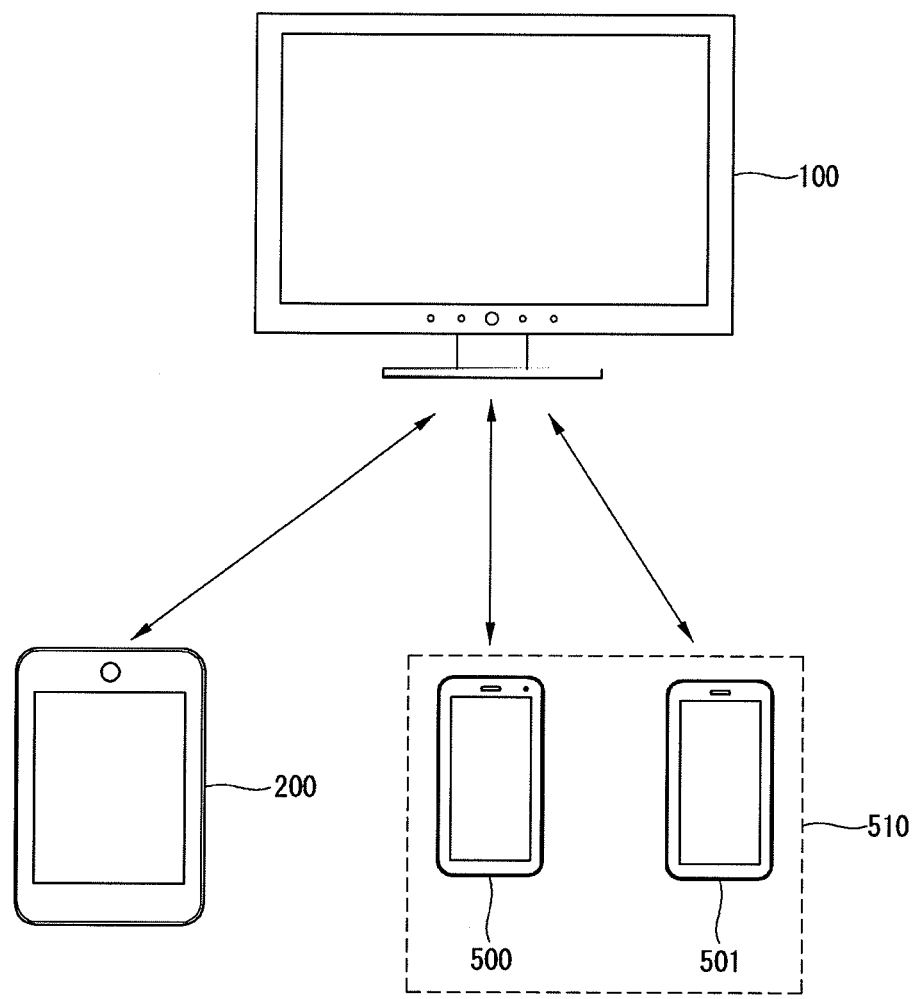

FIGS. 2 and 3 are diagrams showing detailed examples of a system environment to which this document is applied.

For example, referring to FIG. 2, the system environment to which this document is applied can comprise DTV 100 installed in the home and mobile terminals 500, 501, and 502 which are carried by the family members of a house.

The mobile terminals 500, 501, and 502 can be, for example, a father's smart phone 500, a mother's smart phone 501, and a child's smart phone 502.

The system environment composed of the DTV 100 and the mobile terminals 500, 501, and 502 can vary according to the movement of the mobile terminals 500, 501, and 502.

For example, if the child goes out the house with his smart phone 502 carried on, the child's smart phone 502 can be excluded from the system environment. Accordingly, the system environment can consist of the DTV 100, the father's smart phone 500, and the mother's smart phone 501.

For another example, referring to FIG. 3, the system environment to which this document is applied can comprise DTV 100 installed in the home, an MID 200 jointly used by the family members of a house, and mobile terminals 510 carried by the respective family members.

Meanwhile, the plurality of electronic devices described in this document can construct a local network, such as Universal Plug and Play (UPnP) and Digital Living Network Alliance (DLNA).

Figure 4:
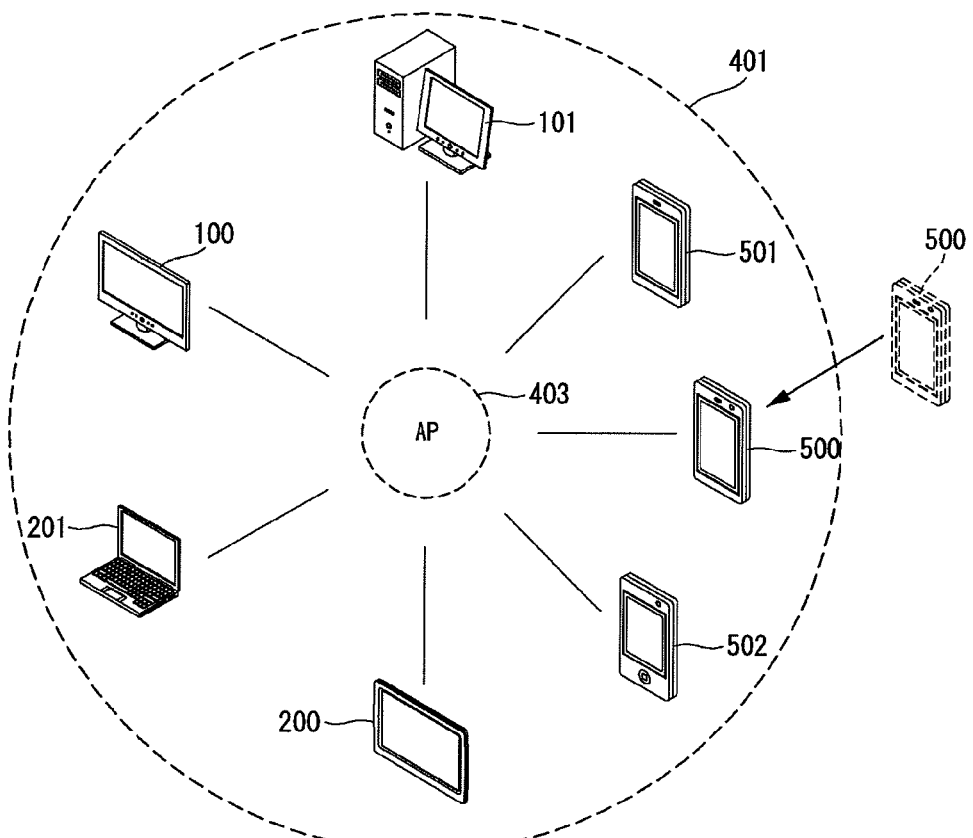
FIGS. 4 and 5 are schematic diagrams of system environments to which another embodiment of this document is applied.
Figure 5:
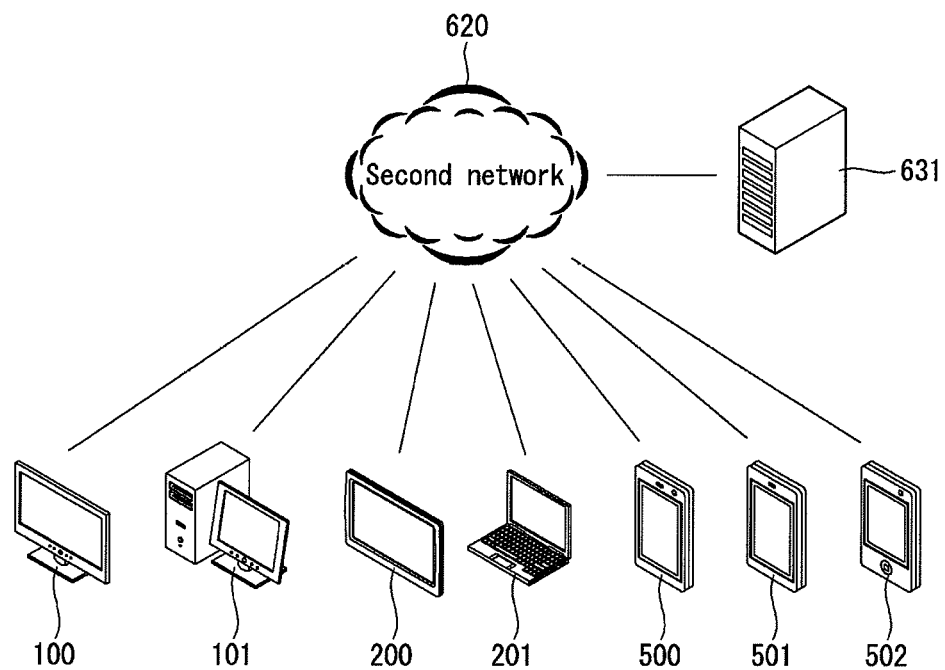

FIGS. 4 and 5 are schematic diagrams of system environments to which another embodiment of this document is applied. FIG. 4 is a diagram showing an example of an UPnP or DLNA network.

Referring to FIGS. 4 and 5, the system environment to which this document is applied can comprise a plurality of electronic devices 100, 101, 200, 201, 500, 501, and 502, a second network 620, and a server 631 existing on the second network 620.

The plurality of electronic devices 100, 101, 200, 201, 500, 501, and 502, as shown in FIG. 4, can construct a local network 401, such as UPnP (Universal Plug and Play) and DLNA (Digital Living Network Alliance).

The plurality of electronic devices 100, 101, 200, 201, 500, 501, and 502, as shown in FIG. 4, can communicate with each other using a wireless or wired communication method.

In this document, a method of the plurality of electronic devices 100, 101, 200, 201, 500, 501, and 502 communicating with each other is not limited to a specific method. The technical spirit of this document can be applied to all the existing wireless communication methods between electronic devices and all communication methods which will appear in the future.

For example, the plurality of electronic devices 100, 101, 200, 201, 500, 501, and 502 can communicate with each other using a communication method, such as UPnP, DLNA, or WiFi.

For another example, the plurality of electronic devices 100, 101, 200, 201, 500, 501, and 502 can communicate with each other using a WiFi communication method through an access point (AP) 403 while forming the DLNA network 401.

For another example, the plurality of electronic devices 100, 101, 200, 201, 500, 501, and 502 can communicate with each other over the local network 401 or using a local area communication method.

Further, as shown in FIG. 5, each of the plurality of electronic devices 100, 101, 200, 201, 500, 501, and 502 can communicate with the second network 620. For example, the plurality of electronic devices 100, 101, 200, 201, 500, 501, and 502 can receive multimedia contents from the server 631 existing on the second network 620.

The second network 620 can be, for example, a mobile communication network, a wired Internet, a wireless Internet, or a broadcasting network.

The plurality of electronic devices 100, 101, 200, 201, 500, 501, and 502 can be a fixed terminal or a mobile terminal.

As described above, the plurality of electronic devices 100, 101, 200, 201, 500, 501, and 502 can include, for example, a handheld phone, a smart phone, a computer, a notebook computer, a laptop computer, a terminal for digital broadcasting, personal digital assistants (PDA), a portable multimedia player (PMP), a navigator, and an MID (Mobile Internet Device).

Hereinafter, the network 401 according to DLNA is described as an example of interoperability between the plurality of electronic devices 100, 101, 200, 201, 500, 501, and 502 and the sharing of contents therebetween with reference to FIGS. 6 and 7.

Figure 6:
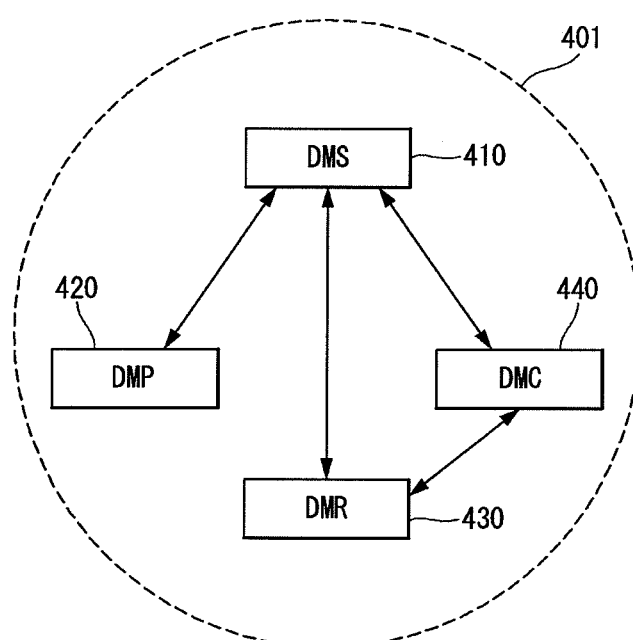
FIG. 6 is a conceptual diagram of a DLNA (Digital Living Network Alliance) network.

FIG. 6 is a conceptual diagram of a DLNA (Digital Living Network Alliance) network.

The DLNA is an organization for standardization which enables contents, such as music, motion images, and still images, to be shared between electronic devices over a network.

The DLNA is based on an UPnP (Universal Plug and Play) protocol.

The DLNA network 401 can comprise a digital media server (hereinafter referred to as a 'DMS') 410, a digital media player (hereinafter referred to as a 'DMP') 420, a digital media renderer (hereinafter referred to as a 'DMR') 430, and a digital media controller (hereinafter referred to as a 'DMC') 440.

The DLNA network 401 can comprise one or more of the DMSs 410, one or more of the DMPs 420, one or more of the DMRs 430, and one or more of the DMCs 440. Here, the DLNA can provide standards so that the devices can be interoperable with each other. Further, the DLNA network 401 can provide standards for interoperability between the DMS 410, the DMP 420, the DMR 430, and the DMC 440.

The DMS 410 can provide digital media contents. That is, the DMS 410 can store and manage contents. The DMS 410 can receive various commands from the DMC 440 and execute the received commands. For example, when a play command is received, the DMS 410 can search for contents to be played and provide corresponding contents to the DMR 430. The DMS 410 can comprise, for example, a PC, a personal video recorder (PVR), and a set top box.

The DMP 420 can control contents or an electronic device and can control contents so that the contents are played. The DMP 420 can perform the functions of the DMR 430 for playing contents and of the DMC 440 for controlling another electronic device. The DMP 420 can comprise, for example, TV, DTV, and a home theater.

The DMR 430 can play contents received from the DMS 410 and contents supplied from the DMS 410. The DMR 430 can comprise, for example, a digital photo frame, a computer, and an MID.

The DMC 440 can provide a control function of controlling the DMS 410, the DMP 420, and the DMR 430. The DMC 440 can comprise, for example, a computer, a handheld phone, and a PDA.

Further, the DLNA network 401 can consist of the DMS 410, the DMR 430, and the DMC 440, or the DMP 420 and the DMR 430.

Further, the DMS 410, the DMP 420, the DMR 430, and the DMC 440 can be terms which functionally classify electronic devices. For example, in case where a handheld phone has not only a control function, but also a play function, the handheld phone can correspond to the DMP 420. In case where the DTV 100 stores and manages contents, the DTV 100 may correspond to not only the DMP 420, but also the DMS 410.

For example, the plurality of electronic devices 100, 101, 200, 201, 500, 501, and 502 shown in FIGS. 4 and 5 can construct the DLNA network 401 while performing a function corresponding to at least any one of the DMS 410, the DMP 420, the DMR 430, and the DMC 440.

Figure 7:
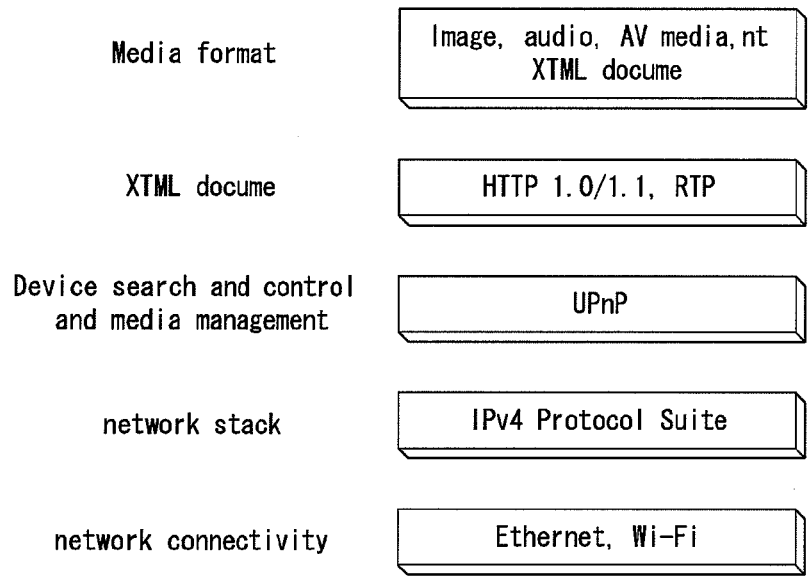
FIG. 7 shows function components according to a DLNA network.

FIG. 7 shows functional components according to a DLNA network.

The function components according to the DLNA network can comprise a media formats layer, a media transport layer, a device discovery & control and media management layer, a network stack layer, and a network connectivity layer.

The network connectivity layer can comprise the physical layer and the link layer of a network. The network connectivity layer can comprise Ethernet, WiFi, and Bluetooth. In addition, a communication medium which enables IP access can be used.

The network stack layer can use an IPv4 protocol.

The device discovery & control and media management layer can be based on UPnP, particularly, an UPnP AV Architecture and an UPnP Device Architecture. For example, for device discovery purposes, a simple service discovery protocol (SSDP) can be used. Further, for control purposes, a simple object access protocol (SOAP) can be used.

The media transport layer can use HTTP1.0/1.1. or a realtime transport protocol (RTP) for streaming play purposes.

The media formats layer can use images, audio, AV media, and XHTML (Extensible Hypertext Markup Language) documents.

Figure 8:
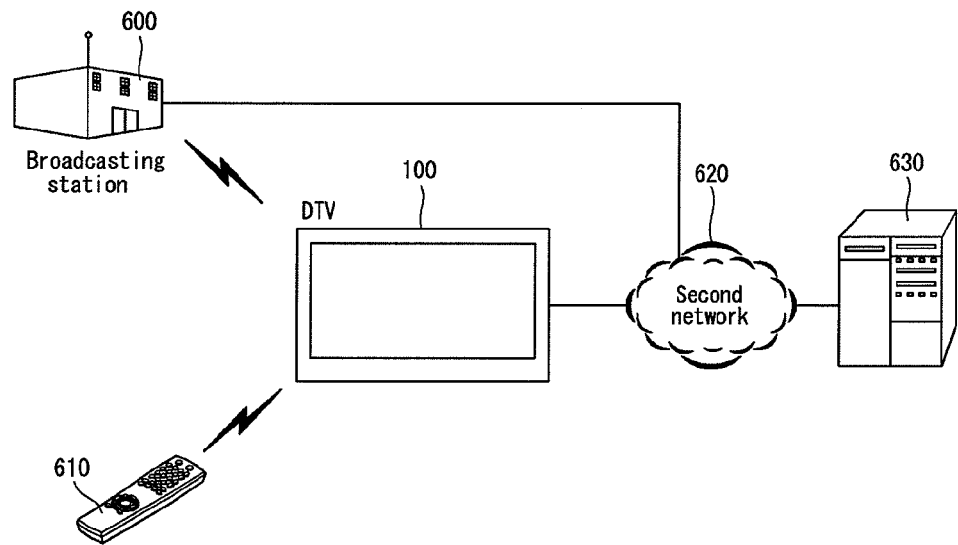
FIG. 8 is a schematic diagram showing a system in which DTV 100 can be included in order to receive contents, separately from the system environments shown in FIGS. 1 to 5.

FIG. 8 is a schematic diagram showing a system in which the DTV 100 can be included in order to receive contents, separately from the system environments shown in FIGS. 1 to 5.

The system shown in FIG. 8 can comprise the DTV 100, a broadcasting station 600, a remote controller 610, and the Internet 620.

The DTV 100 can receive a broadcasting signal from the broadcasting station 300 and output the received broadcasting signal. The broadcasting signal output by the broadcasting station 300 can comprise at least one of an analog broadcasting signal and a digital broadcasting signal.

Further, the DTV 100 can be equipped with an apparatus which can access the Internet 620 using the TCP/IP (Transmission Control Protocol/Internet Protocol). For example, the DTV 100 can access the Internet 620 and receive a variety of contents from a specific server 630 connected to the Internet 620.

The remote controller 610 is a device for controlling the DTV 100.

The remote controller 610 and the DTV 100 can communicate with each other using various communication methods. For example, the communication methods can comprise infrared communication, RF communication, and so on.

The remote controller 610 can comprise a 3-dimensional (3D) pointing device. The 3D pointing device can detect a 3D motion and transmit information about the detected 3D motion to the DTV 100. The 3D motion can correspond to a command for controlling the DTV 100. A user can transmit a specific command to the DTV 100 by moving the 3D pointing device in space. The 3D pointing device can be equipped with a variety of key buttons. A user can input various commands through the key buttons.

Figure 9:
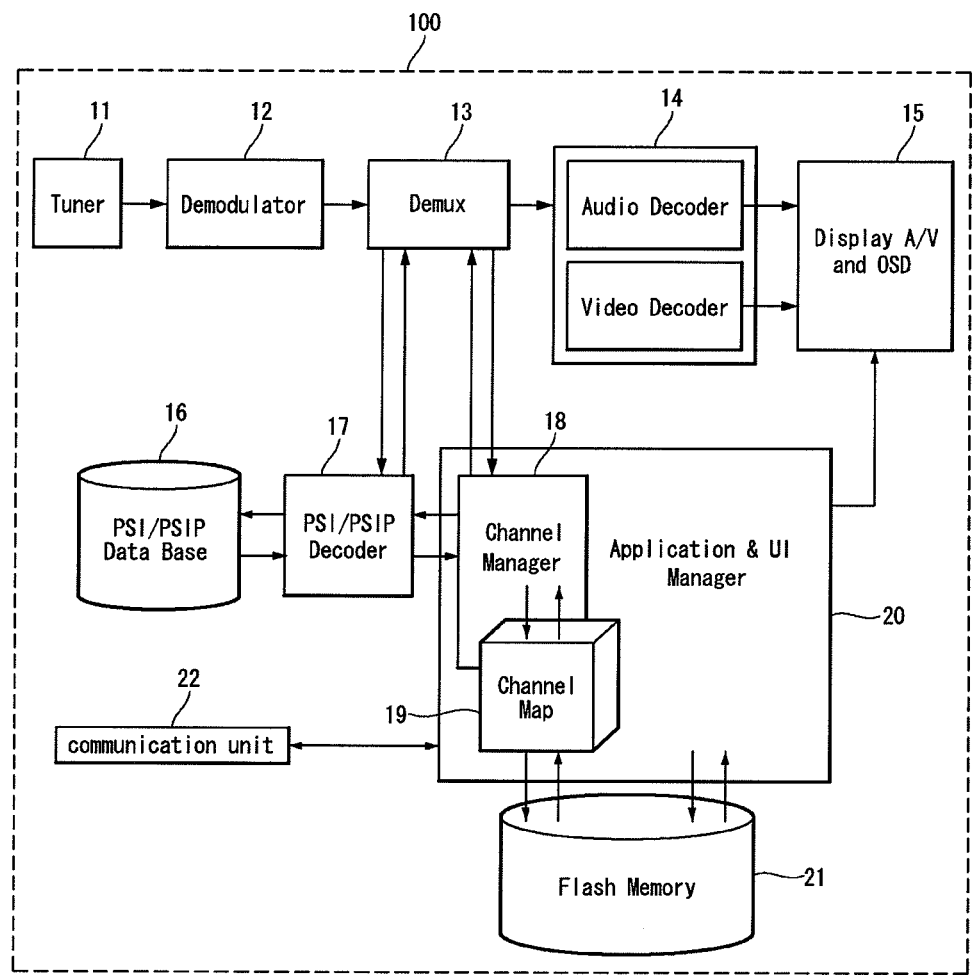
FIG. 9 is a block diagram of the DTV 100 according to an embodiment of this document.

FIG. 9 is a block diagram of the DTV 100 according to an embodiment of this document. The DTV 100 as the first electronic device 100 is described in detail with reference to FIG. 9.

The DTV 100 according to the embodiment of this document can comprise a tuner 11, a demodulator 12, a demultiplexer 13, an audio/video decoder 14, a display A/V and On Screen Display (OSD) 15, a program and system information/program and system information protocol (PSI/PSIP) database 16, a PSI/PSIP decoder 17, a channel manager 18, a channel map 19, a application & UI (user interface) manager 20, flash memory 21, and a communication unit 22.

The tuner 11 can receive a digital broadcasting signal comprising a PSI/PSIP table. Meanwhile, the operation of the tuner 11 can be controlled by the channel manager 18. Accordingly, the tuner 11 records the results of a received digital broadcasting signal in the channel manager 18. The tuner 11 can receive data from multiple channels because tuner 11 can have a plurality of tuners mounted thereon.

The demodulator 12 is responsible for receiving a signal tuned in the tuner 11 and demodulating the received signal into a Vestigial Side Band/Enhanced Vestigial Side Band (VSB/EVSB) signal.

The demultiplexer 13 demultiplexes transmission packets, demodulated by and received from the demodulator 12, into audio, video, and PSI/PSIP table data.

The demultiplexing of the PSI/PSIP table data can be controlled by the PSI/PSIP decoder 17, and the demultiplexing of the audio and video can be controlled by the channel manager 18.

Furthermore, when the PSI/PSIP decoder 17 sets a packet identifier (PID) for a desired table as conditions, the demultiplexer 13 produces sections of a PSI/PSIP table, satisfying the PID, from the transmission packets and transmits the sections to the PSI/PSIP decoder 17. Further, when the channel manager 18 sets the A/V PID of a corresponding virtual channel as conditions, the demultiplexer 13 demultiplexes a basic A/V stream and transmits the demultiplexed basic A/V stream to the A/V decoder 14. The A/V decoder 14 decodes received broadcasting data in accordance with a corresponding coding method.

The PSI/PSIP decoder 17 parses the PSI/PSIP table sections, reads the remaining actual section data parts, not subjected to section filtering in the demultiplexer 13, and records the read actual section data parts in the PSI/PSIP database 16.

The channel manager 18 can request to receive a channel-related information table with reference to the channel map 19 and receive results of the request. Here, the PSI/PSIP decoder 17 controls the demultiplexing of the channel-related information table and transmits a list of A/V PIDs (Packet Identifiers) to the channel manager 18.

The channel manager 18 can control the A/V decoder 14 by directly controlling the demultiplexer 13 using the received A/V PIDs.

Furthermore, the application & UI manager 20 can control a graphical user interface (GUI) for displaying the state of a receiver system on an OSD (On Screen Display). The application & UI manager 20 can also control the elements and control the overall operation of the DTV 100.

The display A/V and OSD 15 implements the broadcasting data, output by the A/V decoder 14, into audio and video. The display A/V and OSD 15 can comprise a plurality of display units which are separately installed physically or logically.

The display A/V and OSD 15 can receive broadcasting data and output the received broadcasting data, and display A/V and OSD 15 can have all the display functions of a common DTV.

The display A/V and OSD 15 can display data broadcasting, teletext, superimposed captions, advertisements, and so on which are separated from the broadcasting data or separately received. Further, the display A/V and OSD 15 can display pieces of supplementary information, such as stock information and weather information, instant message windows, and so on.

The communication unit 22 can perform communication with an external electronic device (for example, the second electronic device 200 and the third electronic device 300) over the network 400.

For example, the communication unit 22 and the external electronic device can communicate with each other using a local area communication method, such as an RF communication method, an infrared communication method, or bluetooth.

For another example, the communication unit 22 and the external electronic device can communicate with each other via an additional AP (Access Point).

As described above, a communication method between the DTV 100 and the external electronic device is not limited to any one communication method.

Further, the communication unit 22 can comprise a module capable of performing communication with the Internet 620.

Figure 10:
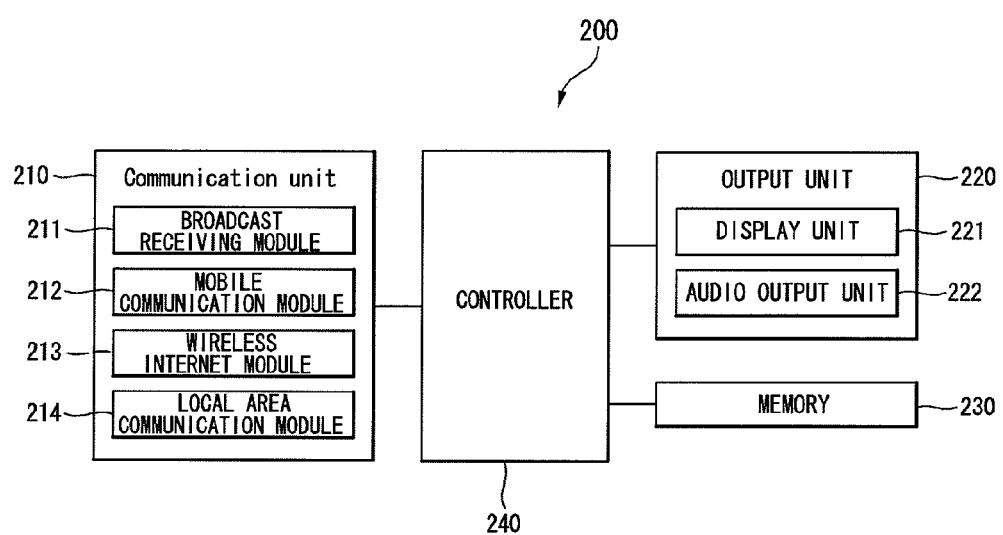
FIG. 10 is a block diagram of an MID (Mobile Internet Device) (that is, a second electronic device 200) according to an embodiment of this document.

FIG. 10 is a block diagram of an MID (Mobile Internet Device) (that is, the second electronic device 200) according to an embodiment of this document.

The second electronic device 200 can comprise a communication unit 210, an output unit 220, memory 230, and a controller 240. It is to be noted that the elements shown in FIG. 10 are not indispensable, but the mobile terminal may comprise larger or fewer elements than the above-described elements.

Hereinafter, the above elements are sequentially described in detail.

The communication unit 210 may comprise one or modules which enable radio communication between the second electronic device 200 and a radio communication system or between the second electronic device 200 and a network in which the second electronic device 200 is located.

For example, the communication unit 210 may comprise a broadcasting receiving module 211, a mobile communication module 212, a wireless Internet module 213, a local area communication module 214, a position information module 215, and so on.

The broadcasting receiving module 211 receives broadcasting signals or broadcasting-related information or both from an external broadcasting management server through a broadcasting channel.

The broadcasting channel may comprise a satellite channel and a terrestrial channel. The broadcasting management server can be a server for generating and transmitting broadcasting signals or broadcasting-related information or both or a server for receiving previously created broadcasting signals or broadcasting-related information or both and transmitting the broadcasting signals or the broadcasting-related information or both to a terminal. The broadcasting signals may comprise not only TV broadcasting signals, radio broadcasting signals, and data broadcasting signals, but also signals in the form of a combination of a TV broadcasting signal and a radio broadcasting signal.

The broadcasting-related information can be information about a broadcasting channel, a broadcasting program, or a broadcasting service provider.

The broadcasting-related information can be provided even over a mobile communication network or the Internet. In this case, the broadcasting-related information can be received by the mobile communication module 212 or the wireless Internet module 213 or both.

The broadcasting-related information can exist in various forms. For example, the broadcasting-related information can exist in the form of an electronic program guide (EPG) of the digital multimedia broadcasting (DMB) system or in the form of an electronic service guide (ESG) of the digital video broadcast-handheld (DVB-H) system.

The broadcasting receiving module 211 receives broadcasting signals using various broadcasting systems. In particular, the broadcasting receiving module 211 can receive digital broadcasting signals using digital broadcasting systems, such as the digital multimedia broadcasting-terrestrial (DMB-T) system, the digital multimedia broadcasting-satellite (DMB-S) system, the media forward link only (Media-FLO) system, the digital video broadcast-handheld (DVB-H) system, and the integrated services digital broadcast terrestrial (ISDBT) system. The broadcasting receiving module 211 may also be configured to be suited to broadcasting systems which provide broadcasting signals, in addition to the above digital broadcasting systems.

The broadcasting signals or the broadcasting-related information or both which are received through the broadcasting receiving module 211 can be stored in the memory 230.

The mobile communication module 212 transmits and receives radio signals to and from at least one of a base station, an external terminal, and a server over a mobile communication network. The radio signals may comprise voice call signals, video telephony call signals, or data in various forms according to the transmission and reception of text and multimedia messages.

The wireless Internet module 213 corresponds to a module for wireless Internet access, and wireless Internet module 213 can be included in the second electronic device 200 or externally attached to the second electronic device 200. A wireless LAN (WLAN) (Wi-Fi), wireless broadband (Wibro), world interoperability for microwave access (Wimax), high speed downlink packet access (HSDPA) or the like can be used as the wireless Internet technique.

The local area communication module 214 corresponds to a module for local area communication. Bluetooth, radio frequency identification (RFID), infrared data association (IrDA), ultra wideband (UWB), ZigBee or the like can be used as the local area communication technique.

The output unit 220 generates visual, auditory, or tactile output and may comprise a display module 221, an audio output unit 222, and so on.

The display unit 221 displays information processed by the second electronic device 200 and outputs the processed information.

In case where the display unit 221 and a sensor for sensing touch (referred to as a 'touch sensor' hereinafter) form a layered structure (referred to as a 'touch screen' hereinafter), the display unit 221 may also be used as an input device in addition to an output device. The touch sensor can be in the form of a touch film, a touch sheet, or a touch pad, for example.

The touch sensor can be constructed to convert a variation in pressure applied to a specific portion of the display unit 221 or a variation in capacitance generated at a specific portion of the display unit 221 into an electric input signal. The touch sensor can also be constructed to sense pressure of touch as well as the position and area of the touch.

When a user applies touch input to the touch sensor, a signal(s) corresponding to the touch input is (or are) transmitted to a touch controller. The touch controller processes the signal(s) and transmits data corresponding to the processed signal(s) to the controller 240. Accordingly, the controller 240 can detect a touched portion of the display unit 221.

The audio output unit 222 may output audio data which is received from the communication unit 210 or stored in the memory 230 in the call signal receiving mode, the telephone call mode, the recording mode, the speech recognition mode, the broadcasting receiving mode, and so forth.

The memory 230 can store a program for the operations of the controller 240 and may temporarily store input and output data (for example, phone book, messages, still images, and moving images). The memory 230 can store data about vibrations and sounds in various patterns, which are output when a touch input is applied to the touch screen.

The controller 240 typically controls the overall operation of the second electronic device 200. For example, the controller 240 performs control and processing which are relevant to voice calls, data communication, video telephone, and so on.

The controller 240 can be equipped with a multimedia module for playing multimedia. The multimedia module may be implemented within the controller 240 or may be implemented separately from the controller 240.

Figure 11:
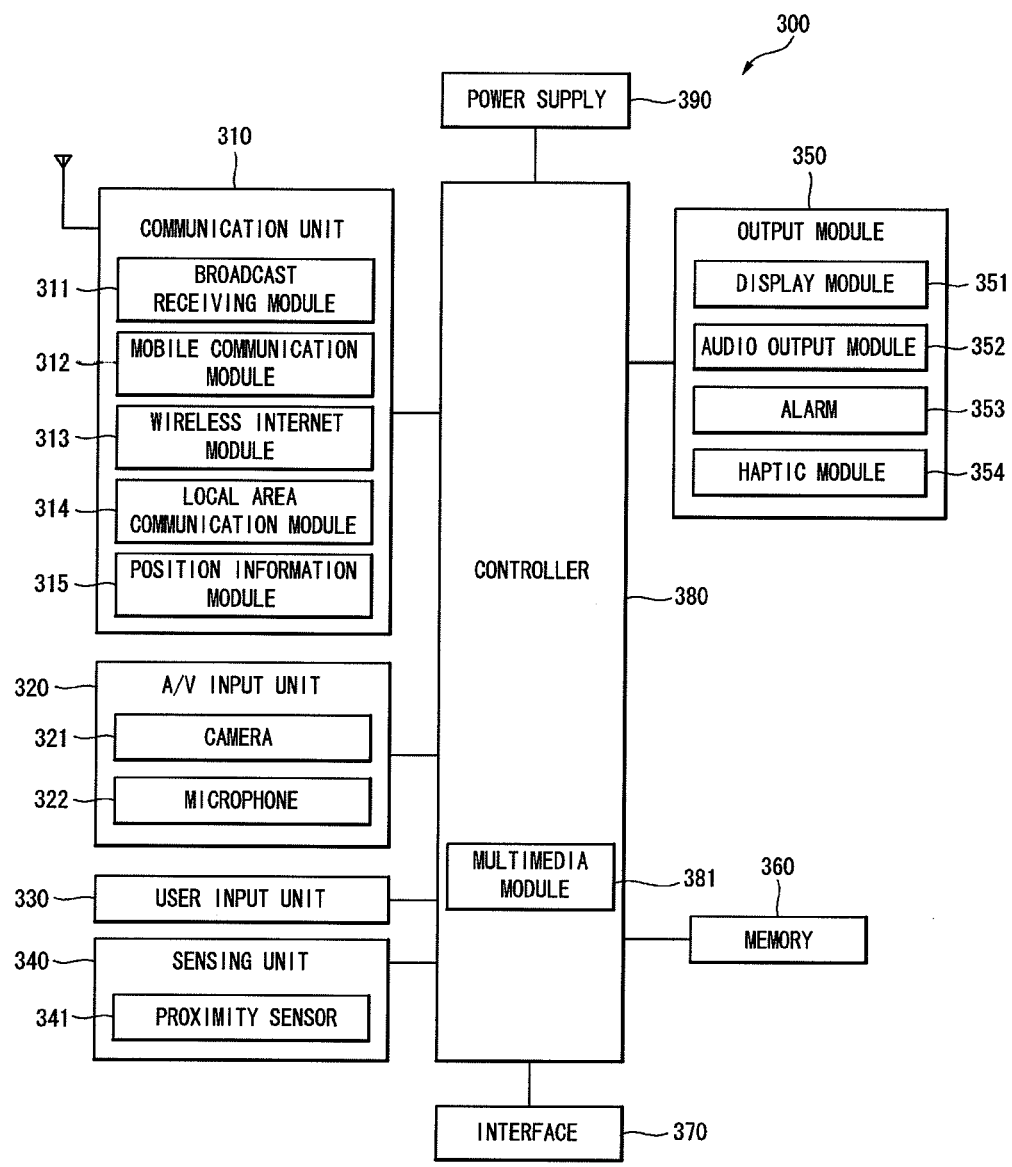
FIG. 11 is a block diagram of a mobile terminal (that is, a third electronic device 300) according to an embodiment of this document.

FIG. 11 is a block diagram of a mobile terminal (that is, the third electronic device 300) according to an embodiment of this document.

The third electronic device 300 may comprise a radio communication unit 310, an audio/video (A/V) input unit 320, a user input unit 330, a sensing unit 340, an output unit 350, memory 360, an interface 370, a controller 380, and a power supply 390. It is to be noted that the elements shown in FIG. 11 are not indispensable, but the third electronic device may comprise larger or fewer elements than the above-described elements.

Hereinafter, the elements are sequentially described in detail.

The radio communication unit 310 may comprise one or modules which enable radio communication between the third electronic device 300 and a radio communication system or between the third electronic device 300 and a network in which the third electronic device 300 is located.

For example, the radio communication unit 310 may comprise a broadcasting receiving module 311, a mobile communication module 312, a wireless Internet module 313, a local area communication module 314, and a position information module 315.

The broadcasting receiving module 311 receives broadcasting signals or broadcasting-related information or both from an external broadcasting management server through a broadcasting channel.

The broadcasting channel may comprise a satellite channel and a terrestrial channel. The broadcasting management server can be a server for generating and transmitting broadcasting signals or broadcasting-related information or both or a server for receiving previously created broadcasting signals or broadcasting-related information or both and transmitting the broadcasting signals or the broadcasting-related information or both to an electronic device. The broadcasting signals may comprise not only TV broadcasting signals, radio broadcasting signals, and data broadcasting signals, but also signals in the form of a combination of a TV broadcasting signal and a radio broadcasting signal.

The broadcasting-related information can be information about a broadcasting channel, a broadcasting program, or a broadcasting service provider. The broadcasting-related information can be provided even over a mobile communication network. In the latter case, the broadcasting-related information can be received by the mobile communication module 312.

The broadcasting-related information can exist in various forms. For example, the broadcasting-related information can exist in the form of an electronic program guide (EPG) of the digital multimedia broadcasting (DMB) system or in the form of an electronic service guide (ESG) of the digital video broadcast-handheld (DVB-H) system.

The broadcasting receiving module 311 receives broadcasting signals by using various broadcasting systems. In particular, the broadcasting receiving module 311 can receive digital broadcasting signals by using digital broadcasting systems, such as the digital multimedia broadcasting terrestrial (DMBT) system, the digital multimedia broadcasting satellite (DMBS) system, the media forward link only (MediaFLO) system, the digital video broadcast handheld (DVBH) system, and the integrated services digital broadcast terrestrial (ISDBT) system. The broadcasting receiving module 311 may also be configured to be suited to broadcasting systems which provide broadcasting signals, in addition to the above digital broadcasting systems.

The broadcasting signals or the broadcasting-related information or both which are received through the broadcasting receiving module 311 can be stored in the memory 360.

The mobile communication module 312 transmits and receives radio signals to and from at least one of a base station, an external terminal, and a server over a mobile communication network. The radio signals may comprise voice call signals, video telephony call signals, or data in various forms according to the transmission and reception of text and multimedia messages.

The wireless Internet module 313 corresponds to a module for wireless Internet access, and wireless Internet module 313 can be included in the third electronic device 300 or externally attached to the third electronic device 300. A wireless LAN (WLAN) (Wi-Fi), wireless broadband (Wibro), world interoperability for microwave access (Wimax), high speed downlink packet access (HSDPA) or the like can be used as the wireless Internet technique.

The local area communication module 314 corresponds to a module for local area communication. Bluetooth, radio frequency identification (RFID), infrared data association (IrDA), ultra wideband (UWB), ZigBee or the like can be used as the local area communication technique.

The position information module 315 confirms or obtains the position of the third electronic device. The position information module 315 can obtain position information by using a global navigation satellite system (GNSS). The GNSS is a term used to describe radio navigation satellite systems configured to transmit respective reference signals to determine their positions on the surface of the earth or near the surface of the earth while revolving the earth. The GNSS includes a global position system (GPS) operated by the United States of America, Galileo operated by the EC, a global orbiting navigational satellite system (GLONASS) operated by Russia, COMPASS operated by China, a quasi-zenith satellite system (QZSS) operated by Japan, and so on.

As a typical example of the GNSS, the position information module 315 can be a GPS (Global Position System) module. The GPS module 315 can calculate information about distances between one point (or object) and three or more satellites and information about the time when the distance information is measured and apply trigonometry to the obtained distance information to obtain three-dimensional position information about the point (or object) according to the latitude, longitude, and altitude at a predetermined time. Furthermore, a method of calculating position and time information by using three satellites and correcting the calculated position and time information by using another satellite can also used. The GPS module 315 continuously calculates the current position in real time and calculates velocity information on the basis of the position information.

Referring to FIG. 11, the A/V input unit 320 is used to input an audio signal or a video signal, and A/V input unit 320 may comprise a camera 321 and a microphone 322. The camera 321 processes image frames of still images or moving images obtained by an image sensor in a video telephony mode or a photographing mode. The processed image frames can be displayed on a display module 351.

The image frames processed by the camera 321 can be stored in the memory 360 or transmitted to an external device through the radio communication unit 310. The third electronic device 300 may comprise two or more cameras 321, if appropriate.

The microphone 322 receives an external audio signal in a call mode, a recording mode, or a speech recognition mode and processes the received audio signal into electric audio data. In the call mode, the processed audio data can be converted into a form which can be transmitted to a mobile communication base station through the mobile communication module 312 and then output. Further, the microphone 322 can employ various noise removal algorithms for removing noise generated when an external audio signal is received.

The user input unit 330 receives input data for controlling the operations of the third electronic device from a user. The user input unit 330 may comprise a keypad, a dome switch, a touch pad (for example, constant voltage/capacitance), jog wheel, jog switch, and so forth.

The sensing unit 340 senses the current states of the third electronic device 300, such as an open/close state of the third electronic device 300, the position of the third electronic device 300, whether a user has touched the third electronic device 300, the direction of the third electronic device 300, and the acceleration and deceleration of the third electronic device 300, and generates a sensing signal for controlling the operations of the third electronic device 300.

For example, in case where the third electronic device 300 is a slide phone, the sensing unit 340 can sense whether the slide phone is opened or closed.

Furthermore, the sensing unit 340 can be responsible for a sensing function of sensing whether the power supply 390 supplies power and whether the interface 370 is connected to an external device. The sensing unit 340 can comprise a proximity sensor 341.

The output unit 350 generates visual, auditory, or tactile output and may comprise the display module 351, an audio output module 352, an alarm 353, and a haptic module 354.

The display module 351 displays information processed by the third electronic device 300. For example, in case where the third electronic device 300 is in the call mode, the display module 351 displays a user interface (UI) or a graphic user interface (GUI) which is relevant to a telephone call. In case where the third electronic device 300 is in the video telephony mode or the photographing mode, the display module 351 displays a captured image or a received image or both, a UI, or GUI.

The display module 351 may comprise at least one of a liquid crystal display, a thin film transistor liquid crystal display, an organic light-emitting diode display, a flexible display, and a three-dimensional (3D) display.

Some of the above displays can be of a transparent type or a light transmission type so that the outside can be seen through the displayed. In this case, the display module 351 may be called a transparent display. A typical example of the transparent display may be a transparent liquid crystal display (LCD). The rear structure of the display module 351 can also be of a light transmission type. Accordingly, a user can see an object located behind the body of the third electronic device 300 through the transparent area of the body of the third electronic device 300, which is occupied by the display module 351.

The third electronic device 300 may comprise two or more display modules 351 in some implementations. For example, the third electronic device 300 may have a plurality of displays arranged on a single face with them spaced part one another or with them integrally disposed. The plurality of displays can be arranged on different sides.

In case where the display module 351 and a sensor for sensing touch (referred to as a 'touch sensor' hereinafter) form a layered structure (referred to as a 'touch screen' hereinafter), the display module 351 may also be used as an input device in addition to an output device. The touch sensor can be in the form of a touch film, a touch sheet, or a touch pad, for example.

The touch sensor can be constructed to convert a variation in pressure applied to a specific portion of the display module 351 or a variation in capacitance generated at a specific portion of the display module 351 into an electric input signal. The touch sensor can also be constructed to sense pressure of touch as well as the position and area of the touch.

When a user applies touch input to the touch sensor, a signal(s) corresponding to the touch input is (or are) transmitted to a touch controller. The touch controller processes the signal(s) and transmits data corresponding to the processed signal(s) to the controller 380. Accordingly, the controller 380 can detect a touched portion of the display module 351.

Referring to FIG. 11, the proximity sensor 341 of the sensing unit 340 can be located in an internal region of the third electronic device, surrounded by the touch screen, or near the touch screen.

The proximity sensor 341 senses an object approaching a predetermined sensing face or an object located near the proximity sensor 341 by using electromagnetic force or infrared rays without mechanical contact. The proximity sensor 341 has a longer lifespan than a contact sensor and thus has wide applications in the third electronic device 300.

The proximity sensor 341 may comprise, for example, a transmission type photo-electric sensor, a direct reflection type photo-electric sensor, a mirror reflection type photo-electric sensor, a high-frequency oscillating proximity sensor, a capacitive proximity sensor, a magnetic proximity sensor, and an infrared proximity sensor.

In case where the touch screen is a capacitive touch screen, the touch screen is constructed to detect the proximity of a pointer on the basis of a variation in an electric field according to the proximity of the pointer. In this instance, the touch screen (or touch sensor) may be classified as the proximity sensor 341.

For convenience of description, an action of the pointer approaching the touch screen without actually touching the touch screen is referred to as a "proximity touch," and an action of bringing the pointer into contact with the touch screen is referred to as a "contact touch" in the following description. The proximity touch point of the pointer on the touch screen corresponds to a point of the touch screen to which the pointer vertically touches the touch screen.

The proximity touch is described later in detail with reference to FIG. 12.

The proximity sensor 341 senses a proximity touch and a proximity touch pattern (for example, a proximity touch distance, a proximity touch direction, a proximity touch velocity, a proximity touch time, a proximity touch position, and a proximity touch moving state). Information corresponding to the sensed proximity touch action or proximity touch pattern can be displayed on the touch screen.

The audio output module 352 may output audio data which is received from the radio communication unit 310 or stored in the memory 360 in the call signal receiving mode, the telephone call mode, the recording mode, the speech recognition mode, the broadcasting receiving mode, and so forth. Further, the audio output module 352 outputs audio signals relevant to functions (for example, a call signal incoming tone and a message incoming tone) which are performed in the third electronic device 300. The audio output module 352 may comprise a receiver, a speaker, a buzzer, and so on. Further, the audio output module 352 can output sound through an earphone jack 116. A user can connect an earphone to the earphone jack 116 and hear the sound.

The alarm 353 outputs signals indicative of events generated in the third electronic device 300. For example, the events may comprise the reception of a call signal, the reception of a message, the input of a key signal, touch input, and so on. The alarm 353 may also output a signal indicative of the generation of an event in a form (for example, vibration) different from the video or audio signal. Further, the video or audio signals can be output through the display module 351 or the audio output module 352.

The haptic module 354 generates various haptic effects that a user can feel. A typical example of the haptic effects is vibration. The intensity, pattern, etc. of vibration generated by the haptic module 354 can be controlled. For example, different vibrations may be combined and output or may be sequentially output.

Further, the haptic module 354 can generate a variety of haptic effects, including an effect of stimulus according to the arrangement of pins vertically moving against a contact skin surface, an effect of stimulus according to a jet force or suction force of air through a jet hole or a suction hole, an effect of stimulus of rubbing the skin, an effect of stimulus according to contact of an electrode, an effect of stimulus using an electrostatic force, and an effect according to a reproduction of cold and warmth using an element capable of absorbing or radiating heat.

Further, the haptic module 354 may be implemented to not only transmit the haptic effects through direct contact, but also allow a user to feel the haptic effects through a kinesthetic sense of the user's fingers or arms. The third electronic device 300 may comprise two or more haptic modules 154 according to the configuration aspect of the third electronic device 300.

The memory 360 can store a program and various data for the operations of the controller 380 and may temporarily store input and output data (for example, phone book, messages, still images, and moving images). Further, the memory 360 can store data about vibrations and sounds in various patterns, which are output when a touch input is applied to the touch screen.

The memory 360 may comprise at least one of storage media, such as flash memory, hard disk type memory, multimedia card micro type memory, card type memory (for example, SD or XD memory), random access memory (RAM), static RAM (SRAM), read-only memory (ROM), electrically erasable programmable ROM (EEPROM), programmable ROM (PROM), magnetic memory, a magnetic disk, and an optical disk. The third electronic device 300 may be operated in conjunction with a web storage for performing the storage function of the memory 360 on the Internet.

The interface 370 serves as a path to external devices connected to the third electronic device 300. The interface 370 receives data or power from the external devices and transmits the data or power to the internal components of the third electronic device 300 or transmits data of the third electronic device 300 to the external devices.

The interface 370 may comprise, for example, a wired/wireless headset port, an external charger port, a wired/wireless data port, a memory card port, a port for connecting a device having an identification module, audio I/O ports, video I/O ports, and an earphone port.

The identification module is a chip for storing various pieces of information for authenticating the authority to use the third electronic device 300. The identification module may comprise, for example, a user identify module (UIM), a subscriber identify module (SIM), and a universal subscriber identify module (USIM). An identification device including the identification module (referred to as an 'identification device' hereinafter) can be manufactured in the form of a smart card. Accordingly, the identification device can be connected to the third electronic device 300 through the port of the interface 370.

The interface 370 can be a path through which power from an external cradle is provided to the third electronic device 300 when the third electronic device 300 is connected to the external cradle or a path through which various command signals input by a user through the cradle are transmitted to the third electronic device 300. The various command signals or the power inputted through the cradle may be used as signals for confirming whether the third electronic device is correctly set in the cradle.

The controller 380 typically controls the overall operations of the third electronic device 300. For example, the controller 380 performs control and processing which are relevant to voice calls, data communication, video telephony, etc.

The controller 380 may comprise a multimedia module 381 for playing multimedia. The multimedia module 381 may be implemented within the controller 380 or may be implemented separately from the controller 380.

The controller 380 can perform a pattern recognition processing of recognizing handwriting input or picture-drawing input applied to the touch screen as characters or images.

The power supply 390 receives external power and internal power and supplies power for the operations of the components of the third electronic device, under the control of the controller 380.

The various embodiments described herein can be implemented in a recording medium which is readable by a computer or similar devices by using, for example, software, hardware, or a combination of them.

In accordance with hardware implementations, the embodiments described herein can be implemented by using at least one of application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electronic module for performing the functions described herein. In some cases, the embodiments can be implemented by the controller 380.

In accordance with software implementations, embodiments, such as procedures and functions, can be implemented along with a separate software module for performing one or more of functions and operations described herein. Software codes can be implemented by using a software application written in any suitable programming language. The software codes can be stored in the memory 360 and executed by the controller 380.

The proximity sensor 341 is described in more detail with reference to FIG. 12.

Figure 12:
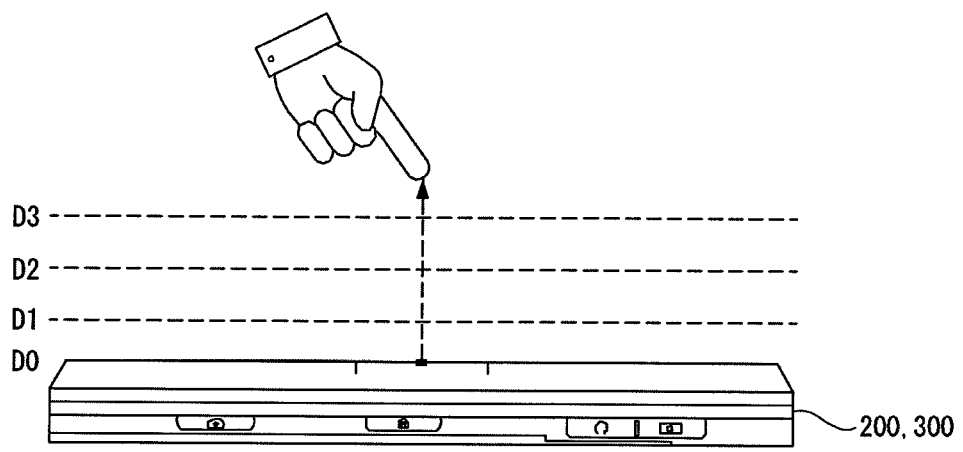
FIG. 12 is a conceptual diagram illustrating the proximity depth of a proximity sensor 341.

FIG. 12 is a conceptual diagram illustrating the proximity depth of the proximity sensor 341.

Figure 82:
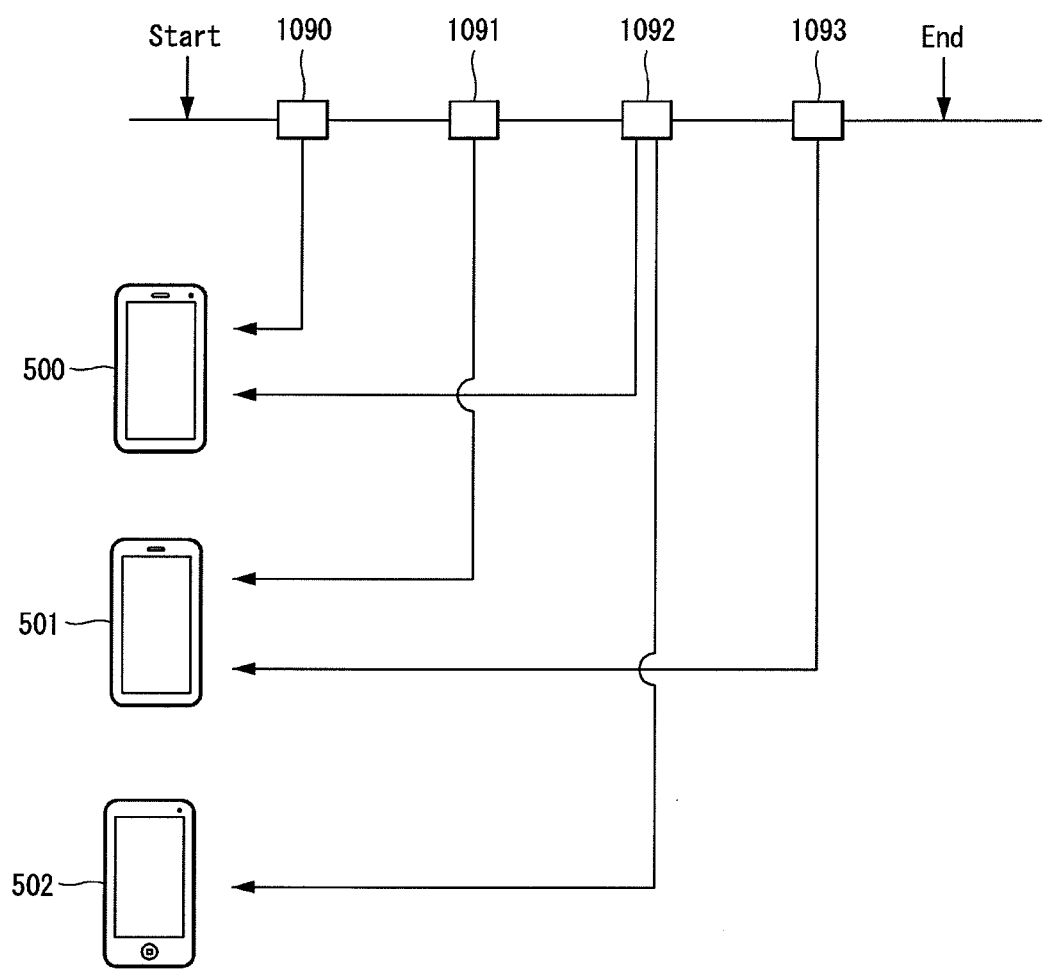

As shown in FIG. 82, when a pointer, such as a user's finger, approaches a touch screen, the proximity sensor 341 disposed within or near the touch screen detects such approach and outputs a corresponding proximity signal.

The proximity sensor 341 can be configured to output different proximity signals on the basis of a distance between the proximity touched pointer and the touch screen (hereinafter referred to as a 'proximity depth').

A distance from which a proximity signal is output when the pointer approaches the touch screen is called a detection distance. A proximity depth can be known by comparing proximity signals output from respective proximity sensors by using the proximity sensors with different detection distances.

FIG. 12 illustrates the cross section of a touch screen in which proximity sensors capable of detecting, for example, three proximity depths are disposed. Proximity sensors for detecting less than three proximity depths or four or more proximity depths can also be disposed in the touch screen.

More particularly, when the pointer fully touches the touch screen (D0), this action is recognized as a contact touch. When the pointer is located within a distance D1 from the touch screen, this action is recognized as a proximity touch of a first proximity depth. In a similar manner, when the pointer is located in a range between the distance D1 and a distance D2 from the touch screen, this action is recognized as a proximity touch of a second proximity depth. When the pointer is located in a range between the distance D2 and a distance D3 from the touch screen, this action is recognized as a proximity touch of a third proximity depth. Further, when the pointer is located at longer than the distance D3 from the touch screen, this action is recognized as cancellation of a proximity touch.

Accordingly, the controller 380 can recognize the proximity touch as various input signals in response to a proximity distance and a proximity position of the pointer for the touch screen and can perform various operations in response to the input signals.

Hereinafter, some embodiments of this document are described.

Figure 13:
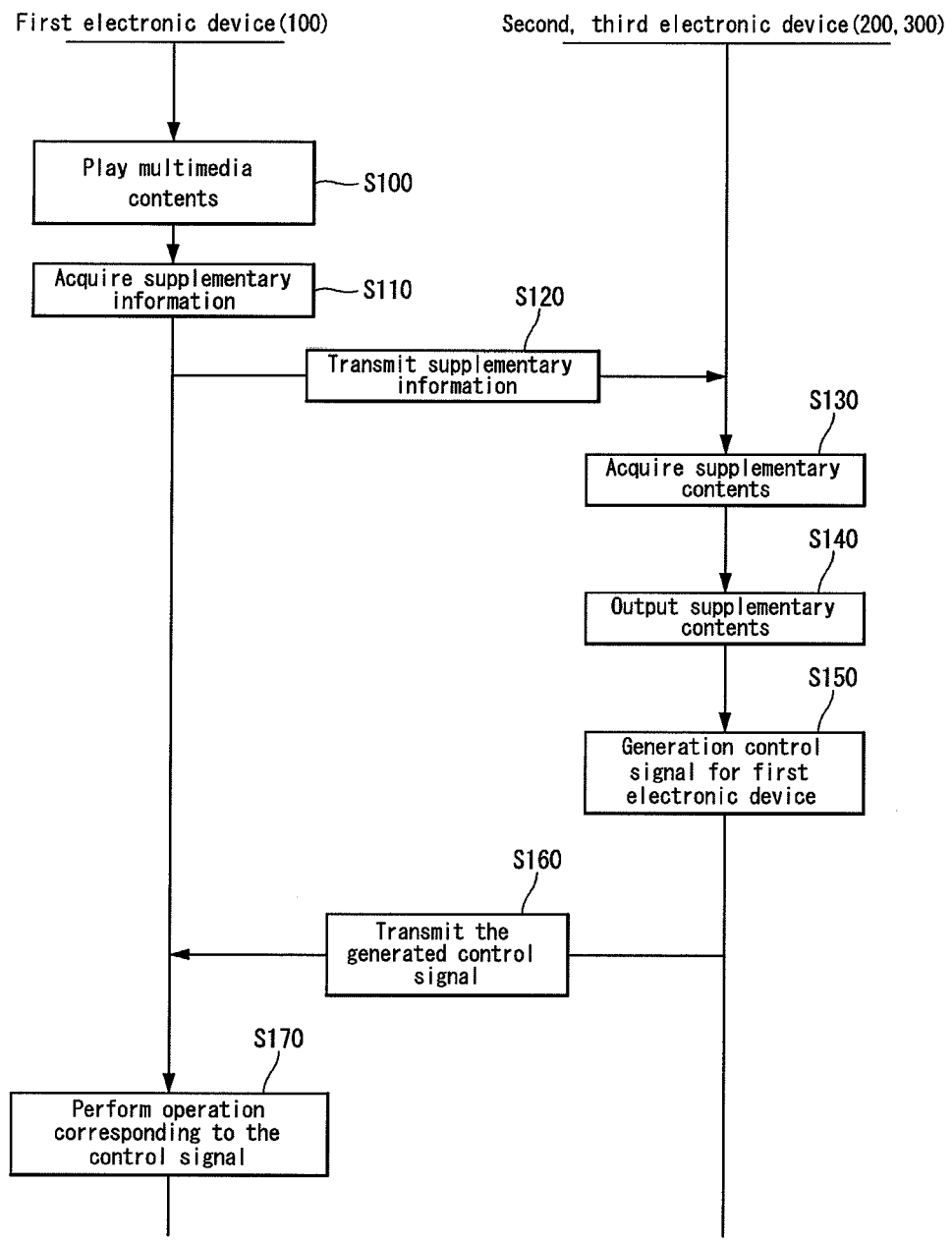
FIG. 13 is a flowchart illustrating a method of providing information according to a first embodiment of this document.

FIG. 13 is a flowchart illustrating a method of providing information according to a first embodiment of this document.

The method of providing information according to the first embodiment of this document can be implemented through the system environments and the various electronic devices described above with reference to FIGS. 1 to 12. Hereinafter, the method of providing information according to the first embodiment of this document and the operations of the first to third electronic devices 100, 200, and 300 for implementing the method are described in detail with reference to pertinent drawings.

Referring to FIG. 13, the first electronic device 100 can play multimedia contents at step S100.

The multimedia contents can comprise various forms of contents, such as still images, motion images, audio, animation, flash, text, and various combinations of them.

Figure 14:
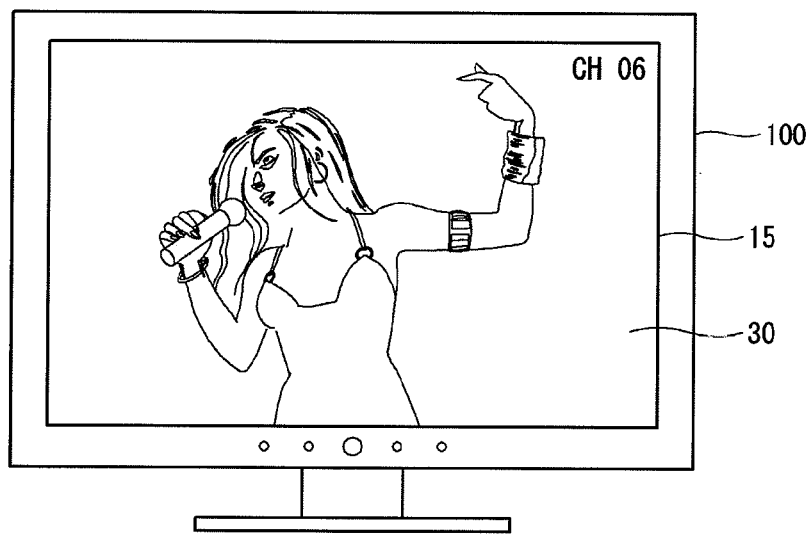
FIG. 14 illustrates a screen in which the step S100 is performed.

FIG. 14 shows a screen in which the step S100 is performed. For example, referring to FIG. 14, the first electronic device 100, as described above, can receive broadcasting contents 30 from the broadcasting station 600 and play the received broadcasting contents.

To this end, a user can turn on the first electronic device 100 by manipulating the remote controller 610, select a desired broadcasting channel, and control the first electronic device 100 so that the step S100 is performed.

The application & UI manager 20 of the first electronic device 100 can acquire supplementary information relevant to the multimedia contents 30 which is being played at step S110.

The supplementary information relevant to the multimedia contents 30 can comprise not only a broadcasting signal output through the display A/V and OSD 15, but also various pieces of information relevant to the multimedia contents 30.

For example, the supplementary information relevant to the multimedia contents 30 can comprise various pieces of information, such as pieces of information about various entities included in the multimedia contents 30, detailed information to describe the multimedia contents 30, information about the subject which supplies the multimedia contents 30, news information about the multimedia contents 30, others' evaluation information about the multimedia contents 30, and information about other contents which belong to the same kind or genre as the multimedia contents 30.

The pieces of information about various entities included in the multimedia contents 30 can comprise, for example, identifiers to indicate product information relevant to various entities included in the multimedia contents 30, such as clothes or noble metals which are worn by a performer appearing in the multimedia contents 30.

For another example, the supplementary information relevant to the multimedia contents 30 can be path information through which various pieces of information according to the above various examples can be accessed (for example, an Internet address corresponding to a server in which the pieces of information are stored).

The supplementary information relevant to the multimedia contents 30 can be tagged on the broadcasting signal and transmitted, when the broadcasting station 600 transmits the multimedia contents 30 in the form of the broadcasting signal.

The application & UI manager 20 of the first electronic device 100 can acquire the supplementary information relevant to the multimedia contents 30 by extracting the supplementary information tagged on the broadcasting signal.

Figure 15:
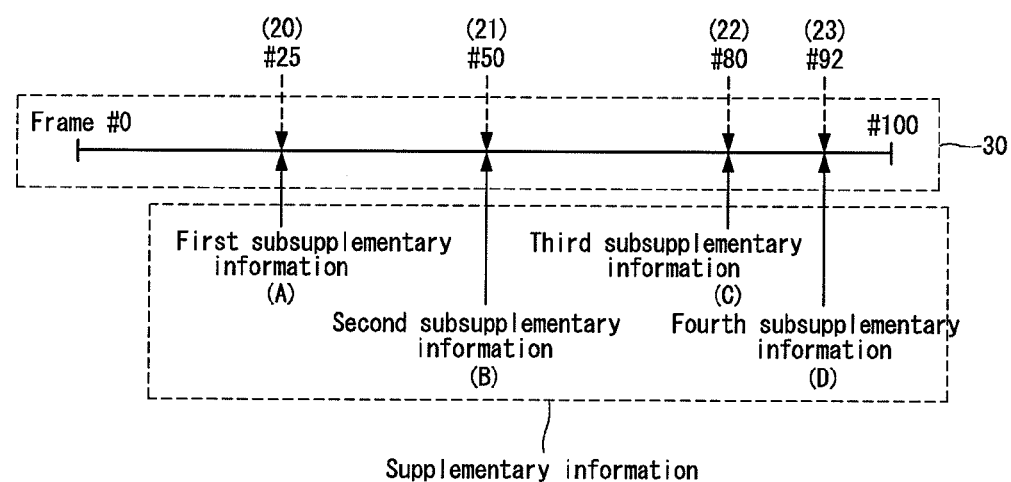
FIG. 15 shows an example of supplementary information tagged on a broadcasting signal.

FIG. 15 shows an example of supplementary information tagged on a broadcasting signal.

For example, as shown in FIG. 15, it is assumed that broadcasting contents corresponding to the multimedia contents 30 which are received by the first electronic device 100 from the broadcasting station 600 comprise 100 image frames from frame #0 to frame #100.

The multimedia contents 30 comprising the 100 image frames can comprise pieces of sub-supplementary information which have been tagged at different points of time when the multimedia contents 30 are played.

For example, referring to FIG. 15, from among the 100 image frames constituting the multimedia contents 30, first sub-supplementary information A can be tagged on the #25 frame 20, second sub-supplementary information B can be tagged on the #50 frame 21, third sub-supplementary information C can be tagged on the #80 frame 22, and fourth sub-supplementary information D can be tagged on the #92 frame 23.

The broadcasting station 600 can transmit the supplementary information, comprising pieces of sub-supplementary information A, B, C, and D such as that shown in FIG. 15, to the first electronic device 100 in various ways.

For example, at a point of time when the multimedia contents 30 are first transmitted or after the multimedia contents 30 are transmitted, the broadcasting station 600 can transmit all the pieces of sub-supplementary information A, B, C, and D in a bundle in the form of a broadcasting signal at a point of time before a broadcasting signal corresponding to the #25 frame 20 is transmitted.

Further, the broadcasting station 600 can transmit pieces of identification information about image frames corresponding to the respective pieces of sub-supplementary information A, B, C, and D in the form of a broadcasting signal.

Figures 16, 17:
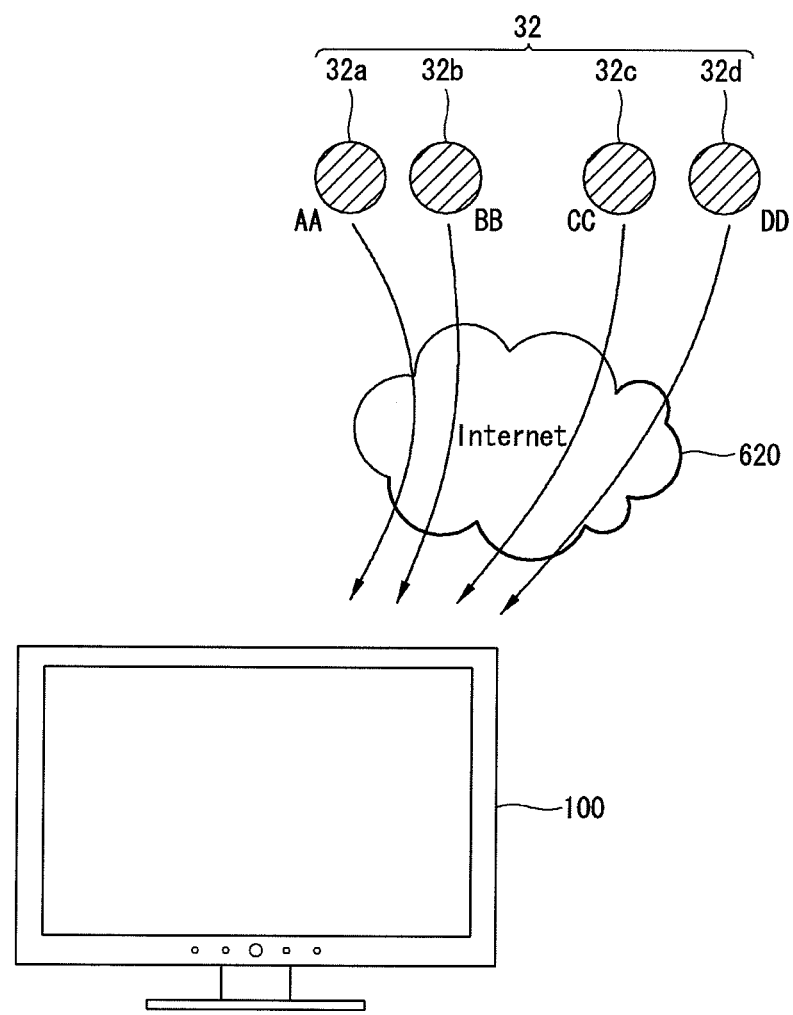
FIG. 16 is a table showing the correspondence relationship between pieces of sub-supplementary information A, B, C, and D and image frames.
FIG. 17 shows a concept of acquiring supplementary information relevant to multimedia contents 30 through a web search.

FIG. 16 is a table showing the correspondence relationship between the pieces of sub-supplementary information A, B, C, and D and the image frames.

As shown in the table of FIG. 16, specific sub-supplementary information can correspond to a specific image frame and a specific point in time of play. The broadcasting station 600 can transmit the table of FIG. 16 in the form of a broadcasting signal.

Further, the broadcasting station 600 may transmit the pieces of sub-supplementary information A, B, C, and D together with respective corresponding image frames.

For example, when transmitting the #25 image frame, the broadcasting station 600 can transmit the first sub-supplementary information A together with the #25 image frame.

Meanwhile, the application & UI manager 20 of the first electronic device 100 may access the Internet 620 and acquire supplementary information relevant to the multimedia contents 30 through a web search using a specific keyword.

For example, in case where a title of the multimedia contents 30 is "AAA," the application & UI manager 20 of the first electronic device 100 can acquire various pieces of information relevant to the title "AAA" through a web search by using the title "AAA" as a search keyword.

Furthermore, the application & UI manager 20 can specify at least some of the pieces of information acquired through a web search as supplementary information relevant to the multimedia contents 30.

FIG. 17 is a diagram illustrating a concept of acquiring supplementary information relevant to the multimedia contents 30 through a web search.

For example, referring to FIG. 17, the application & UI manager 20 can access the Internet 620 through the communication unit 22 and collect the results of a web search by using a title "AAA" as a search keyword.

The application & UI manager 20 can acquire information "AA" from a first source 32a, information "BB" from a second source 32b, information "CC" from a third source 32c, and information "DD" from a fourth source 32d.

Figures 18, 19:
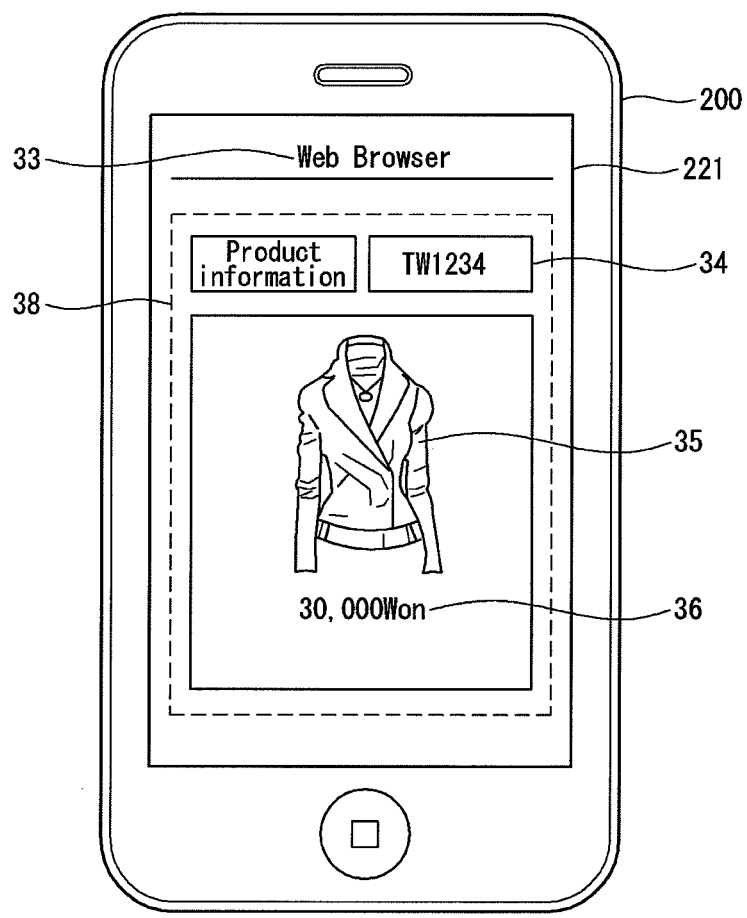
FIG. 18 shows an example of pieces of detailed information included in pieces of information received from respective information sources.
FIG. 19 shows an example of output supplementary contents.

FIG. 18 shows an example of pieces of detailed information included in pieces of information received from respective information sources.

For example, referring to FIG. 18, the information "AA" can comprise AA-1 and AA-2, and the information "BB" can comprise BB-1, BB-2, and BB-3. Furthermore, the information "CC" can comprise CC-1, and the information "DD" can comprise DD-1 and DD-2.

The application & UI manager 20 can receive pieces of information, such as that shown in FIGS. 17 and 18, through a web search, and specify information to be used as supplementary information relevant to the multimedia contents 30, from the pieces of received information, on the basis of predetermined criteria.

For example, the application & UI manager 20 can specify AA-1, BB-1, CC-1, and DD-1 as supplementary information relevant to the multimedia contents 30.

Meanwhile, regarding the supplementary information relevant to the multimedia contents 30, the application & UI manager 20 can use some of the supplementary information transmitted by the broadcasting station 600 in the form of a broadcasting signal and acquire some of the remaining supplementary information through a web search.

The application & UI manager 20 of the first electronic device 100 can transmit supplementary information relevant to the multimedia contents 30, acquired as described above in various ways, to the second electronic device 200 or the third electronic device 300 or both at step S120.

The second electronic device 200 or the third electronic device 300 or both can receive the supplementary information relevant to the multimedia contents 30 from the first electronic device 100 and store storages or the memory 230, 360 included therein.

Meanwhile, the first electronic device 100, as described above, can transmit the supplementary information to the second electronic device 200 or the third electronic device 300 or both in accordance with a variety of communication methods or communication protocols.

It is to be noted that a communication method or communication protocol on which the supplementary information is transmitted is not limited.

Further, a point of time when the first electronic device 100 transmits the supplementary information to the second electronic device 200 or the third electronic device 300 or both can be very various like a point of time when the first electronic device 100 receives or acquires the supplementary information.

For example, in case where the supplementary information comprises pieces of sub-supplementary information respectively corresponding to a plurality of different points of time from among a total play period of the multimedia contents 30, the first electronic device 100 can transmit pieces of corresponding sub-supplementary information to the second electronic device 200 or the third electronic device 300 or both when the pieces of different points of time are reached.

For another example, in case where the first electronic device 100 has acquired the pieces of supplementary information, comprising at least one sub-supplementary information, in a bundle, the first electronic device 100 can transmit all the pieces of supplementary information to the second electronic device 200 or the third electronic device 300 or both at a time.

Here, the first electronic device 100 can transmit information about a point of time when the at least one sub-supplementary information included in the supplementary information is output in the second electronic device 200 or the third electronic device 300 or both, when transmitting all the pieces of supplementary information.

For example, the first electronic device 100 can transmit a point in time of play, corresponding to specific sub-supplementary information, to the second electronic device 200 or the third electronic device 300 or both.

The second electronic device 200 or the third electronic device 300 or both can acquire supplementary contents relevant to the multimedia contents 30 on the basis of the supplementary information received from the first electronic device 100 at step S130.

The supplementary contents relevant to the multimedia contents 30 described in this document are contents corresponding to the supplementary information received from the first electronic device 100, and they refer to detailed contents or information relevant to the supplementary information.

For example, in case where the supplementary information is the brand name of a product worn by a performer appearing in the multimedia contents 30, the supplementary contents can be detailed contents relevant to the product of the brand name (for example, the price of the product, a store where the product is sold, and a representative image of the product). In another example, the supplementary information may be sport information, personality information, technical information or other information related to the displayed contents.

The second electronic device 200 or the third electronic device 300 or both can specify the received supplementary information itself as the supplementary contents, receive the supplementary contents from the outside on the basis of the received supplementary information, or specify specific contents existing within the second electronic device 200 or the third electronic device 300 or both (for example, the memory 230, 360) as the supplementary contents on the basis of the received supplementary information.

The step S130 is described in more detail in connection with other embodiments with reference to pertinent drawings.

The second electronic device 200 or the third electronic device 300 or both can output the acquired supplementary contents through the output unit 220, 350 at step S140.

For example, when specific sub-supplementary information corresponding to a specific point in time of play is received, the second electronic device 200 can acquire sub-supplementary contents corresponding to the specific sub-supplementary information and output the acquired sub-supplementary contents through the output unit 220.

For another example, when specific sub-supplementary information and information about the time when the specific sub-supplementary information is output are received from the first electronic device 100, the third electronic device 300 can acquire sub-supplementary contents corresponding to the specific sub-supplementary information before the received output time (for example, a point in time) is reached and output the acquired sub-supplementary contents through the output unit 350 when the received output time is reached.

FIG. 19 shows an example of the output supplementary contents.

For example, referring to FIG. 19, the second electronic device 200 can receive a brand name 34 (i.e., the supplementary information) from the first electronic device 100.

The second electronic device 200 can drive a web browser 33 and search for information about a product corresponding to the brand name 34 by using the brand name 34 as a search keyword through the web browser 33.

As a result of the search, the second electronic device 200 can display product information 38, comprising a product image 35 and product price information 36, on the display unit 221.

The step S140 is described in more detail in connection with other embodiments with reference to pertinent drawings.

Meanwhile, the second electronic device 200 or the third electronic device 300 or both can generate various control signals for controlling the first electronic device 100 at step S150.

For example, in case where the step S140 is performed and thus the supplementary contents are output to the display unit 221, the second electronic device 200 can generate a control signal to temporarily stop the play of the multimedia contents 30 which are being output by the first electronic device 100 in order to give a user the time taken to check or acquire the supplementary contents.

For another example, in case where the step S140 is performed and thus the supplementary contents are output to the display unit 221, the third electronic device 300 can generate a control signal to temporarily stop the play of the multimedia contents 30 in response to the amount of the supplementary contents to be output.

For example, if the amount of the supplementary contents to be output is less than a predetermined reference, the third electronic device 300 may does not generate the control signal. If the amount of the supplementary contents to be output is more than the predetermined reference, the third electronic device 300 can generate the control signal.

The second electronic device 200 or the third electronic device 300 or both can transmit the generated control signal to the first electronic device 100 at step S160.

The first electronic device 100 can receive the control signal from the second electronic device 200 or the third electronic device 300 or both and perform an operation corresponding to the received control signal at step S170.

For example, when a control signal to stop the play of the multimedia contents 30 is received from the second electronic device 100 or the third electronic device 300, the first electronic device 100 can temporarily stop the play of the multimedia contents 30.

Meanwhile, the second electronic device 200 or the third electronic device 300 or both can transmit a control signal to replay the multimedia contents 30 to the first electronic device 100 according to a user's command or a predetermined reference.

For example, if a predetermined time elapses after the control signal to stop the play of the multimedia contents 30 is transmitted, the third electronic device 300 can transmit a control signal to replay the multimedia contents 30 to the first electronic device 100.

Figure 20:
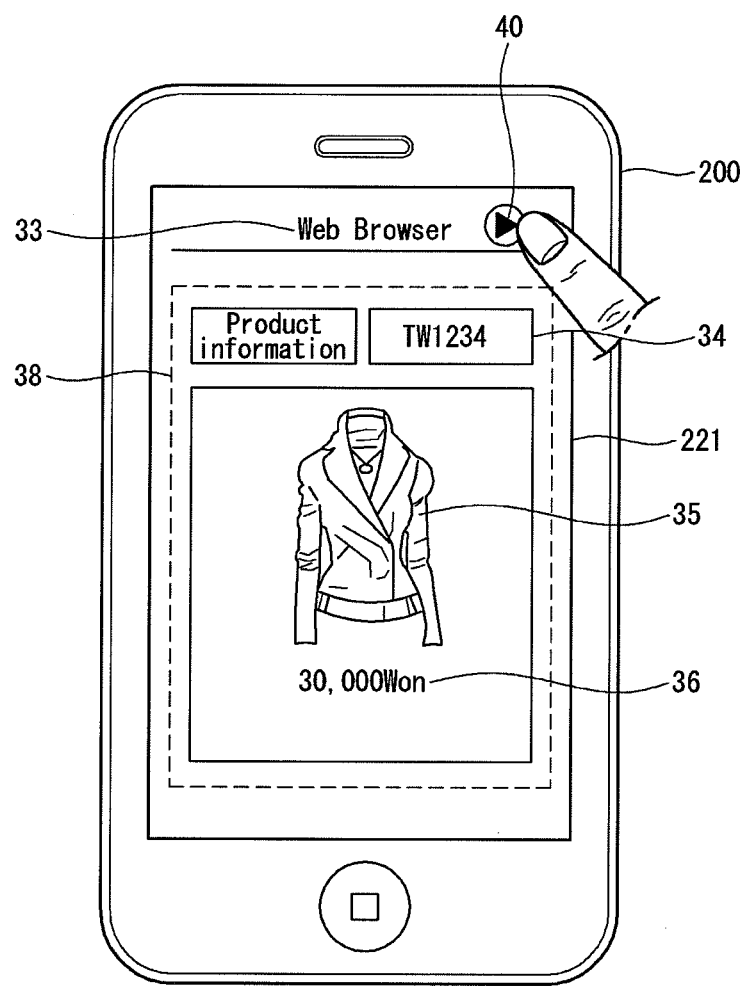
FIGS. 20 and 21 show examples of a screen which provides a soft key for generating a control signal.
Figure 21:
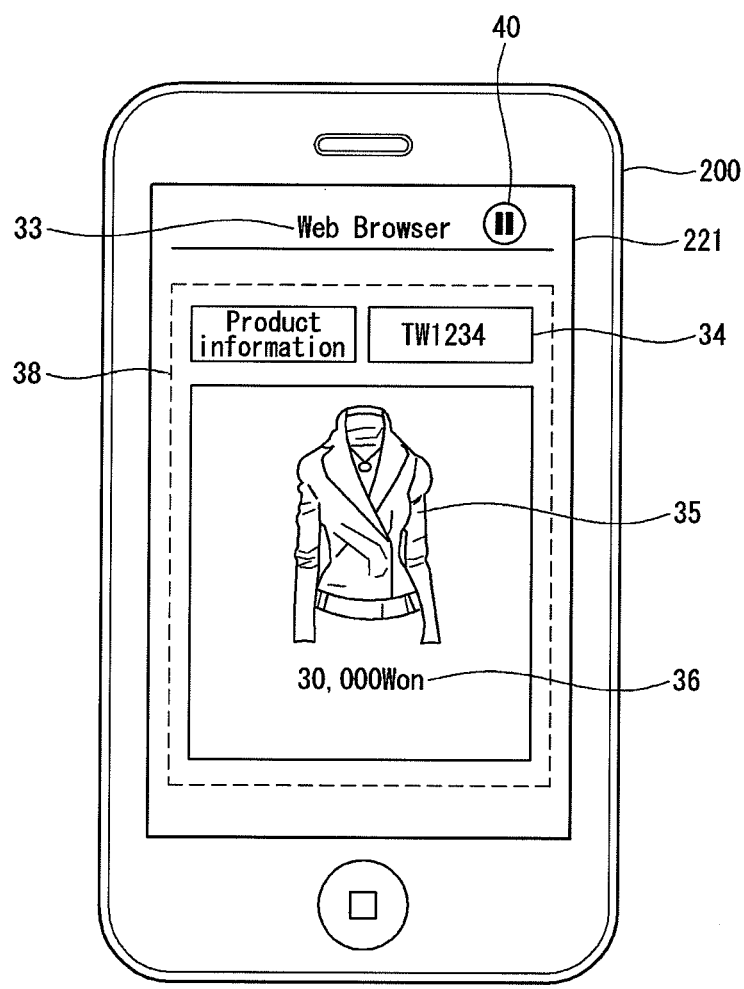

FIGS. 20 and 21 are diagrams showing examples of a screen which provides a soft key for generating a control signal.

For example, the second electronic device 200, as shown in FIG. 20, can provide the display unit 221 with a soft key 40 for generating a control signal to stop the play of the multimedia contents 30 or to play the multimedia contents 30.

When the second electronic device 200 automatically transmits a control signal to stop the play of the multimedia contents 30 to the first electronic device 100, the soft key 40 can be displayed in a form, such as that shown in FIG. 20.

When a user touches the soft key 40 of FIG. 20 with the play of the multimedia contents 30 being stopped, the second electronic device 200 can generate a control signal to play the multimedia contents 30 and transmit the generated control signal to the first electronic device 100.

After the control signal to play the multimedia contents 30 is transmitted, the soft key 40 can be changed and displayed in a form, such as that shown in FIG. 21.

Hereinafter, a variety of pertinent embodiments related to the step S130 of FIG. 13 are described in more detail with reference to FIGS. 22 to 42.

Figure 22:
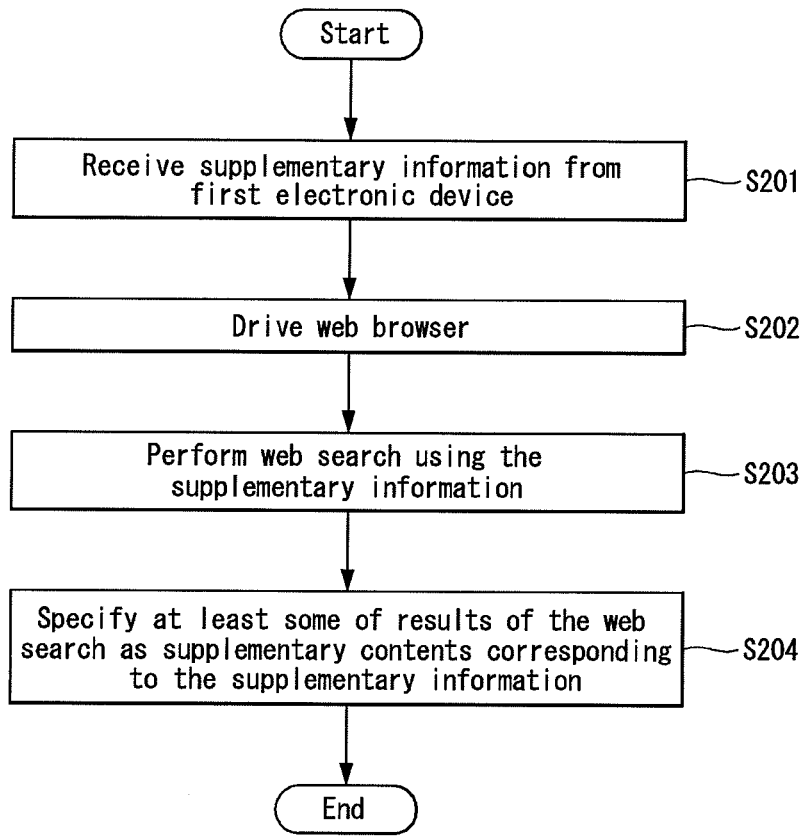
FIG. 22 is a detailed flowchart of the step S130 and shows an example in which the step S130 is performed.

FIG. 22 is a detailed flowchart of the step S130 and shows an example in which the step S130 is performed.

Referring to FIG. 22, as described above, the second electronic device 200 or the third electronic device 300 or both can receive the supplementary information relevant to the multimedia contents 30, being output by the first electronic device 100, from the first electronic device 100 at step S201.

When the supplementary information is received, the second electronic device 200 or the third electronic device 300 or both can drive the web browser at step S202.

The second electronic device 200 or the third electronic device 300 or both can perform a web search by using the web browser on the basis of the received supplementary information at step S203.

For example, as described above in connection with the first embodiment of this document, the second electronic device 200 or the third electronic device 300 or both can perform a web search by using at least some of the received supplementary information as a search keyword.

Figure 23:
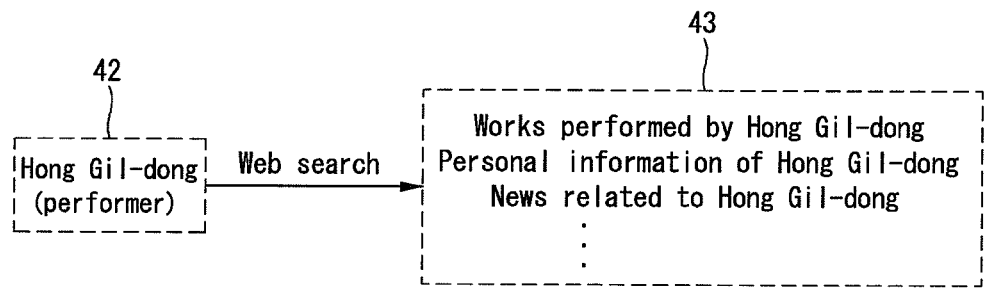
FIGS. 23 and 24 show examples of a web search using supplementary information.
Figure 24:
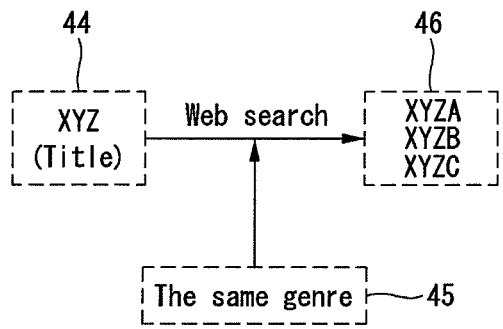

FIGS. 23 and 24 are diagrams showing examples of a web search using supplementary information.

For example, referring to FIG. 23, the second electronic device 200 or the third electronic device 300 or both can receive a name 42 of a performer, appearing in the multimedia contents 30, from the first electronic device 100 as the supplementary information (or sub-supplementary information).

The second electronic device 200 or the third electronic device 300 or both can perform a web search by using the name 42 called "Hong Gil-Dong" as a keyword and acquire a web search result 43 illustrated in FIG. 23.

For another example, referring to FIG. 24, the second electronic device 200 or the third electronic device 300 or both can receive a title 44 of the multimedia contents 30 from the first electronic device 100 as the supplementary information (or sub-supplementary information).

Here, the second electronic device 200 or the third electronic device 300 or both can perform the web search by not using only the title 44 as the search keyword, but adding options.

For example, as shown in FIG. 24, the second electronic device 200 or the third electronic device 300 or both can perform the web search by adding an option to instruct search into other contents belonging to the same genre 45 as the title 44 and acquire web search results 46 illustrated in FIG. 24.

The second electronic device 200 or the third electronic device 300 or both can specify at least some of the web search results as the supplementary contents corresponding to the supplementary information at step S204.

Figure 25:
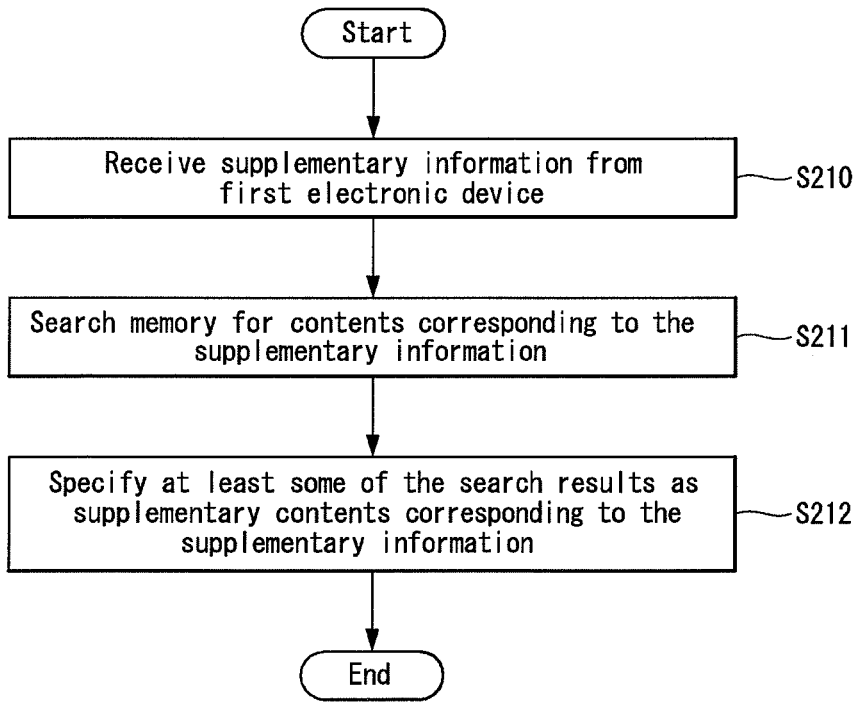
FIG. 25 is a detailed flowchart of the step S130 and shows another example in which the step S130 is performed.

FIG. 25 is a detailed flowchart of the step S130 and shows another example in which the step S130 is performed.

Referring to FIG. 25, as described above, the second electronic device 200 or the third electronic device 300 or both can receive the supplementary information relevant to the multimedia contents 30 being output by the first electronic device 100 from the first electronic device 100 at step S210.

The second electronic device 200 or the third electronic device 300 or both can search memory in which contents corresponding to the supplementary information are stored at step S211.

For example, the second electronic device 200 can acquire contents corresponding to the supplementary information by searching the memory 230.

For another example, the third electronic device 300 can acquire contents corresponding to the supplementary information by searching the memory 360.

The second electronic device 200 or the third electronic device 300 or both can specify at least some of the search results as the supplementary contents corresponding to the supplementary information at step S212.

Figure 26:
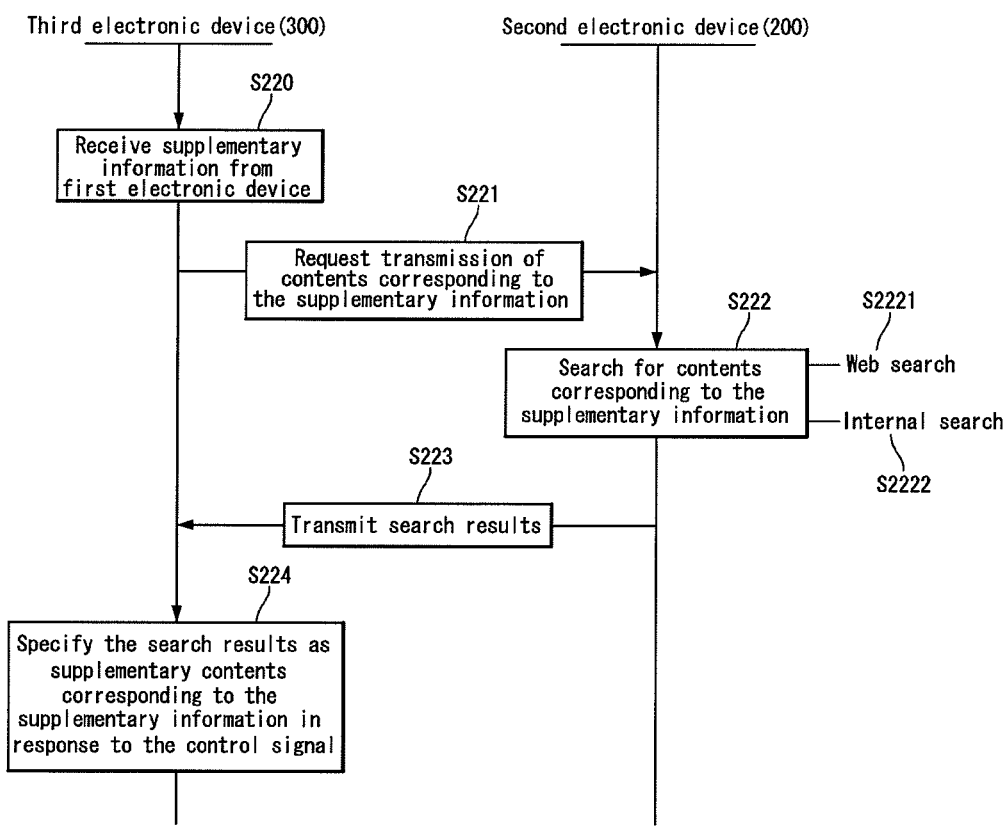
FIG. 26 is a detailed flowchart of the step S130 and shows yet another example in which the step S130 is performed.
Figure 27:
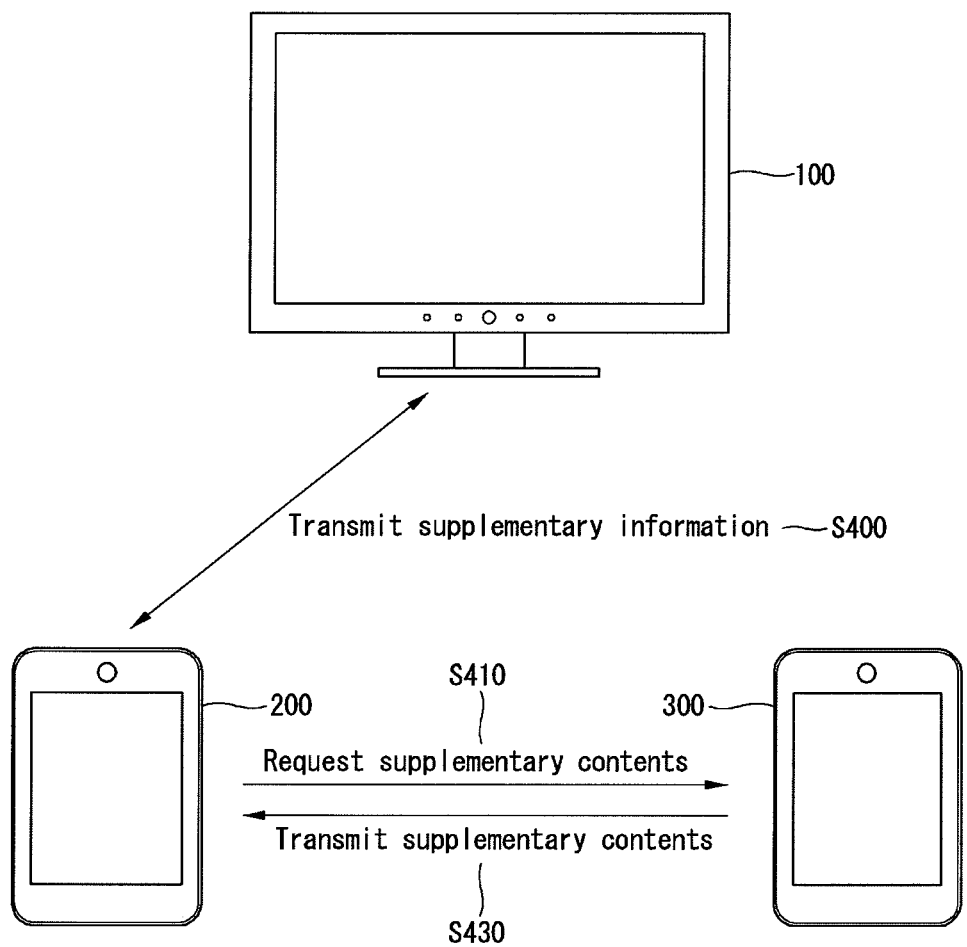
FIG. 27 is a diagram illustrating a concept in which the step S130 of FIG. 26 is performed.

FIG. 26 is a detailed flowchart of the step S130 and shows yet another example in which the step S130 is performed. FIG. 27 is a diagram illustrating a concept in which the step S130 of FIG. 26 is performed.

Referring to FIGS. 26 and 27, the third electronic device 300 can receive the supplementary information relevant to the multimedia contents 30 being output by the first electronic device 100 from the first electronic device 100 at step S220.

The third electronic device 300 can request the second electronic device 200 to transmit contents corresponding to the supplementary information at step S221.

To this end, the third electronic device 300 can transmit the supplementary information and a signal, requesting the transmission of contents corresponding to the supplementary information, to the second electronic device 200.

In response to the request of the third electronic device 300 at step S221, the second electronic device 200 can search for contents corresponding to the received supplementary information at step S222.

In performing the step S222, the second electronic device 200 can perform a web search at step S2221 as in the embodiment described with reference to FIG. 22 or can search internal memory at step S2222 as in he embodiment described with reference to FIG. 24.

The second electronic device 200 may acquire search results by performing both the web search and the internal memory search.

The second electronic device 200 can transmit search results, acquired by performing the step S222, to the third electronic device 300 at step S223.

The second electronic device 200 can specify at least some of the search results, received from the third electronic device 300, as supplementary contents corresponding to the supplementary information at step S224.

Figure 28:
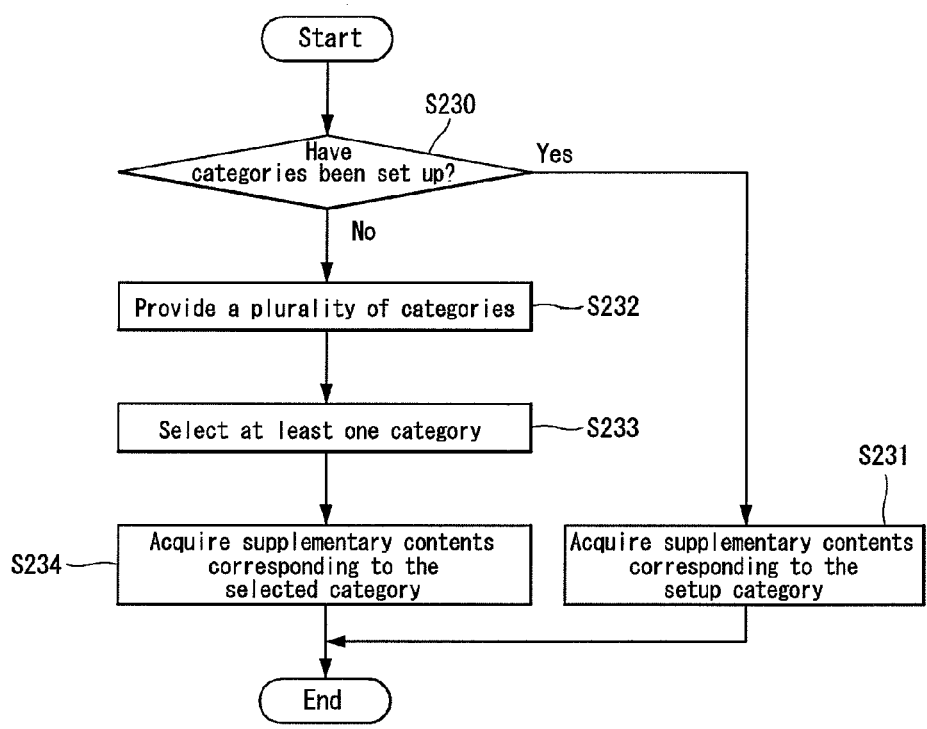
FIG. 28 is a detailed flowchart of the step S130 and shows further yet another example in which the step S130 is performed.

FIG. 28 is a detailed flowchart of the step S130 and shows further yet another example in which the step S130 is performed. FIGS. 29 to 42 are diagrams illustrating embodiments in which the step S130 of FIG. 28 is implemented.

Referring to FIG. 28, the second electronic device 200 or the third electronic device 300 or both can determine whether categories for acquiring the supplementary contents have been set up at step S230.

The categories for acquiring the supplementary contents relate to the type or field or both of supplementary contents which can be set up so that the second electronic device 200 or the third electronic device 300 or both can acquire the supplementary contents and provide the supplementary contents to a user in response to the multimedia contents 30.

That is, a variety of supplementary contents corresponding to specific supplementary information can be classified into a plurality of categories on the basis of specific criteria, such as a type, a field, a format, a supplier, and a source.

The second electronic device 200 or the third electronic device 300 or both can classify the categories for acquiring the supplementary contents on the basis of specific criteria and provide a user with a user interface for selecting a desired category.

Furthermore, the second electronic device 200 or the third electronic device 300 or both can provide a user with a user interface (UI) for setting up a variety of items relevant to the reception of the supplementary information, the acquisition of the supplementary contents, and the output of the supplementary contents.

Hereinafter, embodiments of the user interface for setup related to the supplementary contents are described with reference to FIGS. 29 to 40. The user interface is described below on the basis of the second electronic device 200. It is to be understood that the user interface described herein can be likewise provided by the third electronic device 300.

Figure 29:
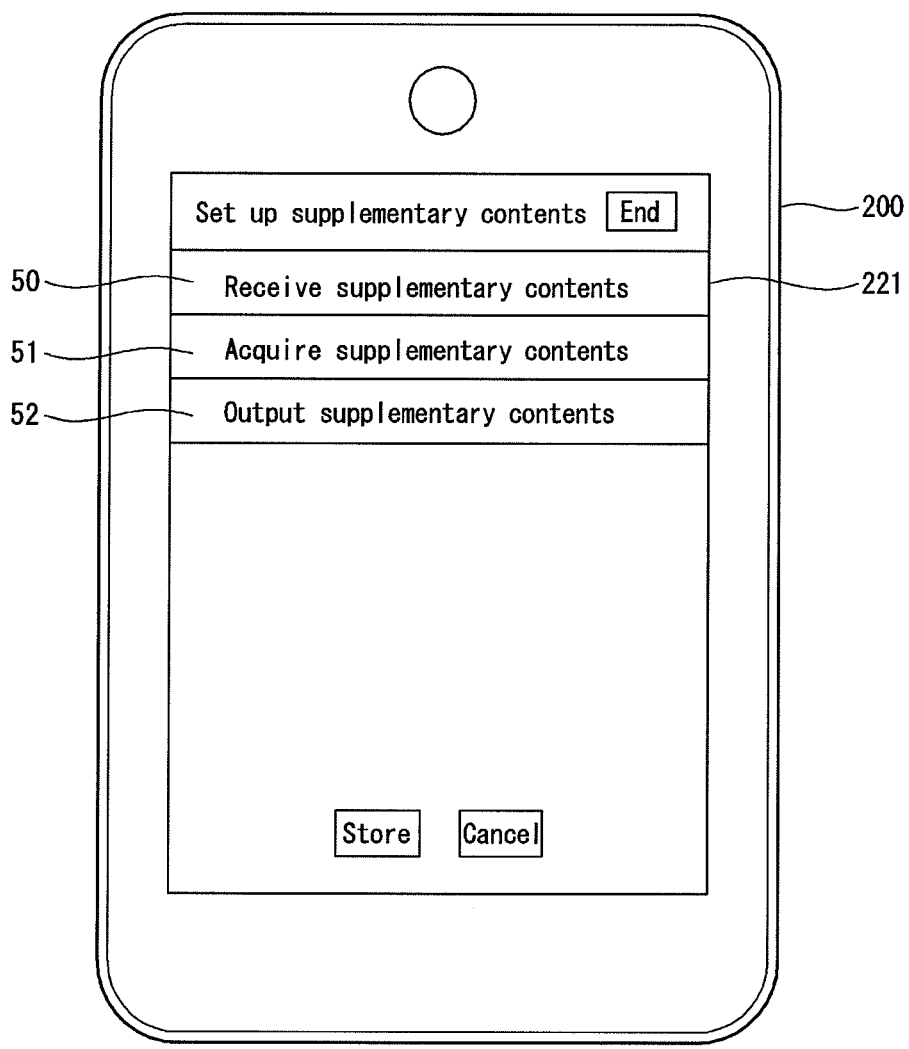
FIGS. 29 to 42 illustrate embodiments in which the step S130 of FIG. 28 is implemented.

FIG. 29 shows an initial screen of the user interface for supplementary contents setup.

Referring to FIG. 29, the second electronic device 200 or the third electronic device 300 or both can provide the initial screen of a user interface for setup relevant to the supplementary contents, comprising a menu 50 for setting up supplementary information reception through communication with the first electronic device 100, a menu 51 for setting up supplementary contents acquisition, and a menu 52 for setting up supplementary contents output.

The menu 50 for setting up supplementary information reception and the menu 51 for setting up supplementary contents acquisition are described below. The menu 52 for setting up supplementary contents output is described later.

Figure 30:
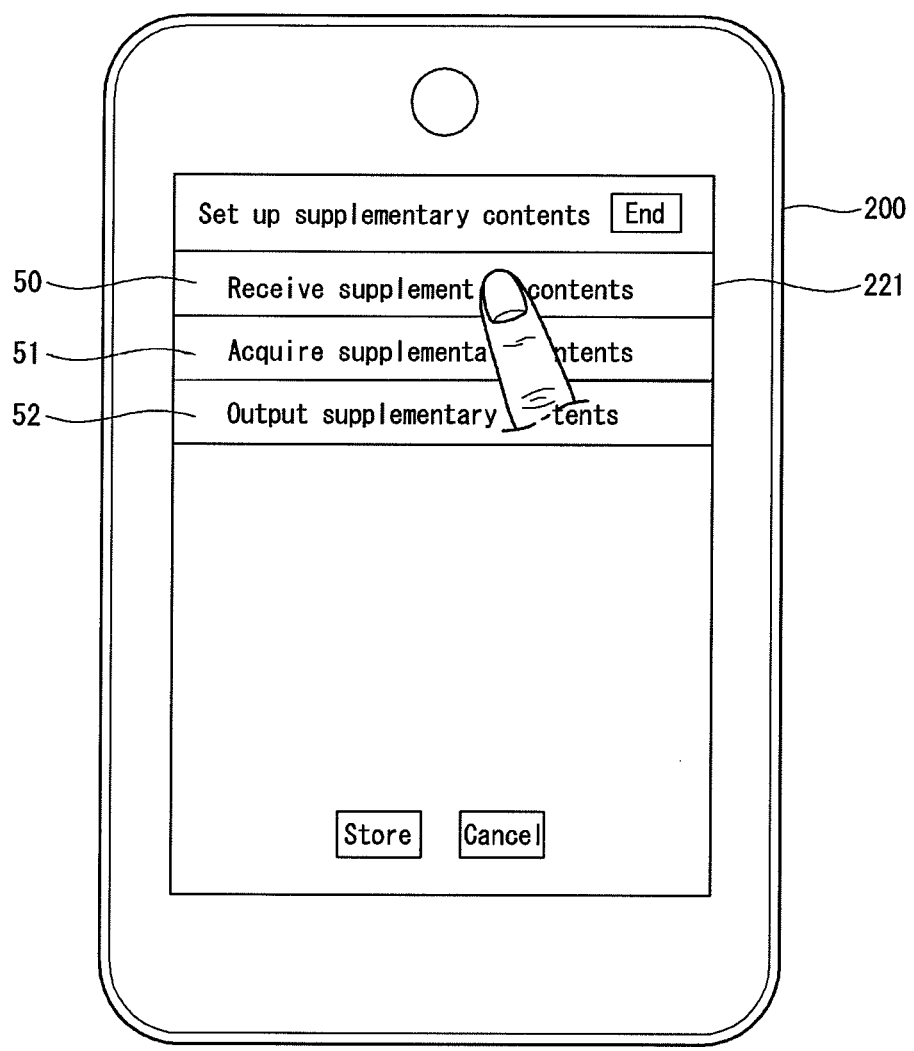

In case where the display unit 221 of the second electronic device 200 is implemented by using a touch screen as shown in FIG. 30, a user can select the menu 50 for setting up supplementary information reception by touching the menu 50 for setting up supplementary information reception, displayed in the display unit 221.

Figure 31:
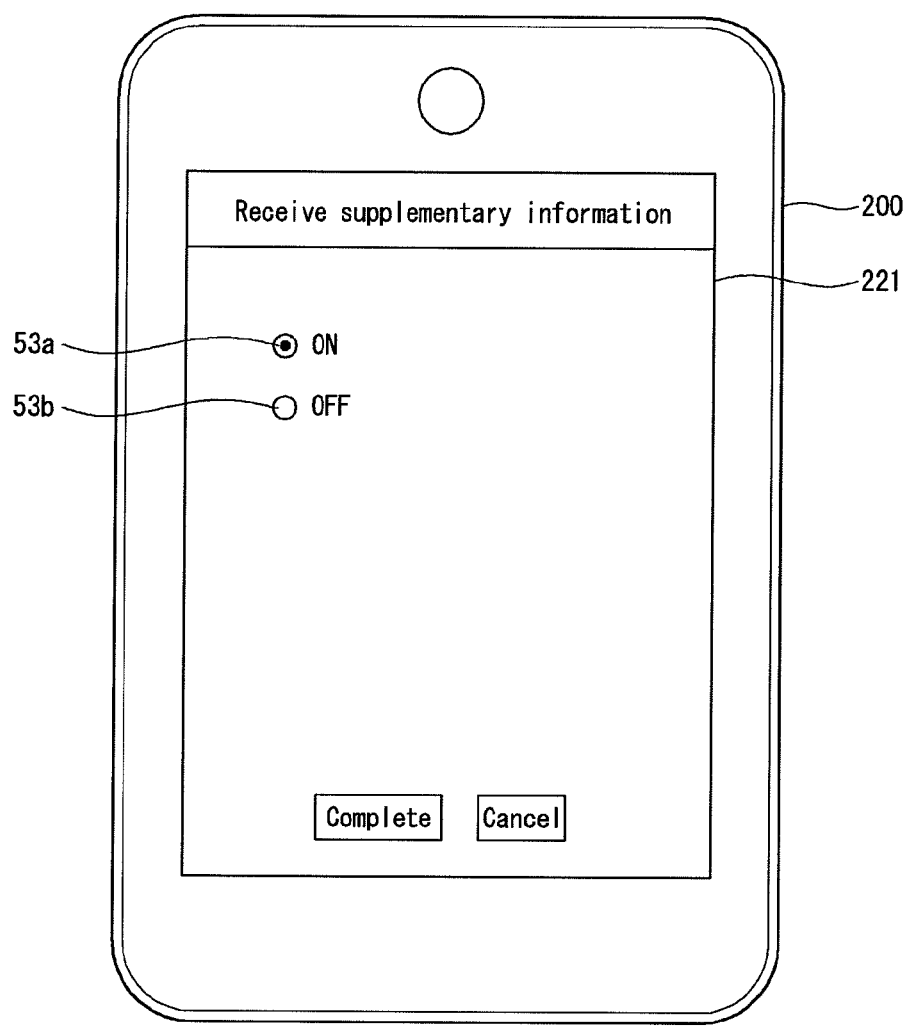

When the menu 50 for setting up supplementary information reception is selected, the controller 240 of the second electronic device 200 can provide a setup screen, such as that shown in FIG. 31, to the display unit 221.

The setup screen of FIG. 31 provides selection items for turning ON or OFF the supplementary information reception function.

The controller 240 can provide a check box 53a corresponding to the ON of the supplementary information reception function and a check box 53b corresponding to the OFF of the supplementary information reception function through the setup screen of FIG. 31.

A user can turn ON or OFF the supplementary information reception function by selecting any one of the check boxes 53a and 53b.

When the supplementary information reception function is in the on state, the controller 240 can receive the supplementary information from the first electronic device 100 through the communication unit 210.

Furthermore, when the supplementary information reception function is in the off state, the controller 240 does not receive the supplementary information from the first electronic device 100.

A user can store contents currently set up in relation to the supplementary information reception function by selecting a completion button 54a shown in FIG. 31.

When a user selects a cancel button 54b of FIG. 31, the controller 240 can maintain contents set up in relation to the supplementary information reception function before entering the setup screen of FIG. 31.

Figure 32:
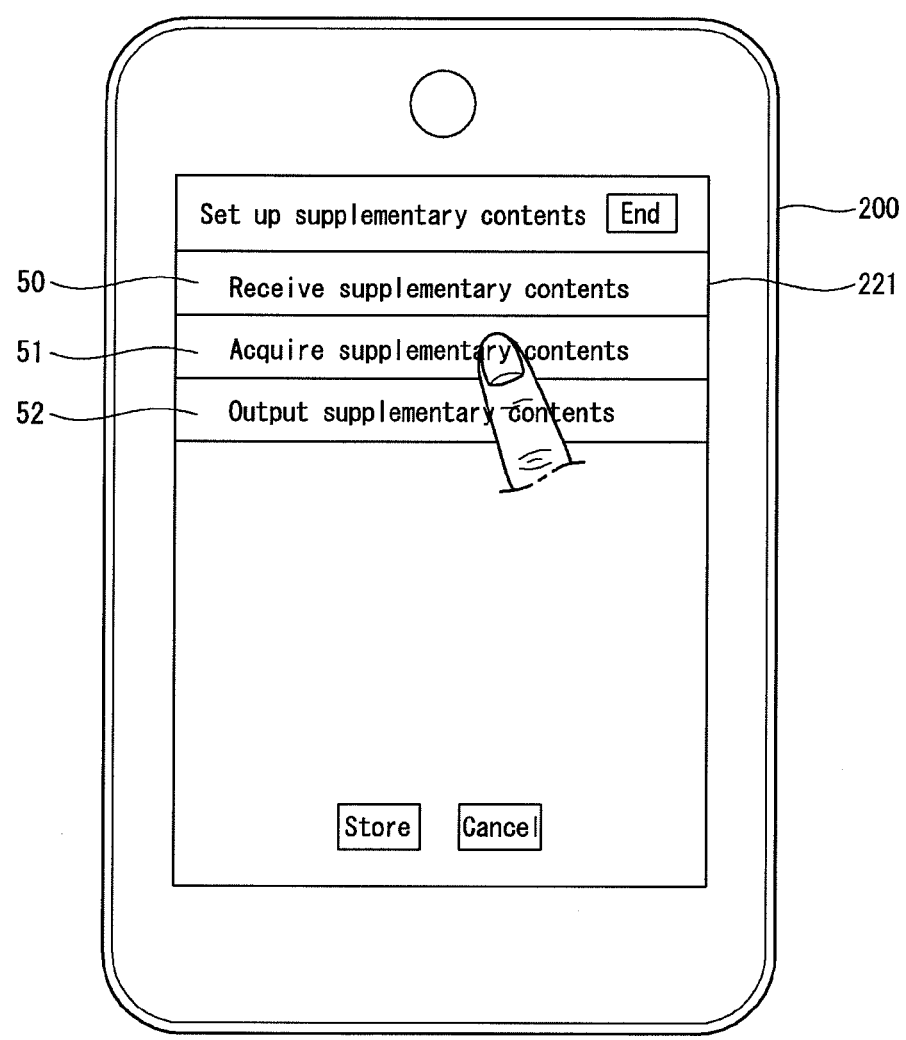

Further, as shown in FIG. 32, a user can select the menu 51 for setting up supplementary contents acquisition displayed in the display unit 221.

Figure 33:
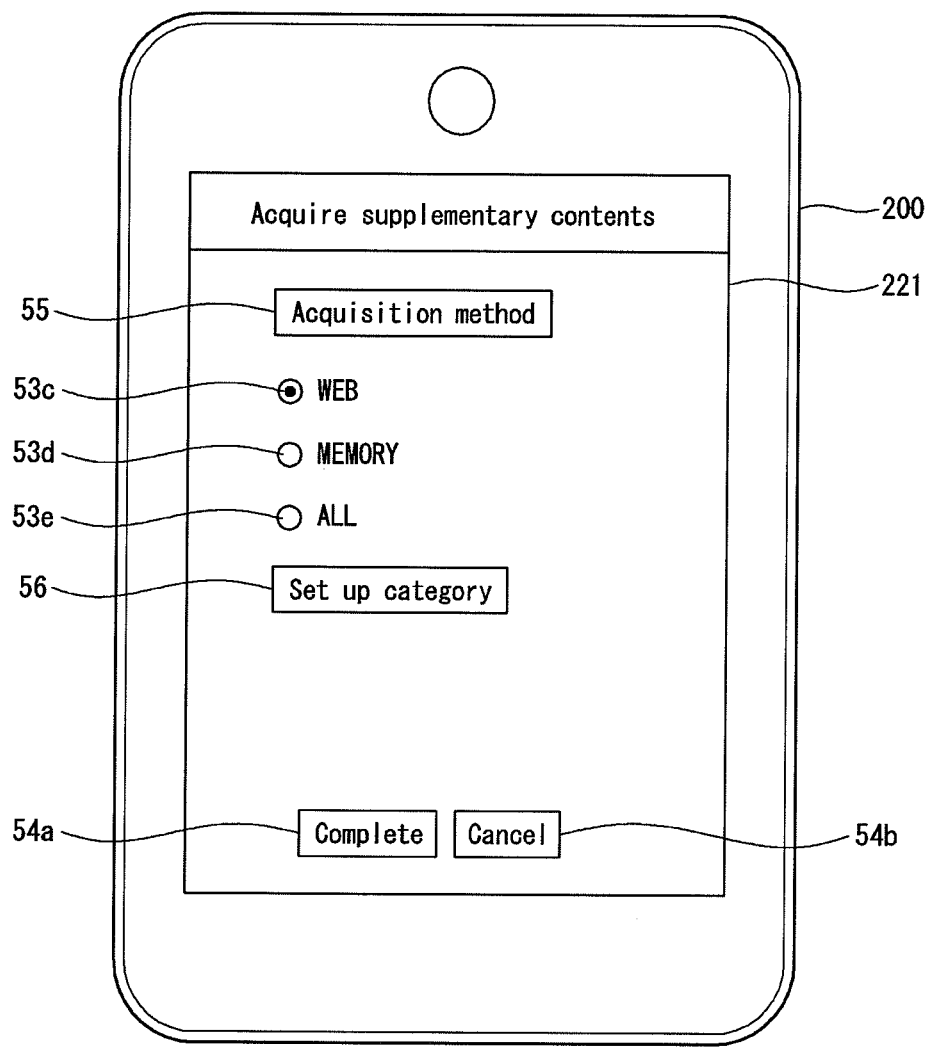

When the menu 51 for setting up supplementary contents acquisition is selected, the controller 240 of the second electronic device 200 can provide a setup screen, such as that shown in FIG. 33, to the display unit 221.

The setup screen related to the acquisition of the supplementary contents, as shown in FIG. 33, can comprise a menu 55 for setting up a method of acquiring the supplementary contents and a menu 56 for setting up a category on which the supplementary contents will be acquired.

The acquisition method setup menu 55 can comprise a variety of submenus 53c, 53d, and 53e as shown in FIG. 33.

The first submenu 53c is a menu for acquiring the supplementary contents through a web search.

The second submenu 53d is a menu for acquiring the supplementary contents by searching the memory 230 included in the second electronic device 200.

The third submenu 53e is a menu for acquiring the supplementary contents by using both the web search and the memory 230.

Even in the setup screen of FIG. 33, a user can set up a desired acquisition method by selecting any one of the first to third submenus 53c, 53d, and 53e provided together with check boxes, as in the setup screen for receiving the supplementary information in FIG. 31.

The menu 56 for setting up a category is a menu for allowing a user to acquire only supplementary contents corresponding to a desired category.

If not supplementary contents for all categories, but only supplementary contents for a specific category set up by a user are acquired, the time that it takes to acquire supplementary contents can be reduced. Further, the complexity of a screen, occurring because complex supplementary contents are provided, can be reduced.

Figure 34:
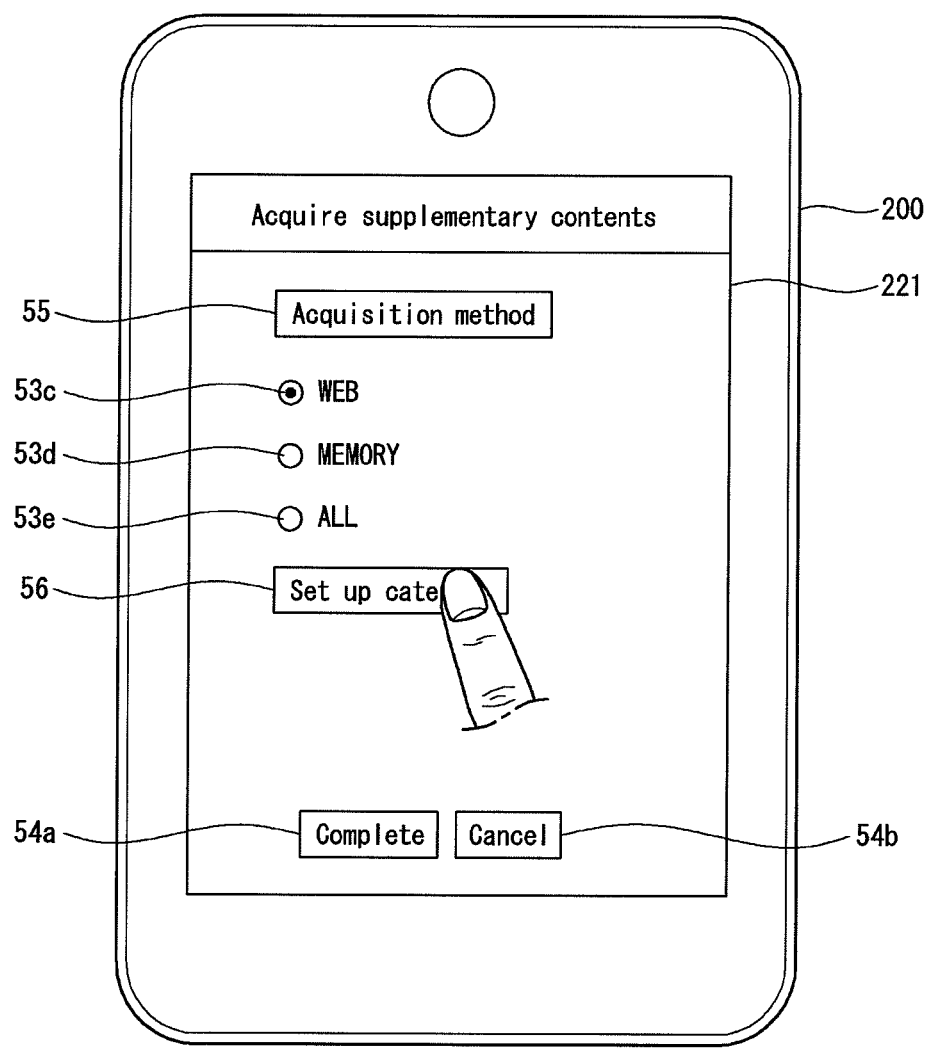

As shown in FIG. 34, a user can enter the category setup screen by selecting the menu 56 for setting up a category.

Meanwhile, as described later, in case where, after a user enters the category setup screen, information about a category setup operation for acquiring the supplementary contents is not received from the user, the controller 240 can set up an operation so that the supplementary contents for all categories are acquired by default.

Figure 35:
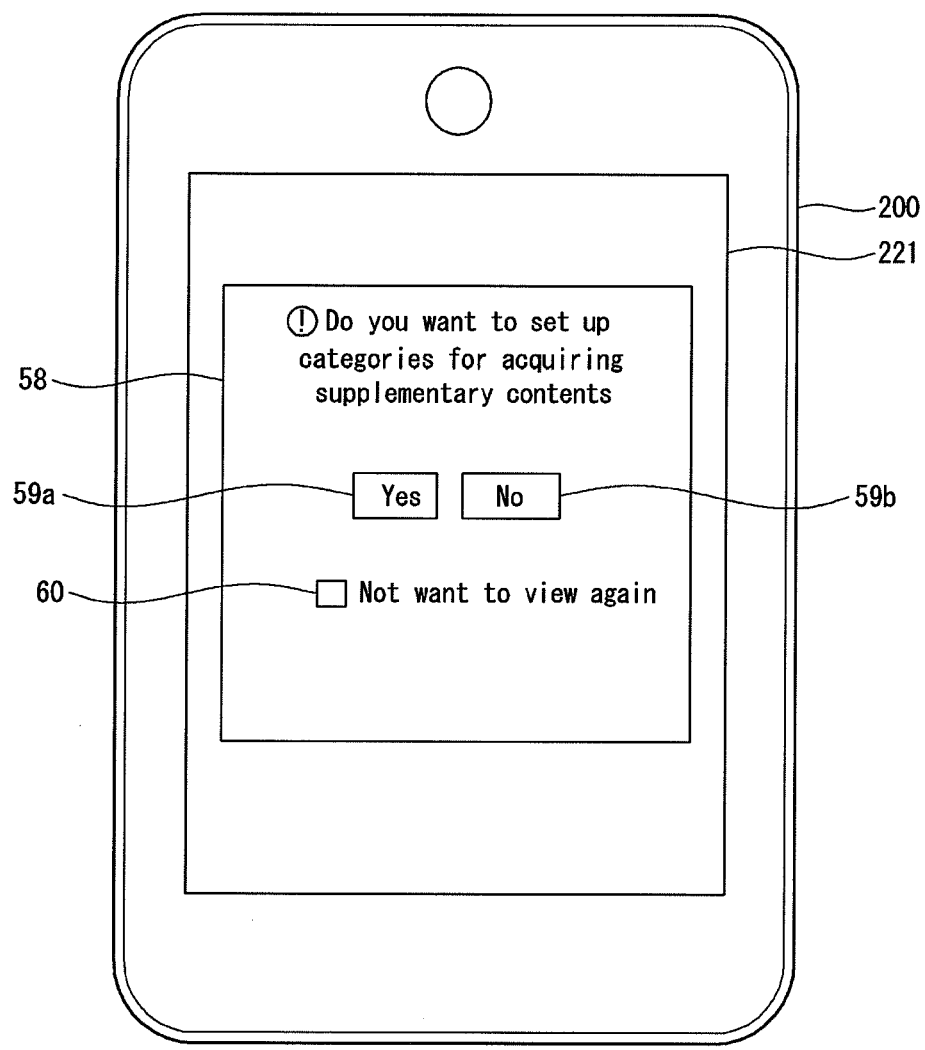

When a user enters the category setup screen, the controller 240 of the second electronic device 200 can provide a popup window 58, such as that shown in FIG. 35.

The popup window 58 is provided when the menu 56 for setting up a category is selected, and popup window 58 asks a user's intention for the acquisition of the supplementary contents.

The popup window 58 can comprise a <Yes> button 59a for continuing a category setup operation for acquiring supplementary contents and a <No> button 59b for stopping a category setup operation.

The popup window 58 can further comprise a check box 60 for no longer displaying the popup window 58.

When the category setup screen is entered again after the check box 60 is checked, the popup window 58 is not provided.

Figure 36:
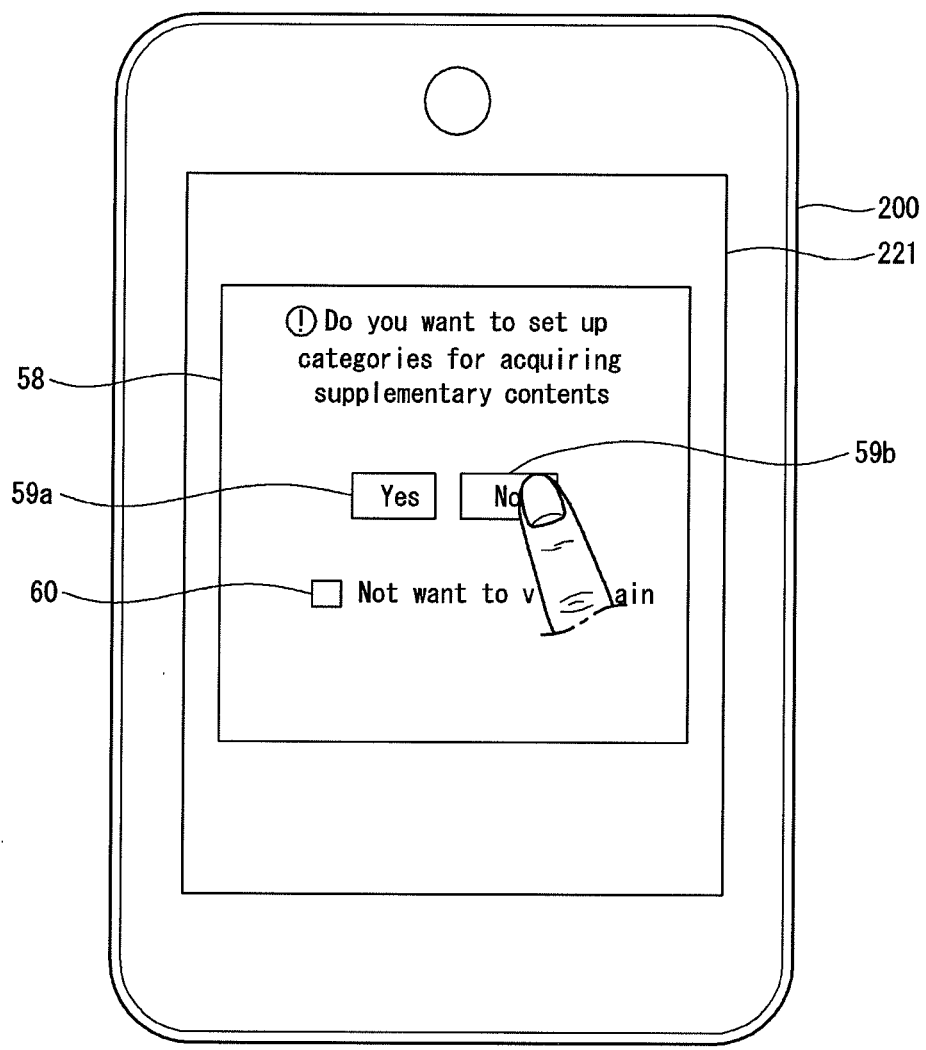
Figure 37:
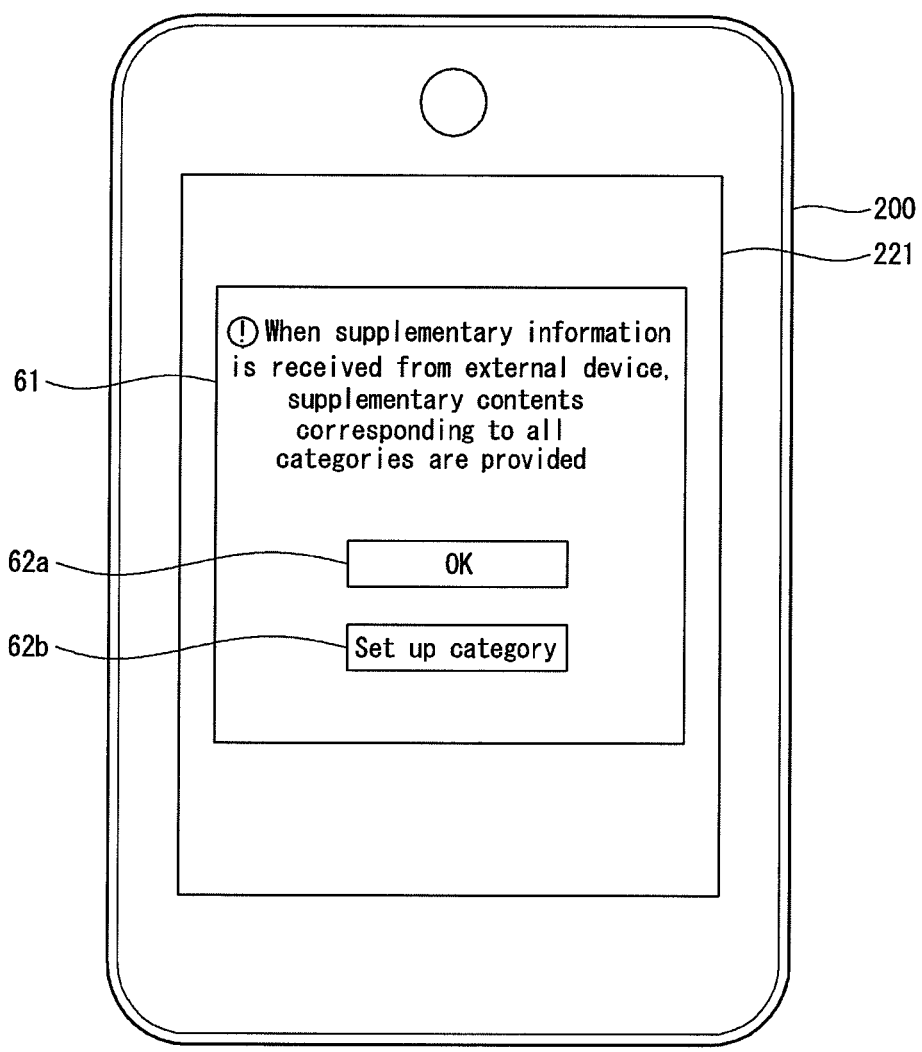

Meanwhile, as shown in FIG. 36, when a user touches the <No> button 59b included in the popup window 58, the controller 240 can provide a popup window 61 shown in FIG. 37.

That is, in case where the category setup operation does not go forward, the controller 240 can set up an operation so that the supplementary contents for all the categories are acquired and inform a user of the operation through the popup window 61.

The popup window 61 can comprise an OK button 62a and a category setup button 62b.

An operation can be set up so that when a user selects the OK button 62a, the popup window 61 disappears and the supplementary contents for all the categories are acquired.

Further, when a user selects the category setup button 62b, a screen for a detailed category setup operation can be entered as described later with reference to FIGS. 39 and 40.

Figure 38:
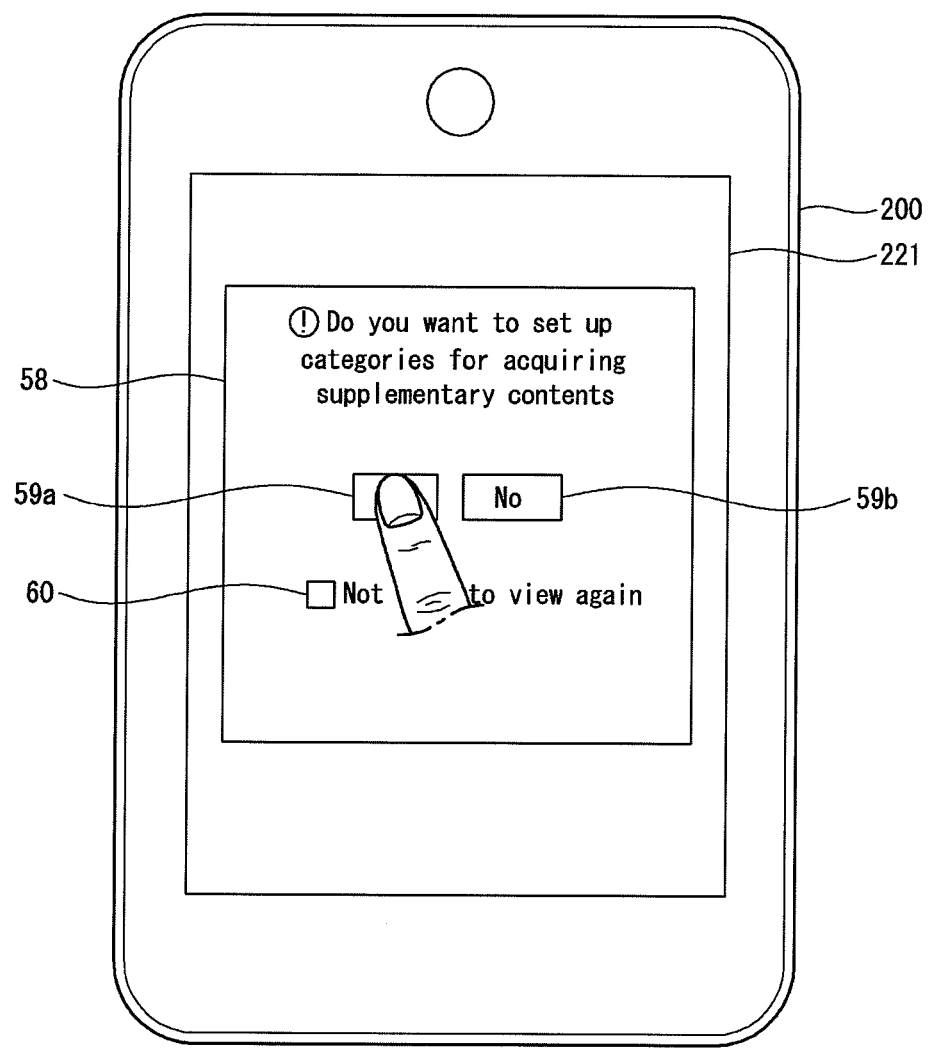
Figure 39:
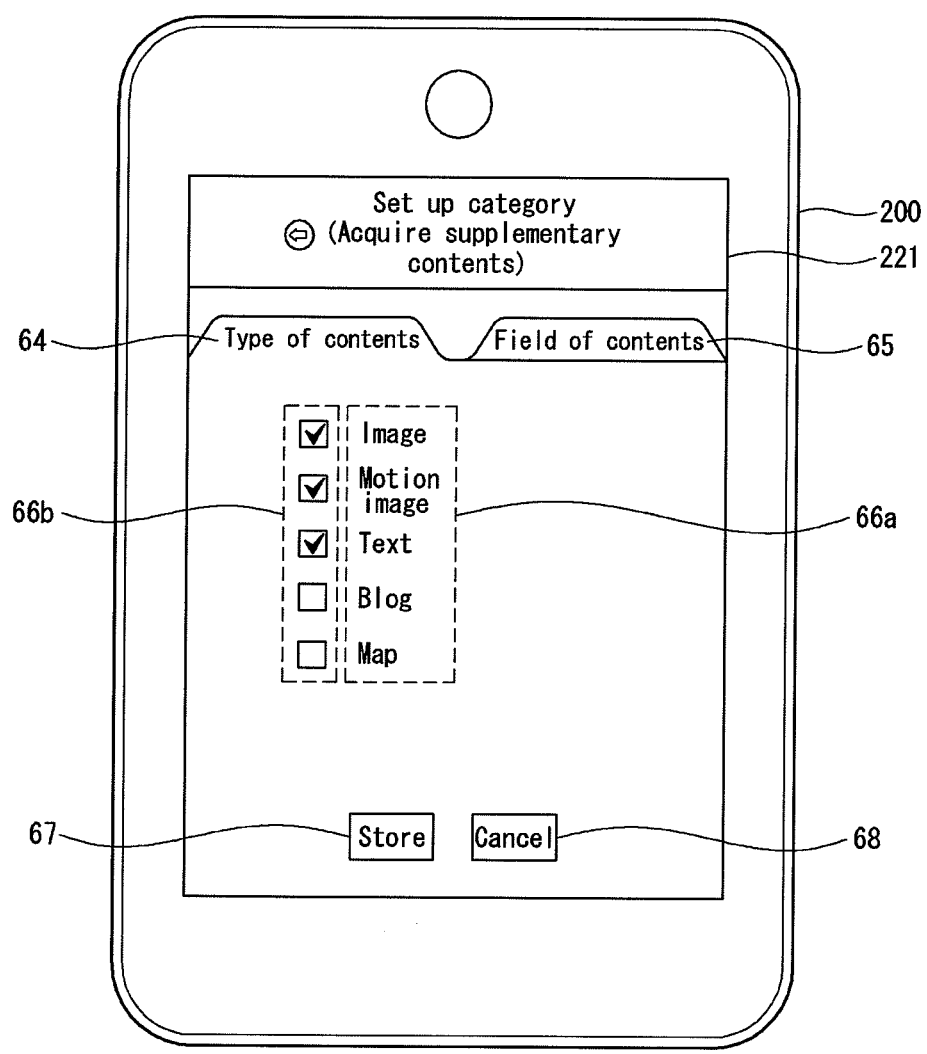

Meanwhile, when a user selects the <Yes> button 59a included in the popup window 58 of FIG. 38, a screen for a detailed category setup operation, such as that shown in FIG. 39, can be entered.

For example, the screen for the detailed category setup operation shown in FIG. 39 can provide a first tab 64 for setting up categories relating to the type of contents and a second tab 65 for setting up categories relating to the field of contents.

A user can set up categories relating to the type of contents or the field of contents by touching the first tab 64 and the second tab 65 using a finger.

For example, FIG. 39 shows the screen for setting up categories relating to the type of contents. The type of contents can comprise various kinds of contents, such as images, motion images, text, blogs, and maps, as shown in FIG. 39.

The screen for setting up categories relating to the type of contents can display category names 66a corresponding to respective check boxes 66b for setting up categories relating to the type of contents.

A user can select a desired category in relation to the type of contents by touching at least one of the check boxes 66b.

Figure 40:
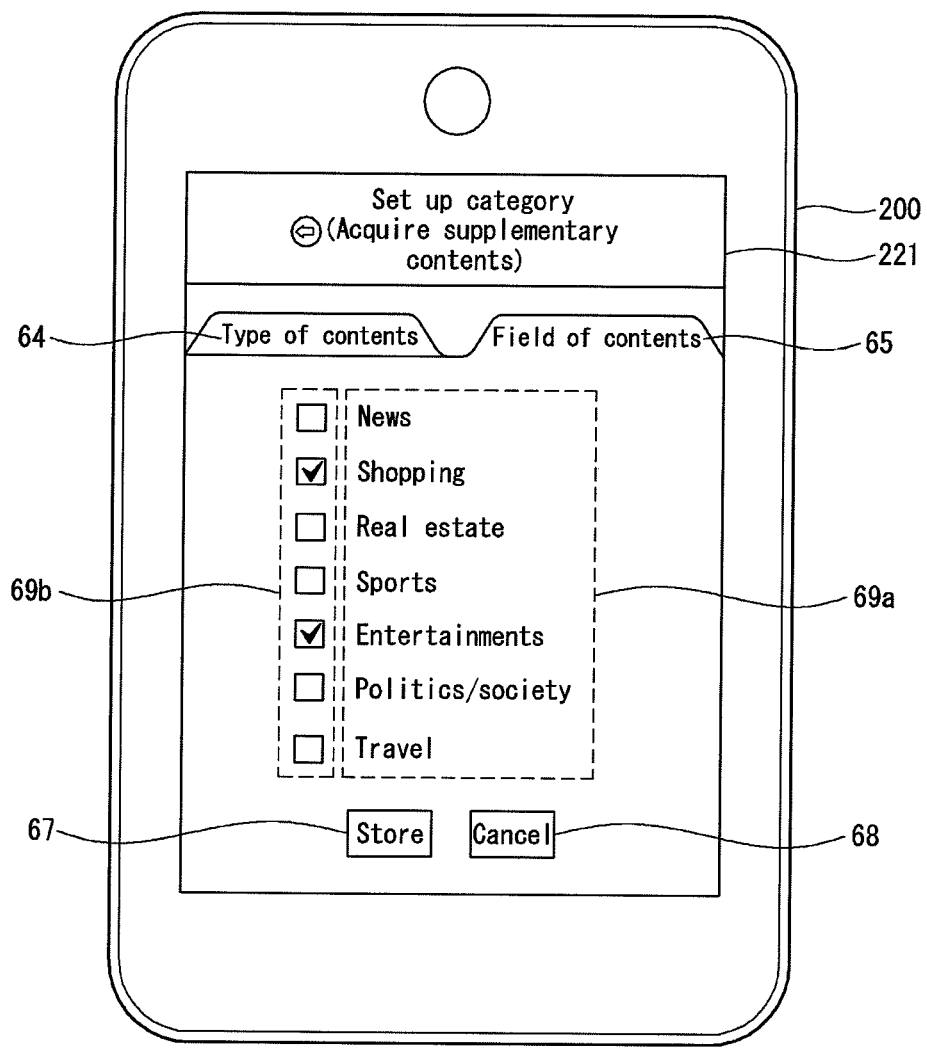

For another example, FIG. 40 shows an example of a screen for setting up categories relating to the field of contents. The field of contents can comprise various fields of contents, such as news, shopping, real estate, sports, entertainments, politics/society, and travel, as shown in FIG. 40.

The screen for setting up categories relating to the field of contents can display category names 69a corresponding to respective check boxes 69b for setting up categories relating to the field of contents, like the screen for setting up categories relating to the type of contents shown in FIG. 39.

A user can select a desired category in relation to the field of contents by touching at least one of the check boxes 69b.

Referring to FIGS. 39 and 40, a user can store items set up so far by selecting a storage button 67 or can cancel items set up so far and then return to previously setup items by selecting a cancel button 68.

As described above, a user can set up a variety of items related to the supplementary contents using a variety of the options.

The second electronic device 200 or the third electronic device 300 or both can determine whether categories for acquiring the supplementary contents have been set up through the above-described user interface at step S230.

If, as a result of the determination at step S230, the categories for acquiring the supplementary contents have been set up, the second electronic device 200 or the third electronic device 300 or both can acquire supplementary contents corresponding to the categories set up at step S231.

A method of acquiring supplementary contents corresponding to the setup categories can be various.

For example, as described above, the second electronic device 200 or the third electronic device 300 or both can acquire supplementary contents corresponding to the setup categories through at least one of a web search and internal memory search.

For another example, the second electronic device 200 or the third electronic device 300 or both can acquire supplementary contents corresponding to the setup categories by requesting the supplementary contents from the other electronic device.

Here, the second electronic device 200 or the third electronic device 300 or both can request supplementary information, received from the first electronic device 100, and supplementary contents corresponding to the setup categories by transmitting both the supplementary information and information about the setup categories to the other electronic device.

If, as a result of the determination at step S230, the categories for acquiring the supplementary contents have not been set up, the second electronic device 200 or the third electronic device 300 or both can provide a plurality of categories which can be selected by a user at step S232.

For example, the controller 240 of the second electronic device 200 can provide the category setup screens, described above with reference to FIGS. 35 to 40, so that a user can select a desired category.

Figure 41:
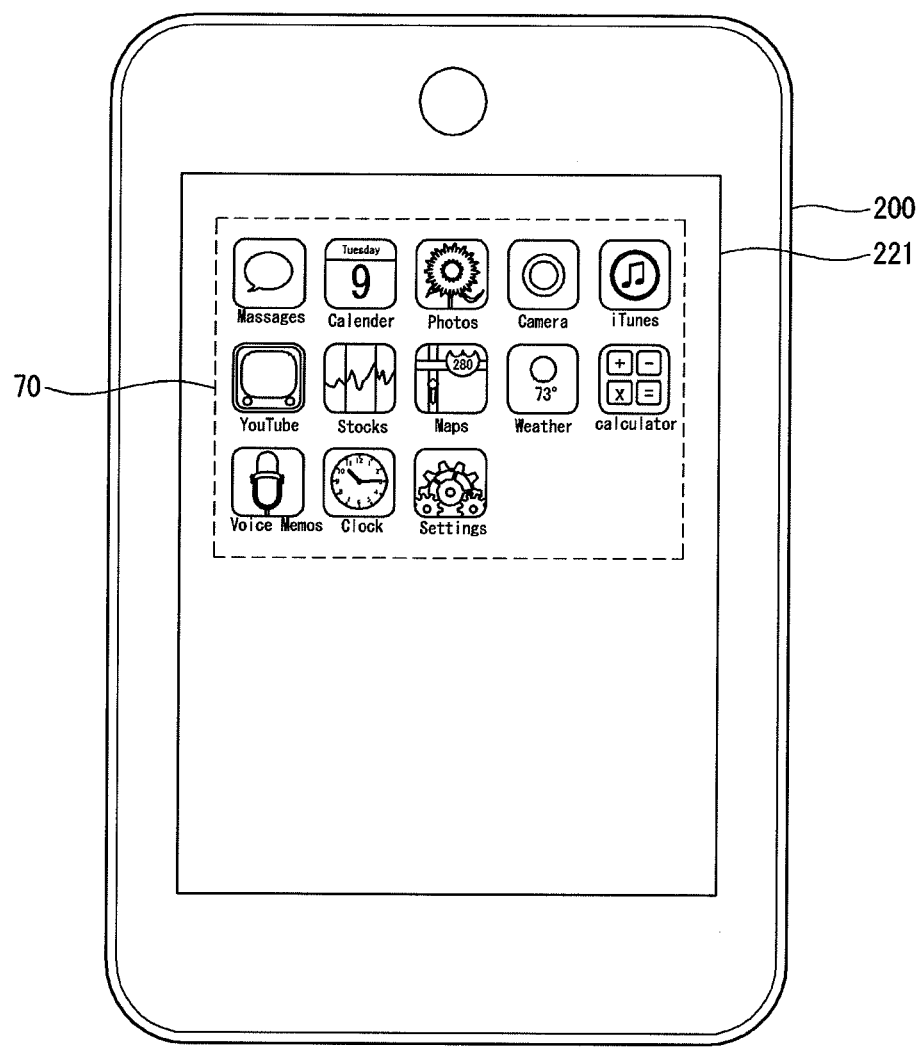

FIG. 41 shows an example of a screen which can be provided before the step S232 is performed in the second electronic device 200.

The second electronic device 200, as shown in FIG. 41, can provide an idle screen displaying a plurality of icons 70.

Figure 42:
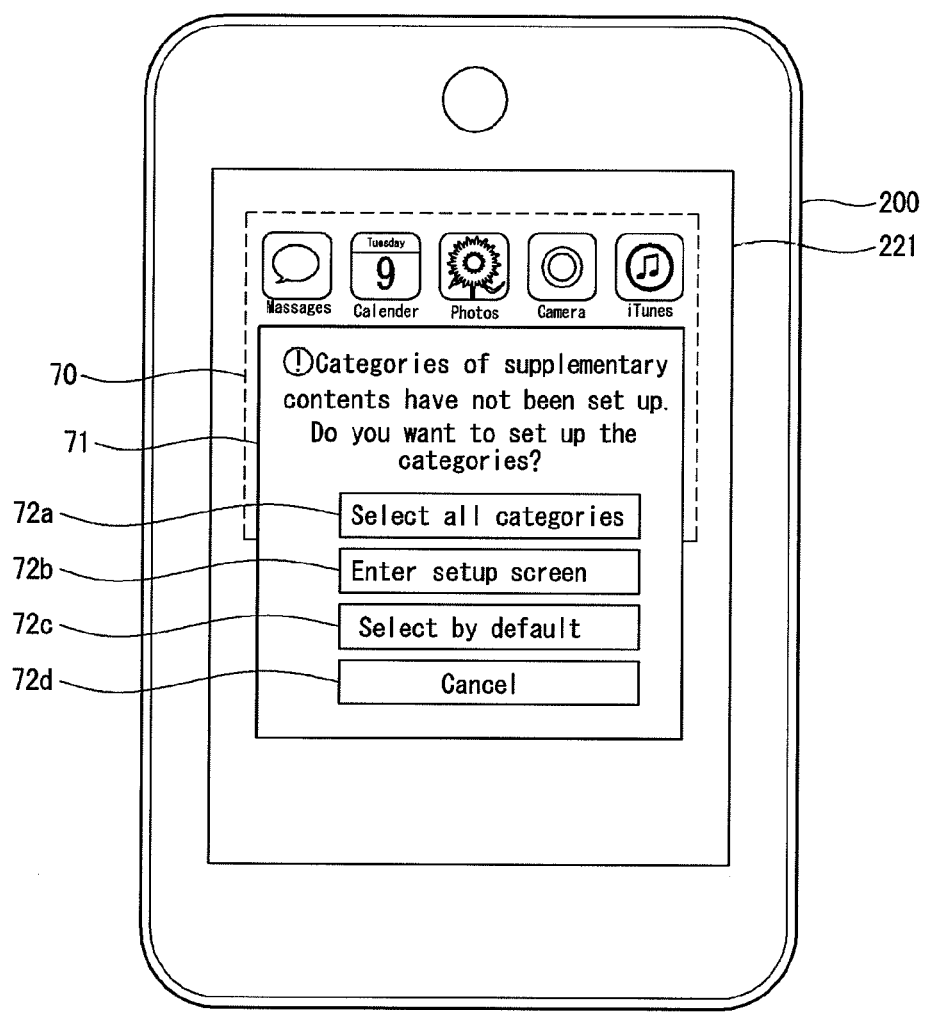

The controller 240 of the second electronic device 200 can provide a popup window 71 of FIG. 42 to the display unit 221 as a preparation step of performing the step S232 in the idle screen state of FIG. 41.

The popup window 71 of FIG. 42 can play the role of a user interface for calling a user's attention to a current state and receiving various commands relevant to a category setup operation for supplementary contents from the user.

For example, as shown in FIG. 42, the popup window 71 can comprise a menu 72a for receiving a command to acquire the supplementary contents for all the categories, a menu 72b for receiving a command to instruct entry into the setup screens of FIGS. 39 and 40, a menu 72c for receiving a command to acquire the supplementary contents for categories by default, a cancel menu 72d, and so on.

Categories acquired by default can be predetermined by a manufacturer of the second electronic device 200, from among all the categories, or can comprise all the categories.

A user can execute a desired function by touching any one of the menus 72a, 72b, 72c, and 72d included in the popup window 71.

The second electronic device 200 or the third electronic device 300 or both can receive a selection signal for at least one of the plurality of categories, provided at step S232, at step S233.

For example, the second electronic device 200 can receive a selection signal for at least one of the plurality of categories through the category setup screens shown in FIGS. 39 and 40.

For another example, the second electronic device 200 may receive a selection signal for all the categories or a selection signal for categories set up by default, through the popup window 71 shown in FIG. 42.

The second electronic device 200 or the third electronic device 300 or both can acquire supplementary contents corresponding to the at least one category, selected at step S233, at step S234. The step S234 is identical with or similar to the step S231.

Hereinafter, various embodiments related to the step S140 of FIG. 13 are described in detail with reference to FIGS. 43 to 67.

The step S140 can be performed after the step S130 is performed.

Meanwhile, in case where supplementary information received from the first electronic device 100 comprises pieces of supplementary information, the steps S130 and S140 may be sequentially performed on first sub-supplementary information and then sequentially performed on second sub-supplementary information.

First, an embodiment relating to an output setup operation of the supplementary contents provided in the initial screen of the user interface for the setup operation relating to the supplementary contents shown in FIG. 29 is described.

Figure 43:
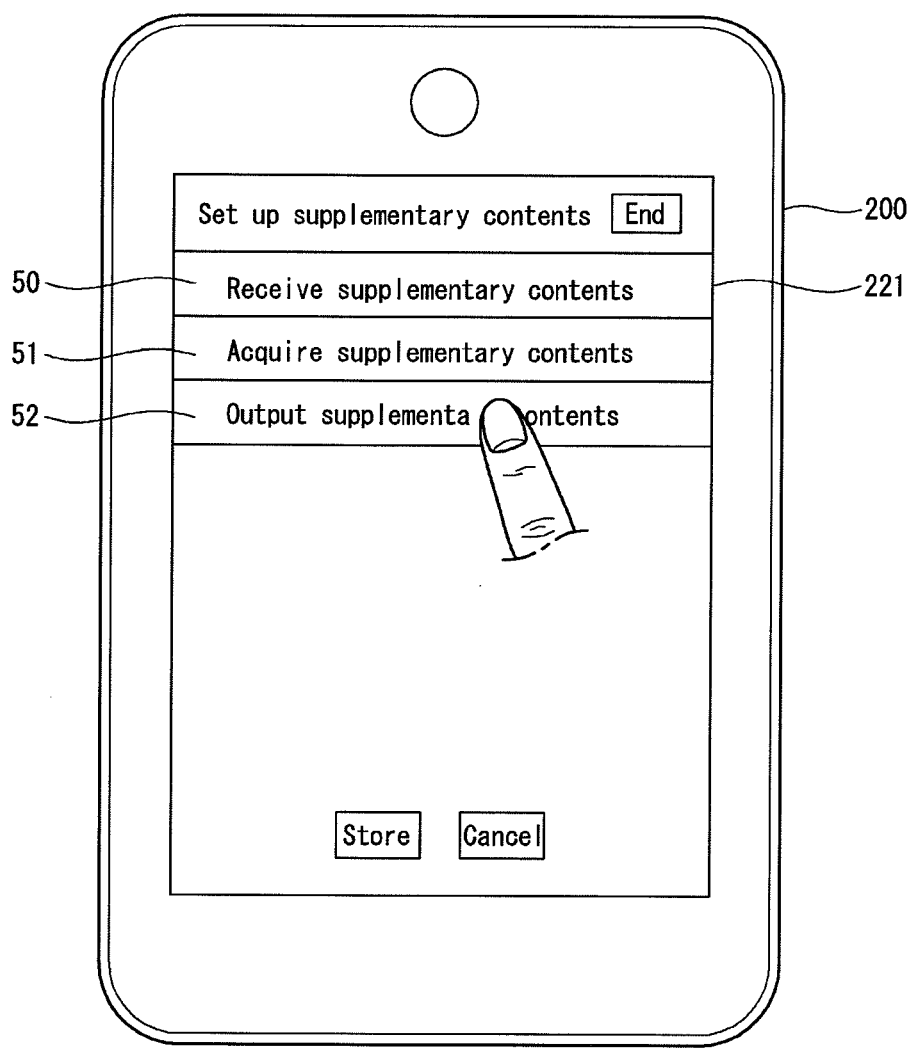
FIGS. 43 and 44 show examples an example in which a menu for supplementary contents output setup is selected and a screen provided accordingly, respectively.
Figure 44:
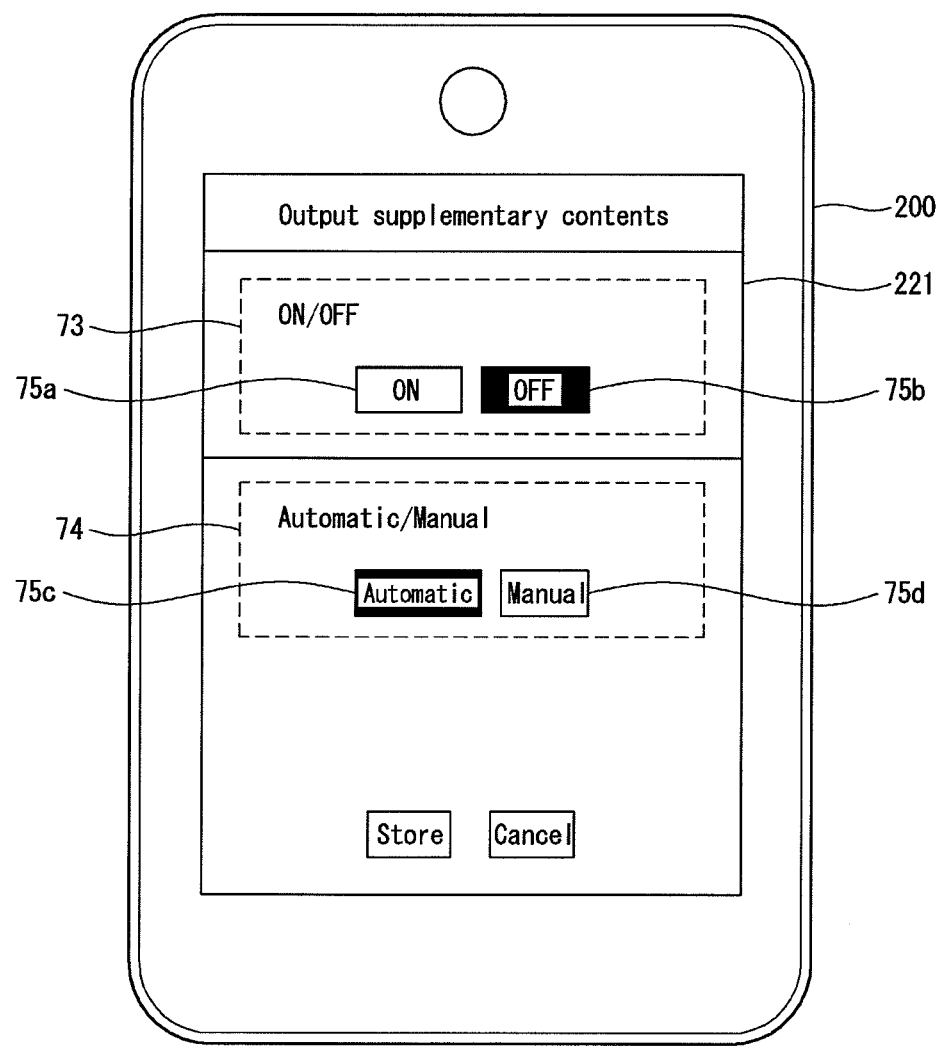

FIGS. 43 and 44 show examples in which a menu for setting up the output of supplementary contents is selected and a screen provided accordingly, respectively. A user can select a menu 52 for the supplementary contents output setup as shown in FIG. 43.

When the user selects the menu 52, the controller 240 of the second electronic device 200 can provide a setup screen relating to the output of the supplementary contents to the display unit 221, as shown in FIG. 44.

A setup screen relating to the output of the supplementary contents can comprise a region 73 for setting up the on/off of the output of the supplementary contents and a region 74 for detailed setup relating to the output of the supplementary contents.

The region 73 for setting up the on/off of the output of the supplementary contents can provide a button 75a for turning on the supplementary contents output function and a button 75b for turning off the supplementary contents output function.

When the supplementary contents output function is in the on state, the second electronic device 200 can output the acquired supplementary contents using a variety of methods to be described later.

When the supplementary contents output function is in the off state, the second electronic device 200 may not provide the supplementary contents output function even through the supplementary contents are acquired.

The setup screen of FIG. 44 shows that the supplementary contents output function is in the off state.

FIGS. 45 to 50 show setup screens relating to the output of supplementary contents.

Figure 45:
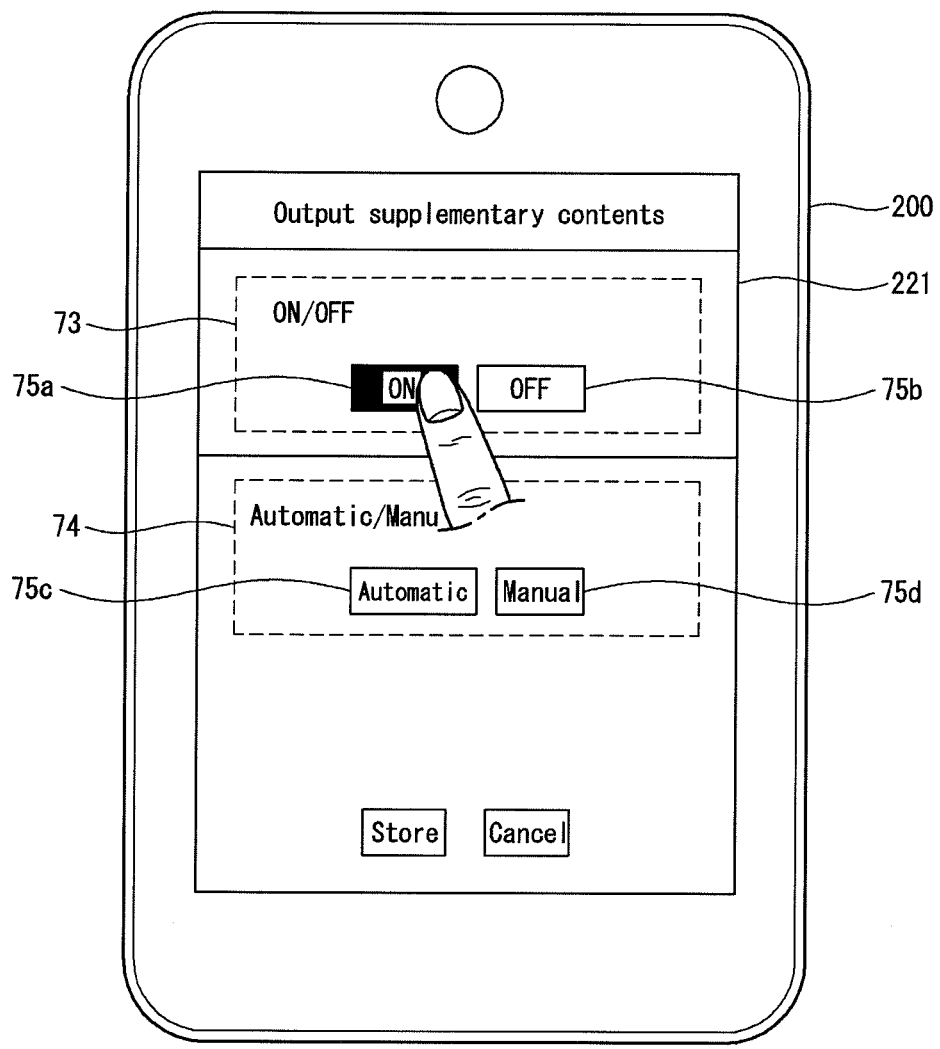
FIGS. 45 to 50 illustrate setup screens relating to the output of supplementary contents.

As shown in FIG. 45, a user can turn on the supplementary contents output function by selecting the button 75a for turning on the supplementary contents output function.

Further, the region 74 for detailed setup relating to the output of the supplementary contents can comprise a button 75c for automatically setting up various items relating to the output of the supplementary contents and a button 75d for enabling a user to manually set up various items relating to the output of the supplementary contents.

The setup screen of FIG. 44 shows the screen in which various items relating to the output of the supplementary contents are automatically set up.

Figure 46:
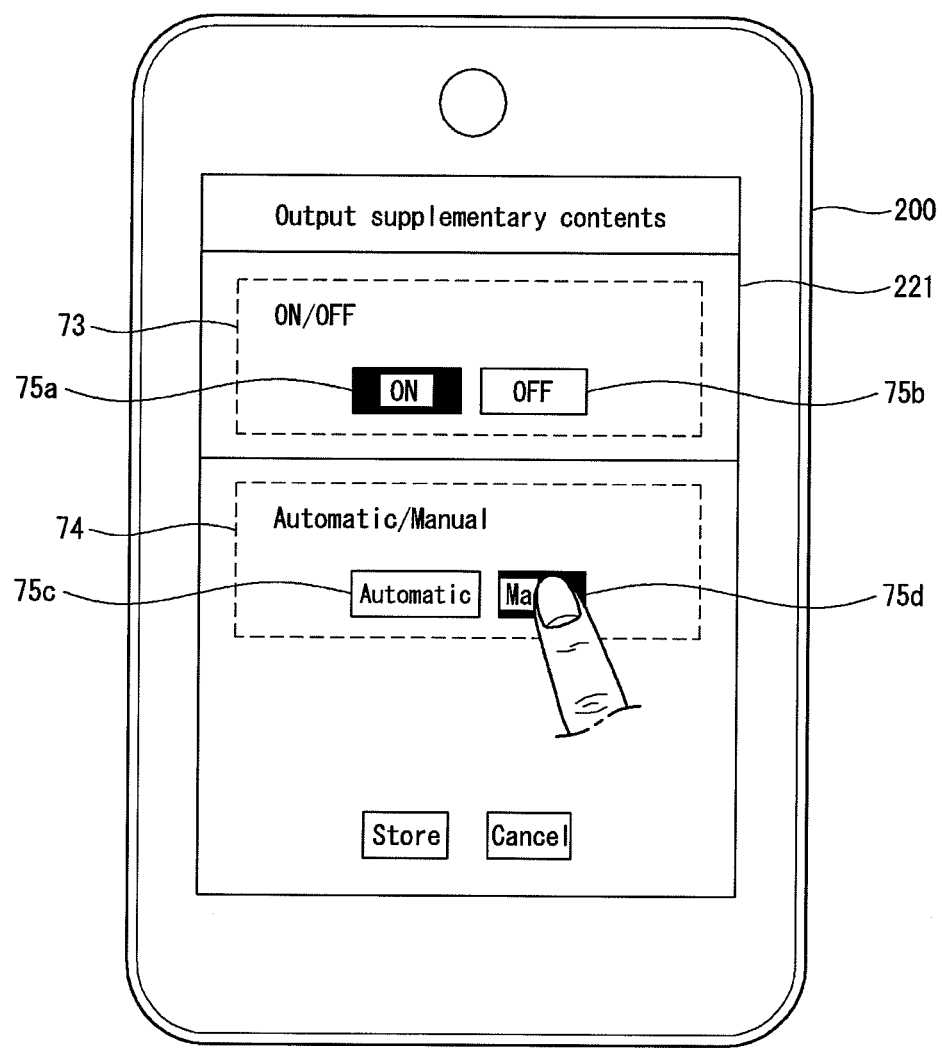

A user can select the button 75d for manual setup, as shown in FIG. 46.

Figure 47:
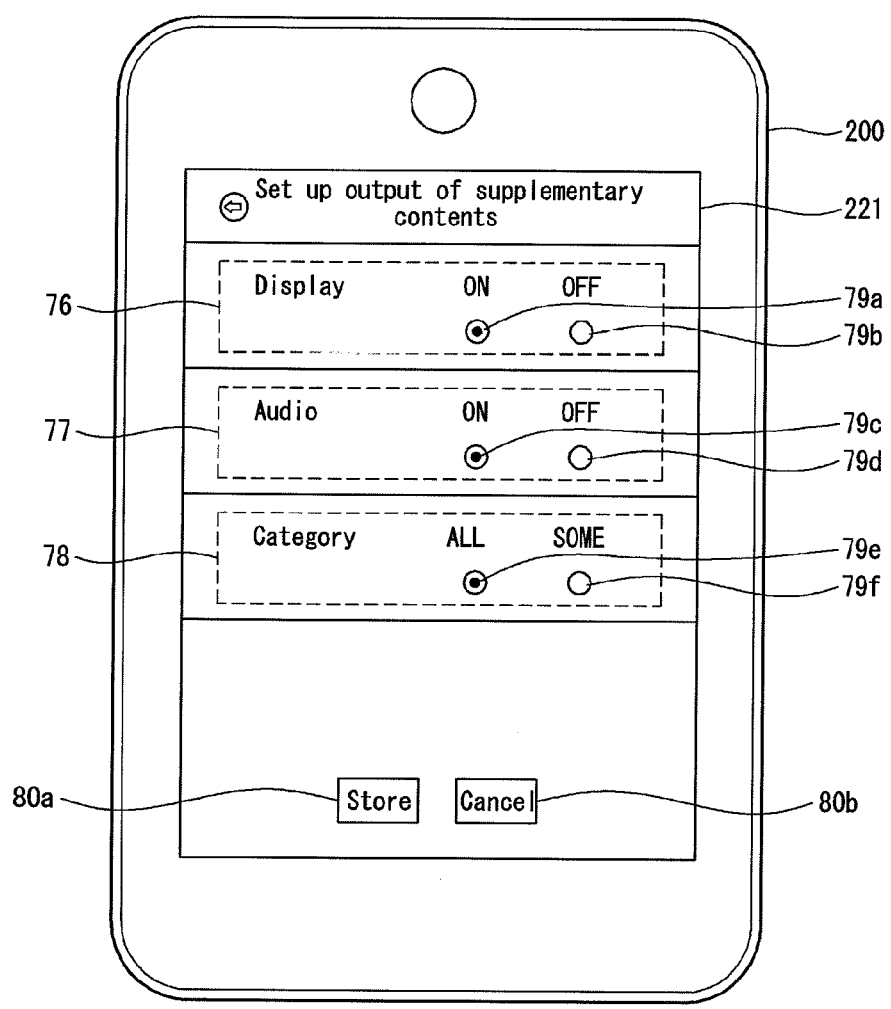

When the user selects the button 75d for manual setup, the controller 240 can enter a screen for setting up the output of the supplementary contents shown in FIG. 47.

For example, the screen for setting up the output of the supplementary contents shown in FIG. 47 can comprise a display setup region 76, an audio setup region 77, and a category setup region 78.

The display setup region 76 can comprise buttons 79a and 79b respectively corresponding to display ON and OFF.

A user can turn on or off the function of outputting the supplementary contents to the display unit 221 by selecting any one of the buttons 79a and 79b for the display ON and OFF.

The audio setup region 77 can comprise buttons 79c and 79d corresponding to respective audio ON and OFF.

A user can turn on or off the function of outputting the supplementary contents to the audio output unit 222 by selecting any one of the buttons 79c and 79d for the audio ON and OFF.

The category setup region 78 can comprise a button 79e for setting up the output of supplementary contents corresponding to all categories and a button 79f for setting up the output of supplementary contents corresponding to some of the categories.

A user can perform the setup operation for outputting all supplementary contents corresponding to all the categories by selecting the overall category output button 79e.

Meanwhile, in case where an operation for acquiring supplementary contents corresponding to some of the categories has been set up through the setup screen relating to the acquisition of the supplementary contents, the button 79e may be inactivated so that button 79e cannot be selected.

Figure 48:
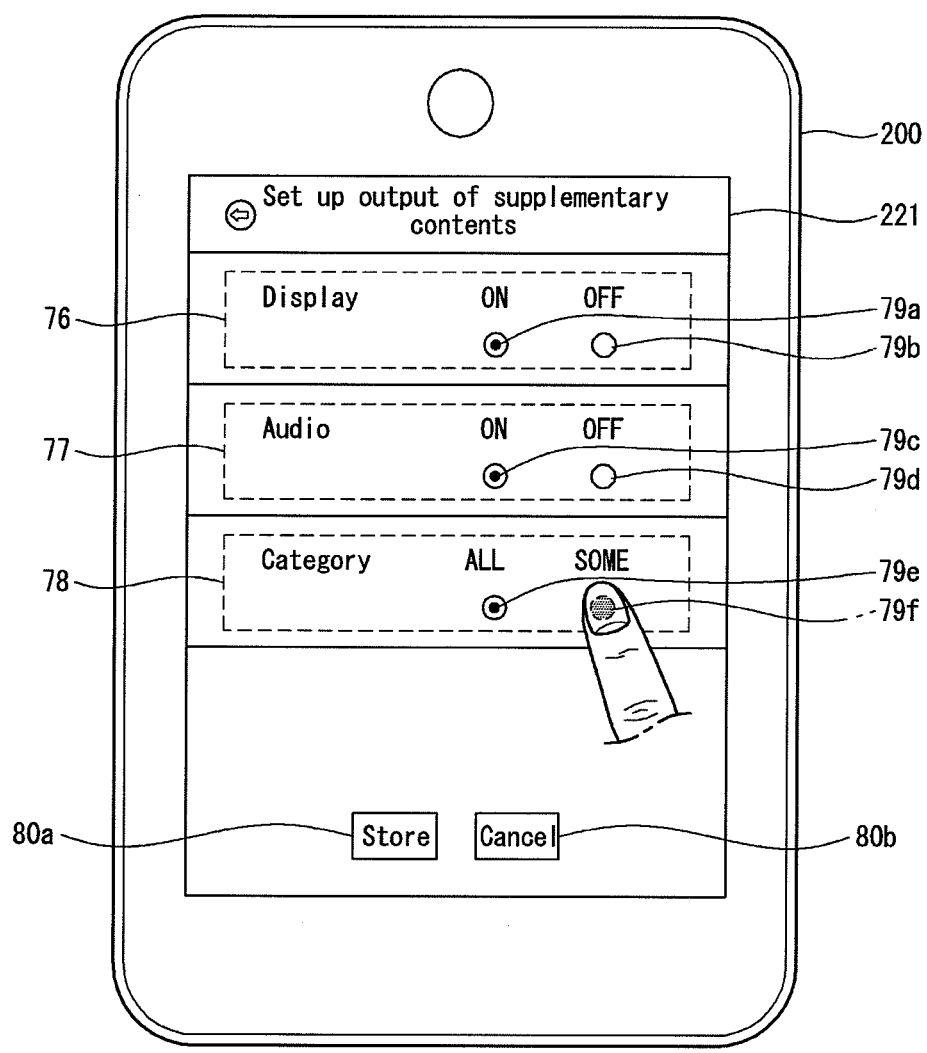
Figure 49:
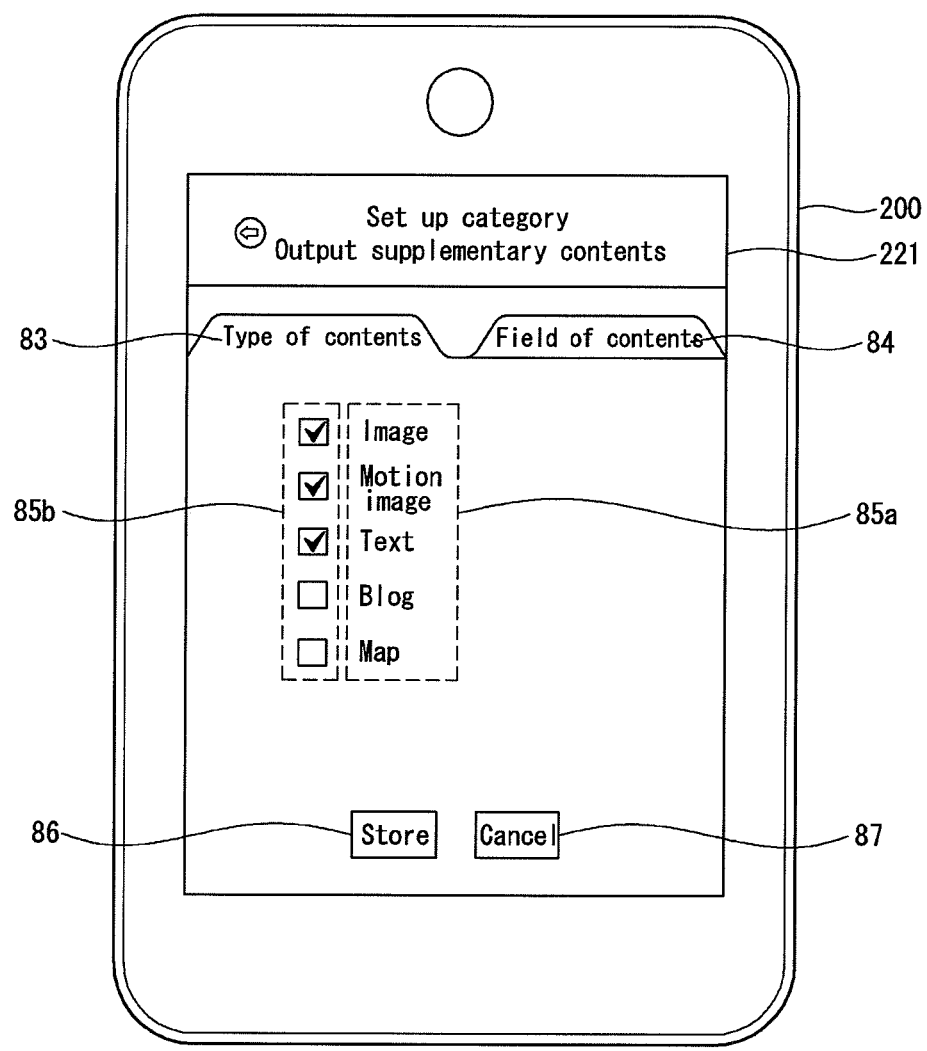
Figure 50:
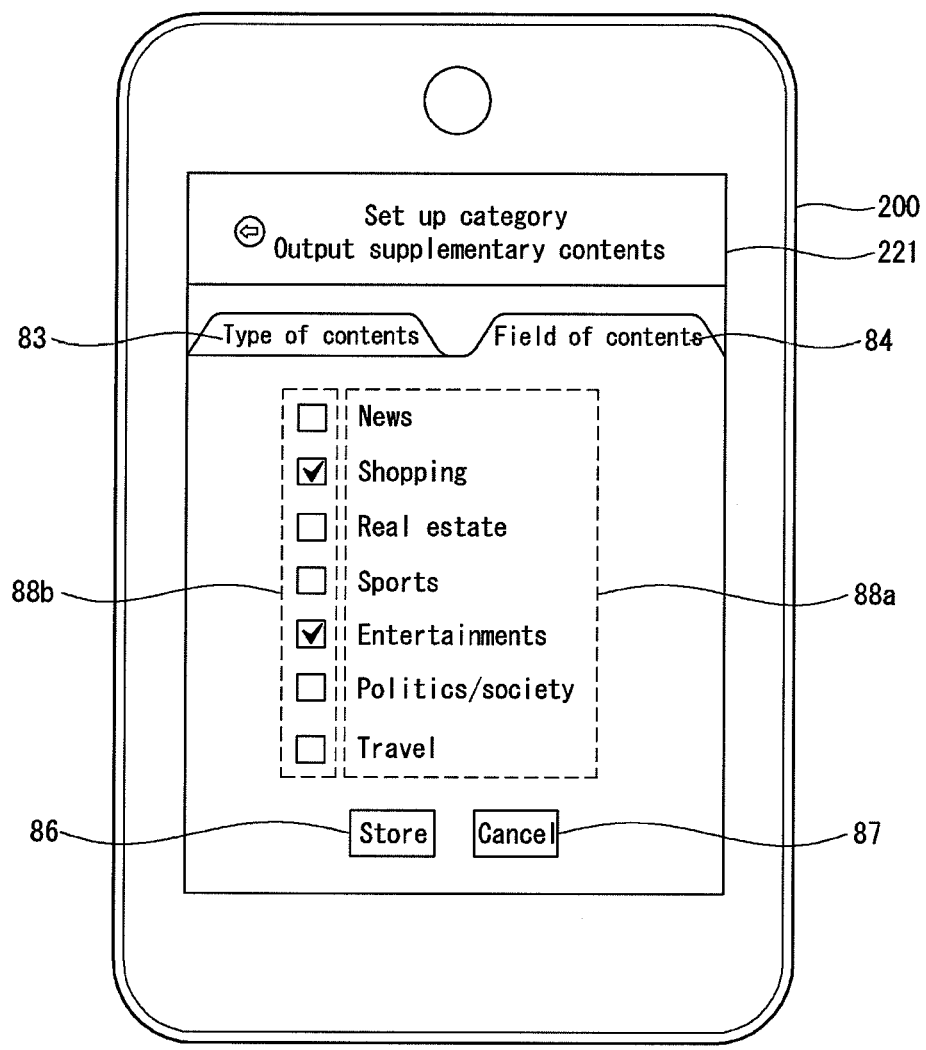

When a user selects the some category output button 79f as shown in FIG. 48, the controller 240 can enter a setup screen for selecting categories on which the supplementary contents will be output, as shown in FIGS. 49 and 50.

FIGS. 49 and 50 are similar to the setup screens for acquiring the supplementary contents shown in FIGS. 39 and 40.

That is, the screen for acquiring the detailed category setup operation, shown in FIG. 49, can provide a third tab 83 for setting up categories relating to the type of contents and a fourth tab 84 for setting up categories relating to the field of contents.

A user can set up categories relating to the type of contents or the field of contents which relates to the output of the supplementary contents by touching the third tab 83 and the fourth tab 84 using a finger.

For example, FIG. 49 shows the screen for setting up categories relating to the type of contents.

The screen for setting up categories relating to the type of contents can display category names 85a corresponds to respective check boxes 85b for setting up categories relating to the type of contents.

A user can select a desired category to be output in relation to the type of contents by touching at least one of the check boxes 85b.

For another example, FIG. 50 shows a screen for setting up categories relating to the field of contents.

The screen for setting up categories relating to the field of contents can display category names 88a corresponding to respective check boxes 88b for setting up categories relating to the field of contents, as in the screen for setting up categories relating to the type of contents shown in FIG. 49.

A user can select a desired category to be output in relation to the field of contents by touching at least one of the check boxes 88b.

In FIGS. 49 and 50, a user can store items set up so far by selecting a storage button 86 or can cancel items set up so far and return to items previously set by selecting a cancel button 87.

Meanwhile, the screen for setting up the output of the supplementary contents, shown in FIG. 47, can provide a storage button 80a for storing values currently being set up and a cancel button 80b for canceling values currently being set and then returning to values previously set up.

Figure 51:
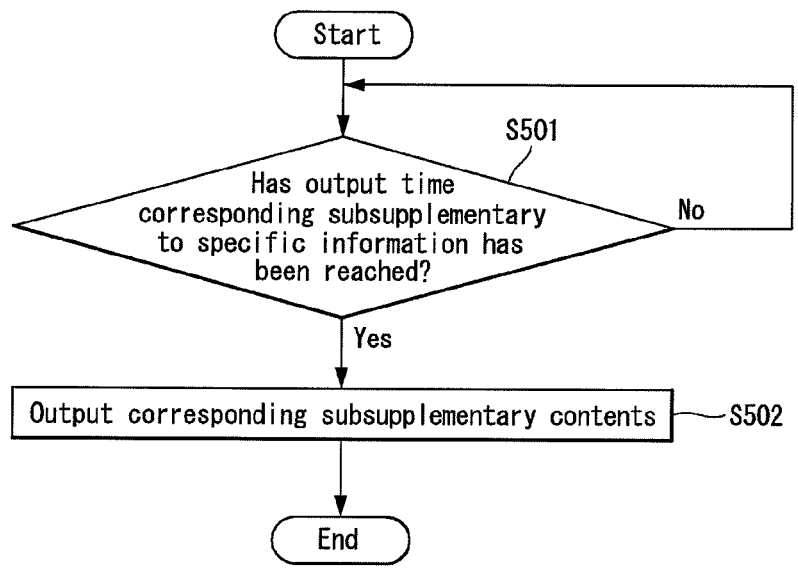
FIG. 51 is a detailed flowchart of the step S140 and shows an example in which the step S140 is performed.
Figure 52:
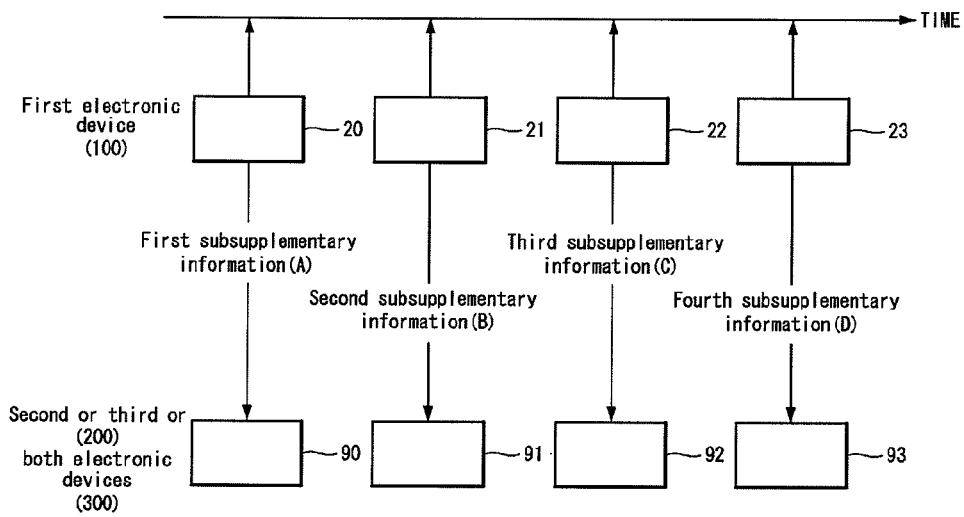
FIG. 52 is a diagram showing a concept in which the step S140 of FIG. 51 is performed.

FIG. 51 is a detailed flowchart of the step S140 and shows an example in which the step S140 is performed, and FIG. 52 is a diagram showing a concept in which the step S140 of FIG. 51 is performed.

Referring to FIG. 51, the second electronic device 200 or the third electronic device 300 or both can determine whether a point of time when output time corresponding to specific sub-supplementary information, included in supplementary information received from the first electronic device 100 or relevant to the received supplementary information (for example, a point of time when an image frame corresponding to sub-supplementary information is output by the first electronic device 100) has been reached at step S501.

For example, referring to FIG. 51, the second electronic device 200 or the third electronic device 300 or both can determine the output time on the basis of a point of time when the #25 image frame 20 included in the multimedia contents 30 is output by the first electronic device 100.

For example, the step S501 can be performed before a predetermined time from the point of time when the #25 image frame 20 is output by the first electronic device 100.

For another example, the step S501 can be performed when the #25 image frame 20 is output by the first electronic device 100.

The second electronic device 200 or the third electronic device 300 or both may have to acquire information about the output time corresponding to the specific sub-supplementary information in order to perform the step S501.

The second electronic device 200 or the third electronic device 300 or both can receive information about the output time when the supplementary information is received from the first electronic device 100.

In some embodiments, the second electronic device 200 or the third electronic device 300 or both can receive information about the output time from the first electronic device 100 at a different point of time from the point of time when the supplementary information is received.

If, as a result of the determination at step S501, the point of time when output time corresponding to specific sub-supplementary information has been reached, the second electronic device 200 or the third electronic device 300 or both can specify sub-supplementary contents corresponding to the specific sub-supplementary information, from among the supplementary contents acquired at step S130, and output the specified sub-supplementary contents at step S502.

For example, referring to FIG. 52, first sub-supplementary information A corresponding to the #25 image frame 20 included in the multimedia contents 30 can be output from the first electronic device 100 to the second electronic device 200 or the third electronic device 300 or both, and the first sub-supplementary information A or first sub-supplementary contents 90 corresponding to the #25 image frame 20 or both can be output by the second electronic device 200 or the third electronic device 300 or both.

Referring to FIGS. 51 and 52, not only the #25 image frame 20, but also second sub-supplementary contents 91, third sub-supplementary contents 92, and fourth sub-supplementary contents 93, respectively corresponding to the #50 image frame 21, the #80 image frame 22, and the #92 image frame 23, can be output by the second electronic device 200 or the third electronic device 300 or both in the same manner as that described above.

Accordingly, a user can be provided with supplementary contents relevant to multimedia contents, such as images output by the DTV 100, through another electronic device (for example, the MID 200 or its own mobile terminal 300 or both), while viewing the DTV (that is, the first electronic device 100).

Figure 53:
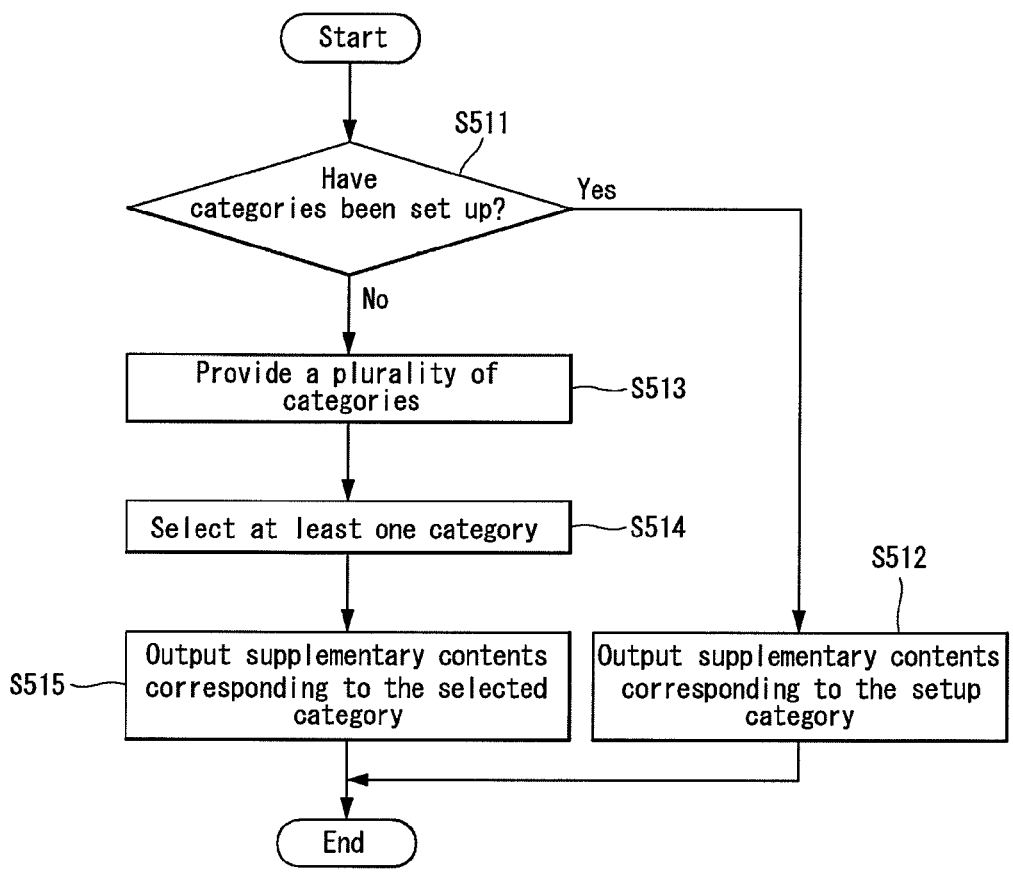
FIG. 53 is a detailed flowchart of the step S140 and shows another example in which the step S140 is performed.

FIG. 53 is a detailed flowchart of the step S140 and shows another example in which the step S140 is performed, and FIGS. 54 to 59 are detailed flowcharts of the step S140 of FIG. 53.

Referring to FIG. 53, the second electronic device 200 or the third electronic device 300 or both can determine whether categories for outputting the supplementary contents have been set up at step S511.

The categories for outputting the supplementary contents have a different purpose from the categories for acquiring the supplementary contents, but have the same classification criteria, contents, and a pertinent user interface as the categories for acquiring the supplementary contents.

A method of setting up the categories for outputting the supplementary contents is the same as that described above with reference to FIGS. 47 to 50.

If, as a result of the determination at step S511, the categories for outputting the supplementary contents have been set up, the second electronic device 200 or the third electronic device 300 or both can output the supplementary contents corresponding to the categories set up at step S512.

For example, in case where the multimedia contents 30 are a movie having a title "ABC_XYZ" and the categories for outputting the supplementary contents are set up as shown in FIGS. 49 and 50, the second electronic device 200 can output the supplementary contents in various ways so that the supplementary contents correspond to the setup categories, as described later.

FIGS. 54 to 59 show examples of forms in which the supplementary contents are output in case where the categories for outputting the supplementary contents have been set up as in FIGS. 49 and 50.

Figure 54:
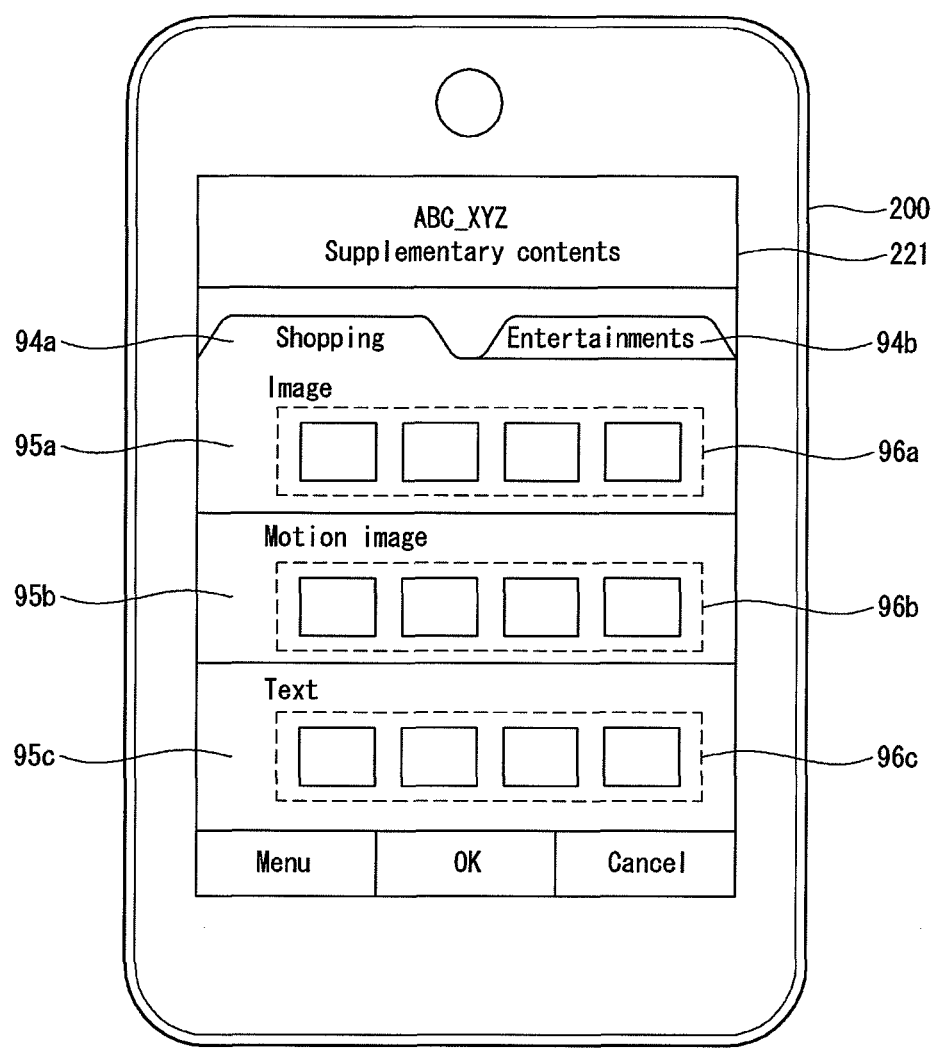
FIGS. 54 to 59 are detailed flowcharts of the step S140 shown in FIG. 53.

For example, referring to FIG. 54, the controller 240 of the second electronic device 200 can provide a fifth tab 94a and a sixth tab 94b, respectively corresponding to "Shopping" and "Entertainments" which are the categories set up in FIG. 50, to the display unit 221. A user can select the fifth tab 94a and the sixth tab 94b. FIG. 54 shows the example in which the fifth tab 94a has been selected.

As shown in FIG. 54, the controller 240 of the second electronic device 200 can separately display three regions 95a, 95b, and 95c for providing respective supplementary contents 96a, 96b, and 96c corresponding to the image, the motion image, and the text which are the categories set up in FIG. 49.

When a user selects the sixth tab 94b, the controller 240 can provide an image, a motion image, and text, corresponding to the category "Entertainments", as the supplementary contents in a similar form as that shown in FIG. 54.

Figure 55:
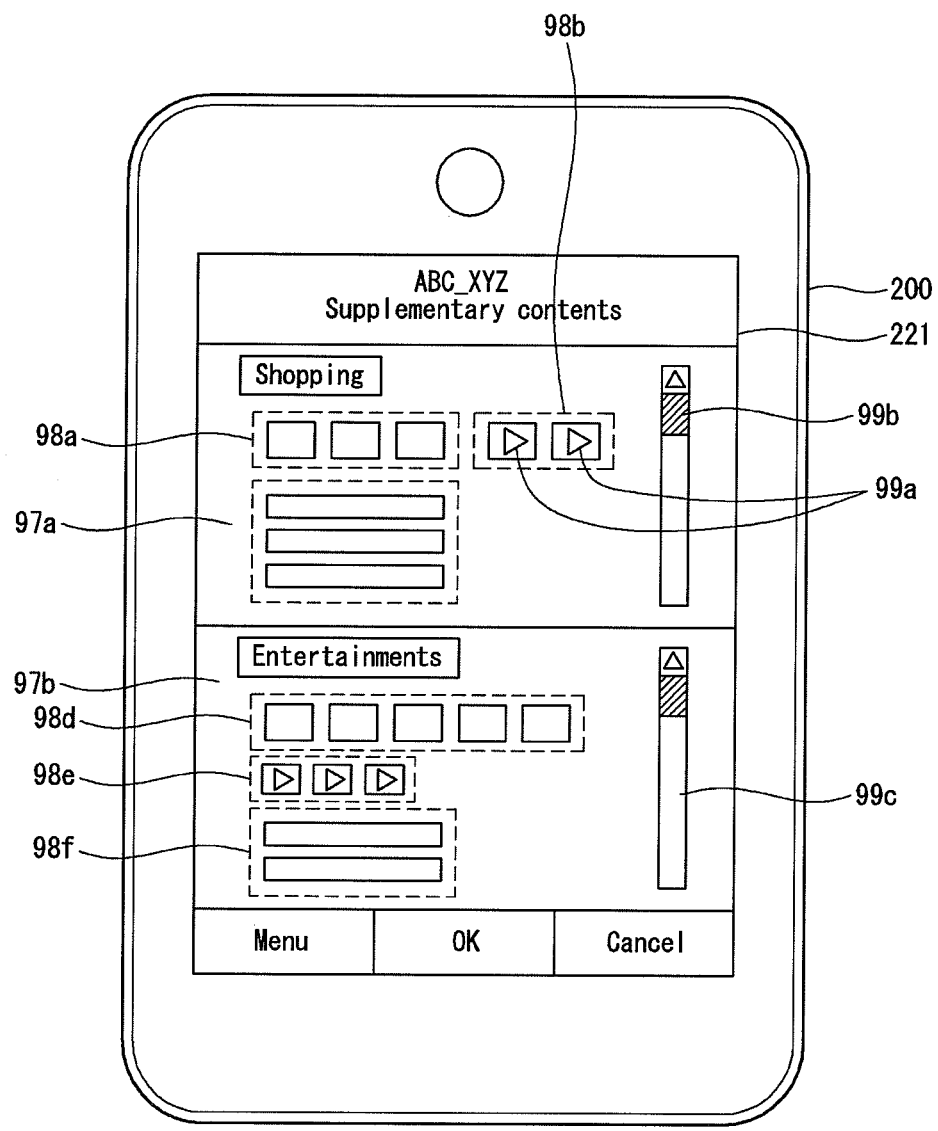

For another example, referring to FIG. 55, the controller 240 of the second electronic device 200 can provide a shopping category region 97a "Shopping" and an entertainment category region 97b "Entertainments" (that is, the categories set up in FIG. 50) to the display unit 221.

The shopping category region 97a can comprise supplementary contents 98a, 98b, and 98c respectively corresponding to the image, the motion image, and text which are the categories set up in FIG. 49.

Meanwhile, the motion image supplementary contents 98b can display one or more play buttons 99a on a representative image in order to be distinguished from the image supplementary contents 98*a*. When a play button 99*a* is selected, a corresponding motion image can be played.

The entertainment category region 97*b* can comprise supplementary contents 98*d*, 98*e*, and 98*f* respectively corresponding to the image, the motion image, and the text which are the categories set up in FIG. 49.

In case where there a plurality of information to be displayed, the shopping category region 97*a* and the entertainment category region 97*b* can provide scroll bars 99*b* and 99*c* so that a user can access all pieces of corresponding information.

Figure 56:
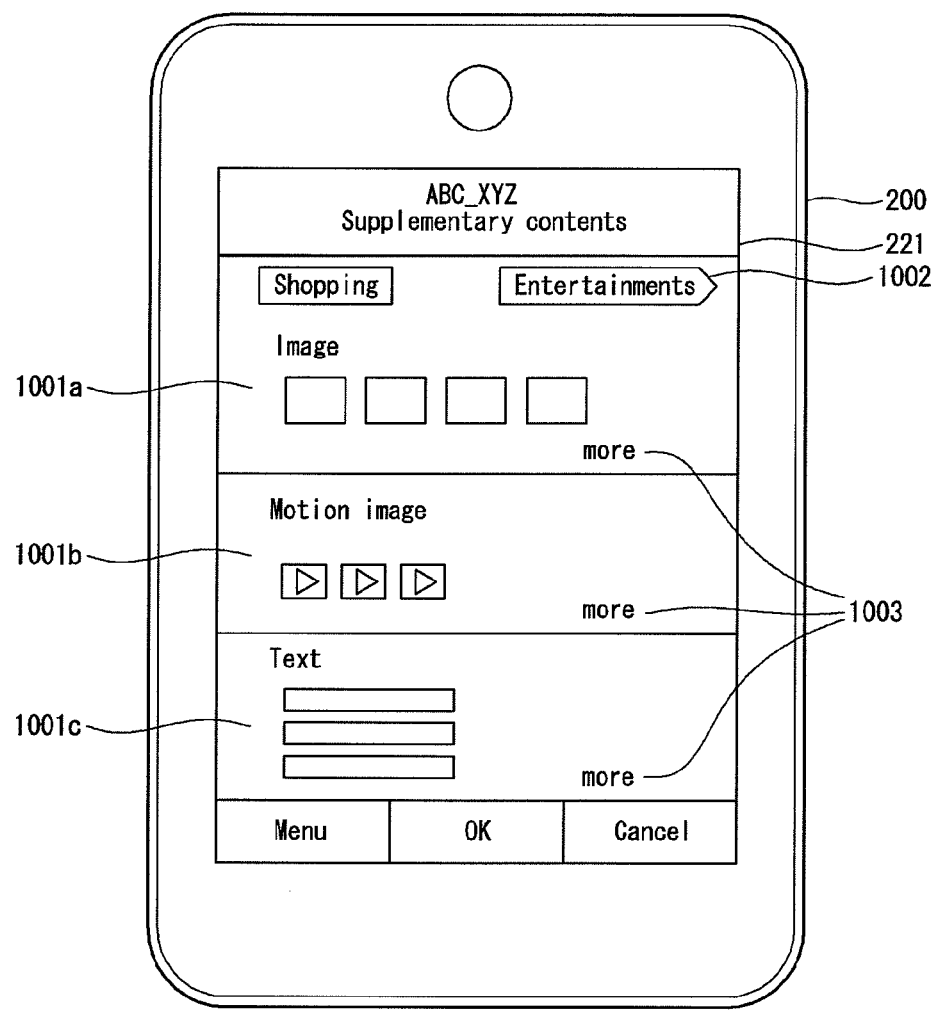

For another example, referring to FIG. 56, the controller 240 of the second electronic device 200 can classify supplementary contents, corresponding to "Shopping" which is one of the categories set up in FIG. 50, into an image region 1001*a*, a motion image region 1001*b*, and a text region 1001*c*, respectively, and provide them.

Meanwhile, the controller 240, as shown in FIG. 56, can provide menus 1003 capable of further providing corresponding supplementary contents to the supplementary contents regions 1001*a*, 1001*b*, and 1001*c*.

The controller 240, as shown in FIG. 56, can provide an icon 1002 (e.g., corresponding to "Entertainments") which is another of the categories set up in FIG. 50.

Figure 57:
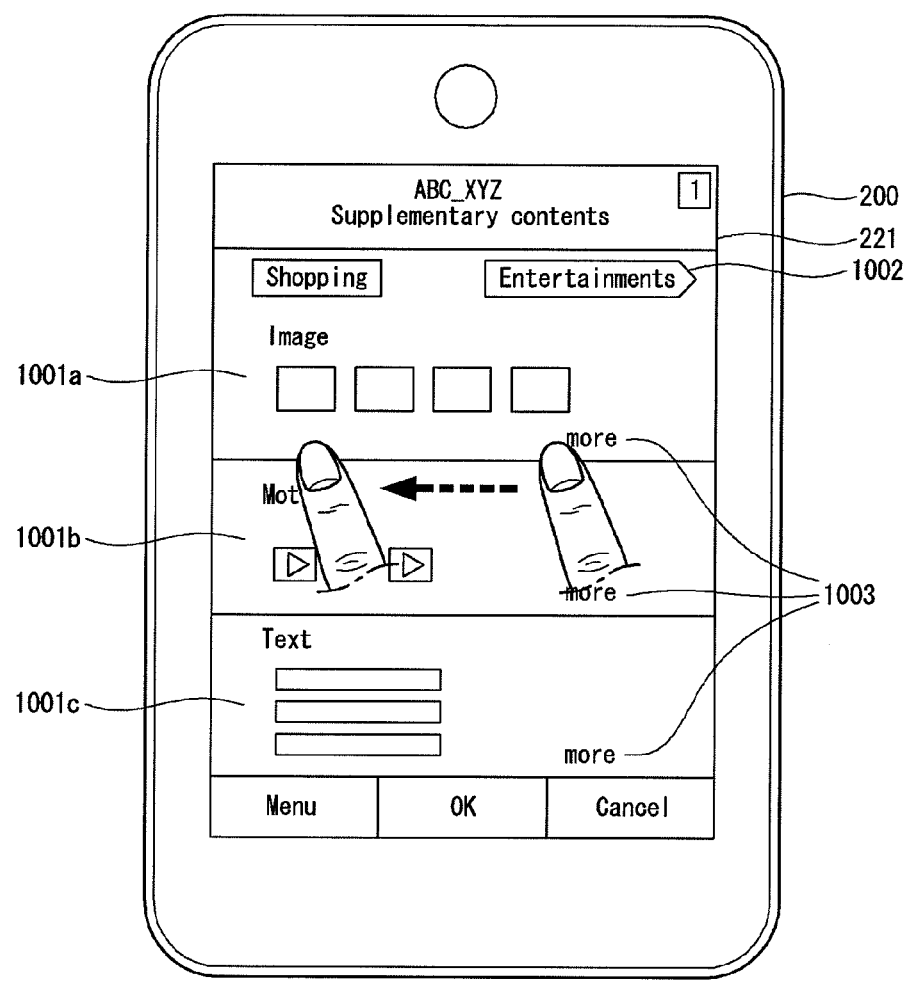
Figure 58:
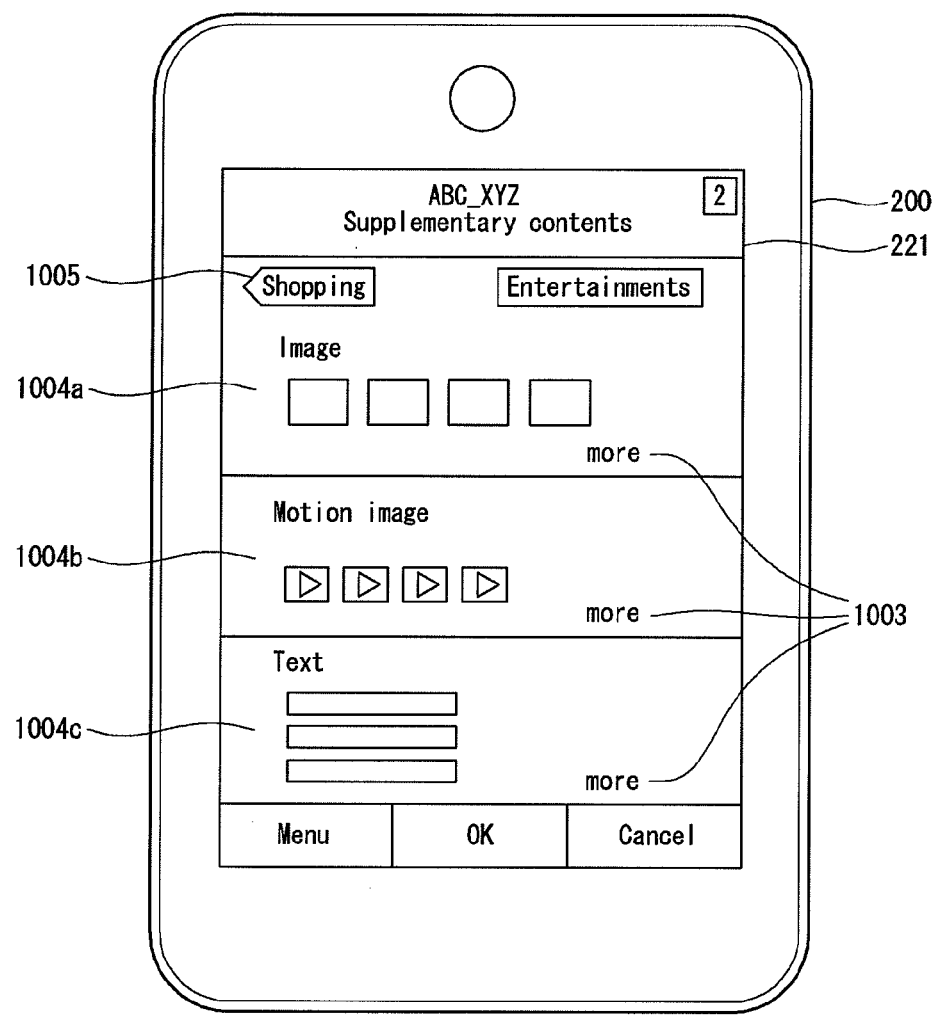

In case where an icon 1002 corresponding to "Entertainments" (or another category) is selected or dragged in a direction, such as that shown in FIG. 57, the controller 240 can classify supplementary contents, corresponding to "Entertainments", into an image region 1004*a*, a motion image region 1004*b*, and a text region 1004*c* and provide them (refer to FIG. 58).

In case where an icon 1005 corresponding to "Shopping" shown in FIG. 58 is selected or the screen of FIG. 57 is dragged in a direction opposite to the direction shown in FIG. 58, the screen of FIG. 56 can be reentered.

The controller 240 of the second electronic device 200 can provide the supplementary contents on a source basis.

Figure 59:
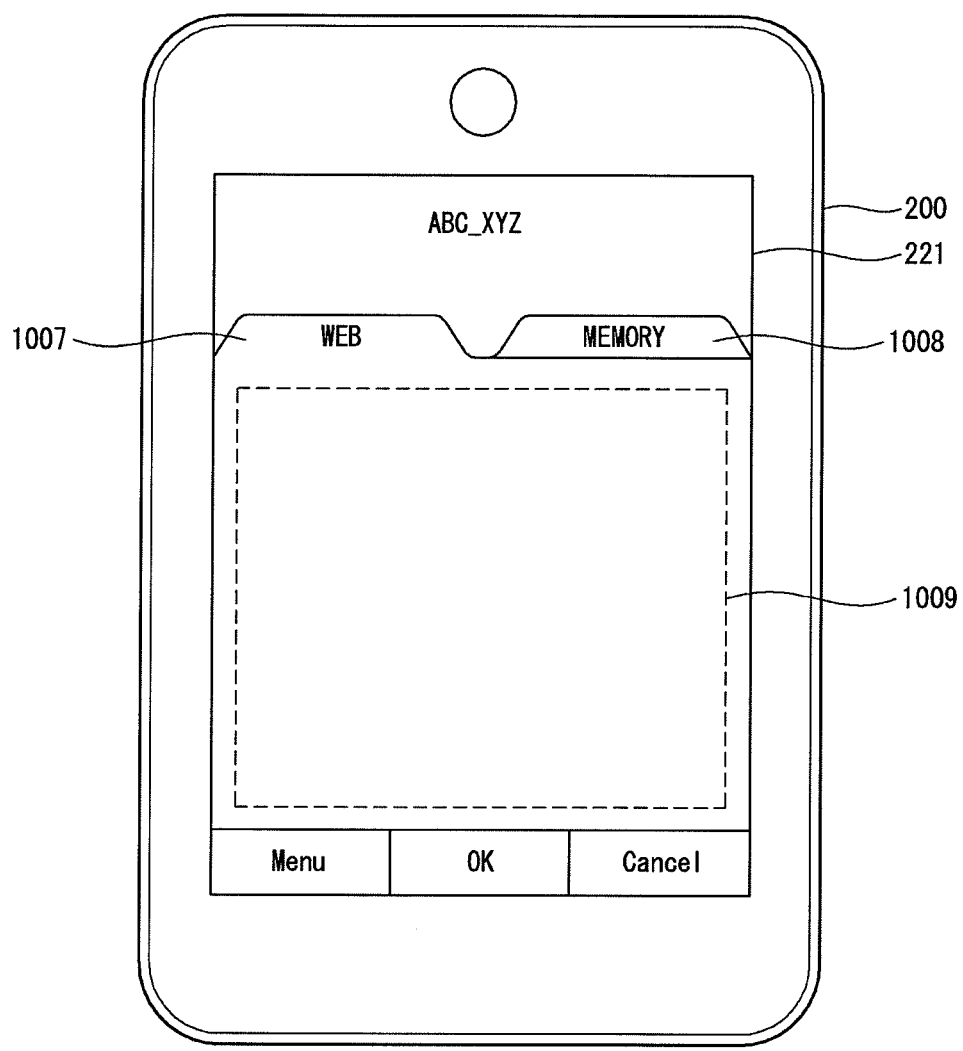

For example, referring to FIG. 59, the controller 240 can provide a tab 1007 corresponding to a region for providing supplementary contents acquired through a web search and a tab 1008 corresponding to a region for providing supplementary contents acquired through internal memory search.

The controller 240 can provide supplementary contents corresponding to a tab currently selected, from among the tabs 1007 and 1008, through an internal region 1009. A method of providing the supplementary contents through the internal region 1009 can be the same as the various methods described above with reference to FIGS. 54 to 58.

Meanwhile, if, as a result of the determination at step S511, the categories for outputting the supplementary contents have not been set up, the second electronic device 200 or the third electronic device 300 or both can provide a plurality of categories which can be selected by a user at step S513.

For example, the controller 240 of the second electronic device 200 can provide the category setup screens described above with reference to FIGS. 47 to 50 so that a user himself can select a desired category.

The second electronic device 200 or the third electronic device 300 or both can receive a selection signal for at least one of the plurality of categories at step S514.

The second electronic device 200 or the third electronic device 300 or both can output supplementary contents corresponding to at least one of the categories, selected at step S514, at step S515. A form or method of performing the step S515 is identical with or similar to that of the step S512.

Figure 60:
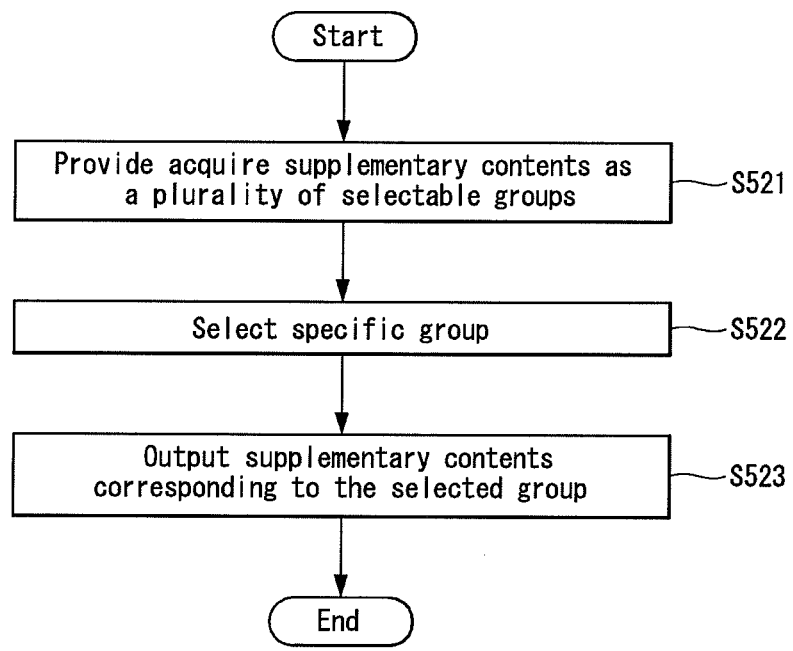
FIG. 60 is a detailed flowchart of the step S140 and shows yet another example in which the step S140 is performed.
Figure 61:
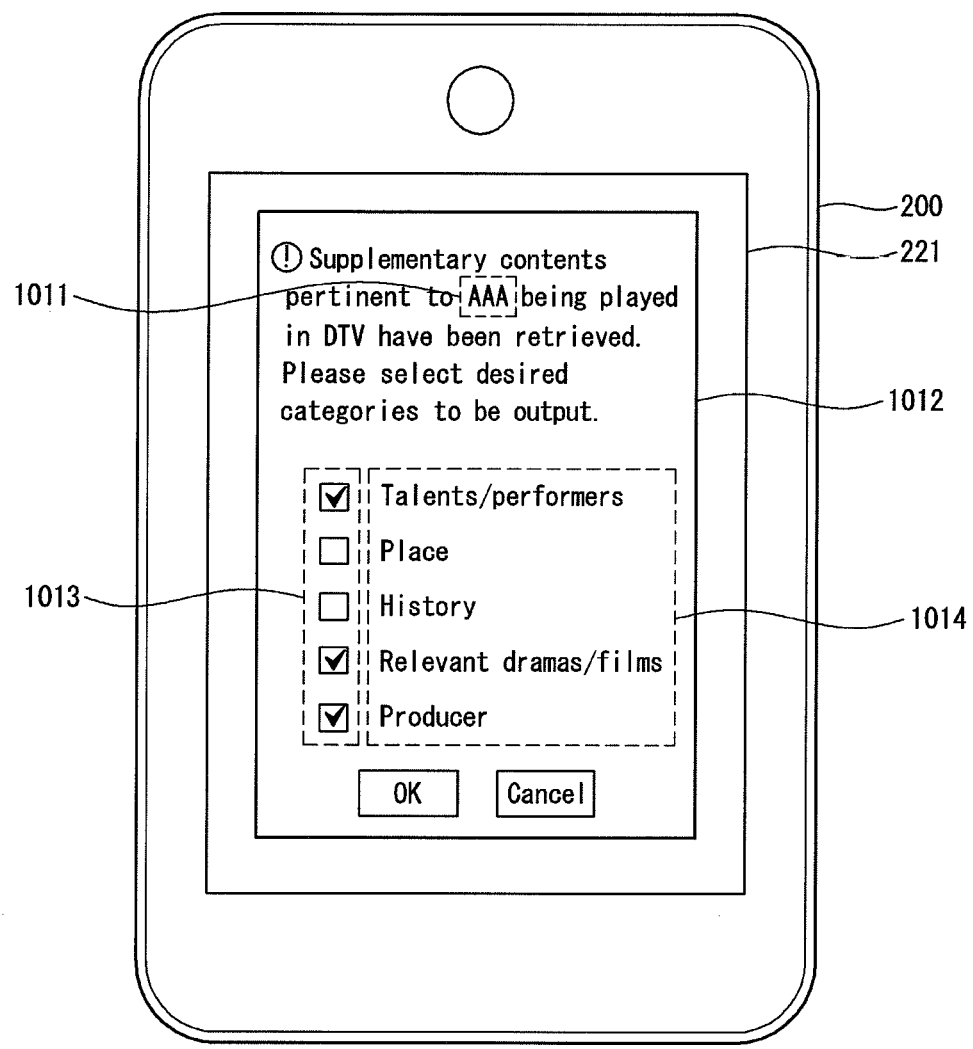
FIGS. 61 to 63 show detailed examples in which the step S140 of FIG. 60 is performed.
Figure 62:
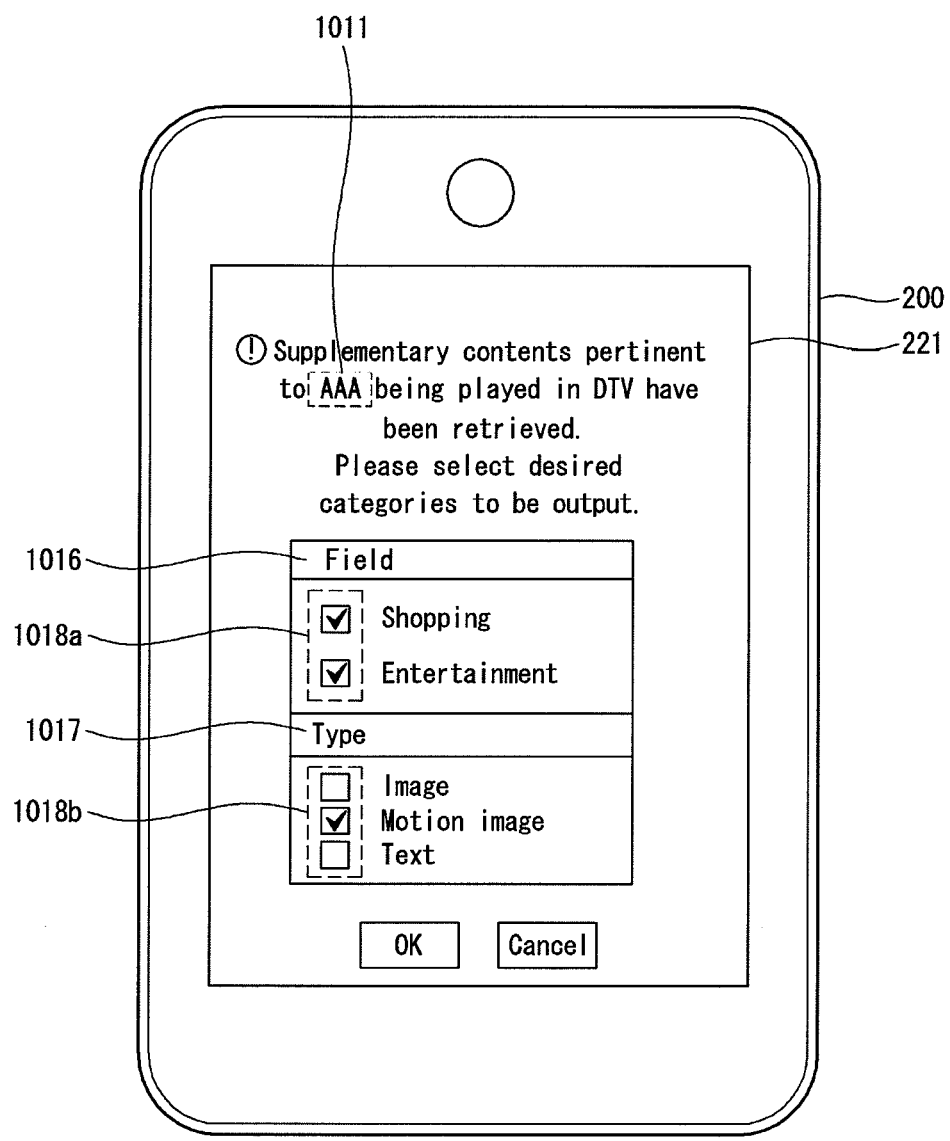
Figure 63:
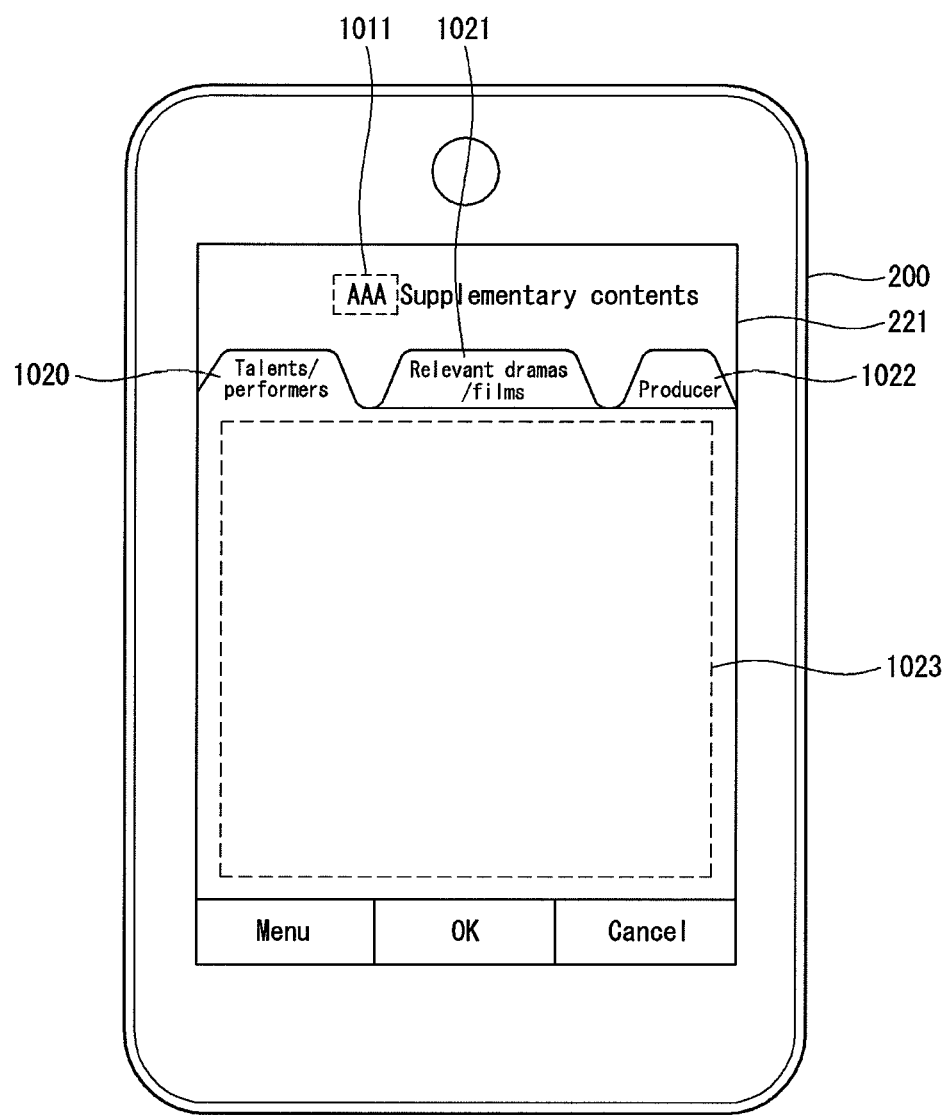

FIG. 60 is a detailed flowchart of the step S140 and shows yet another example in which the step S140 is performed. FIGS. 61 to 63 show detailed examples in which the step S140 of FIG. 60 is performed.

Referring to FIG. 60, the second electronic device 200 or the third electronic device 300 or both can perform an operation of classifying supplementary contents, acquired using a variety of methods at step S130, into a plurality of groups and selecting the plurality of classified groups at step S521. Further, the second electronic device 200 or the third electronic device 300 or both can receive a selection signal for at least one of the plurality of groups at step S522.

For example, referring to FIG. 61, the controller 240 of the second electronic device 200 can provide the display unit 221 with a user interface 1012 for acquiring supplementary contents relevant to multimedia contents 1011 being played in the first electronic device 100 (or DTV) and for querying a user whether supplementary contents belonging to which category, from among the acquired supplementary contents, will be output.

The user interface 1012, as shown in FIG. 61, can comprise check boxes 1013 for providing the supplementary contents, acquired in relation to the multimedia contents 1011, in the form of a plurality of different groups 1014 and for enabling a user to select the plurality of different groups 1014.

For another example, in case where the supplementary contents for some categories have been acquired at step S130, the controller 240 of the second electronic device 200 may provide the some categories to a user and enable the user to select a category to be output from among the some categories.

For example, referring to FIG. 62, the controller 240 can provide a user interface for acquiring supplementary contents relating to the multimedia contents 1011 being output by the first electronic device 100 with respect to the categories set up in relation to the acquisition of supplementary contents in FIGS. 39 and 40 and for enabling a user to select again a category to be output from among the categories to which the acquired supplementary contents belong.

That is, referring to FIG. 62, the controller 240 can provide a category 1016 related to the field of contents set up in FIG. 40 and a category 1017 related to the type of contents set up in FIG. 39.

A user can select categories to be output by using check boxes 1018*a* and 1018*b* provided in the screen of FIG. 62.

The second electronic device 200 or the third electronic device 300 or both can output supplementary contents corresponding to the selected at least one group, from among the supplementary contents acquired at step S130, at step S523.

FIG. 63 shows a screen in which supplementary contents corresponding to categories selected in FIG. 61 are output.

For example, referring to FIG. 63, the controller 240 of the second electronic device 200 can provide tabs 1020, 1021, and 1022 respectively corresponding to a plurality of categories selected in FIG. 61. Further, supplementary contents corresponding to the respective categories can be provided through an internal region 1023.

Figure 64:
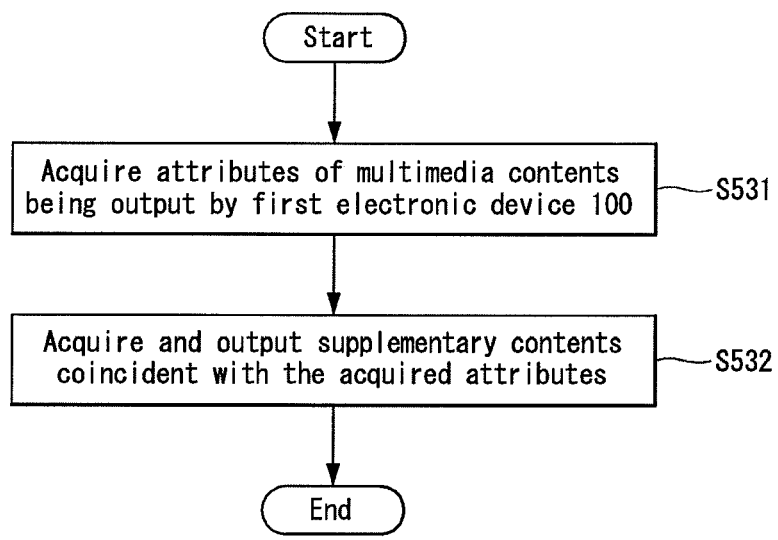
FIG. 64 is a detailed flowchart of the steps S130 and S140 and shows another example in which the steps S130 and S140 are performed.
Figure 65:
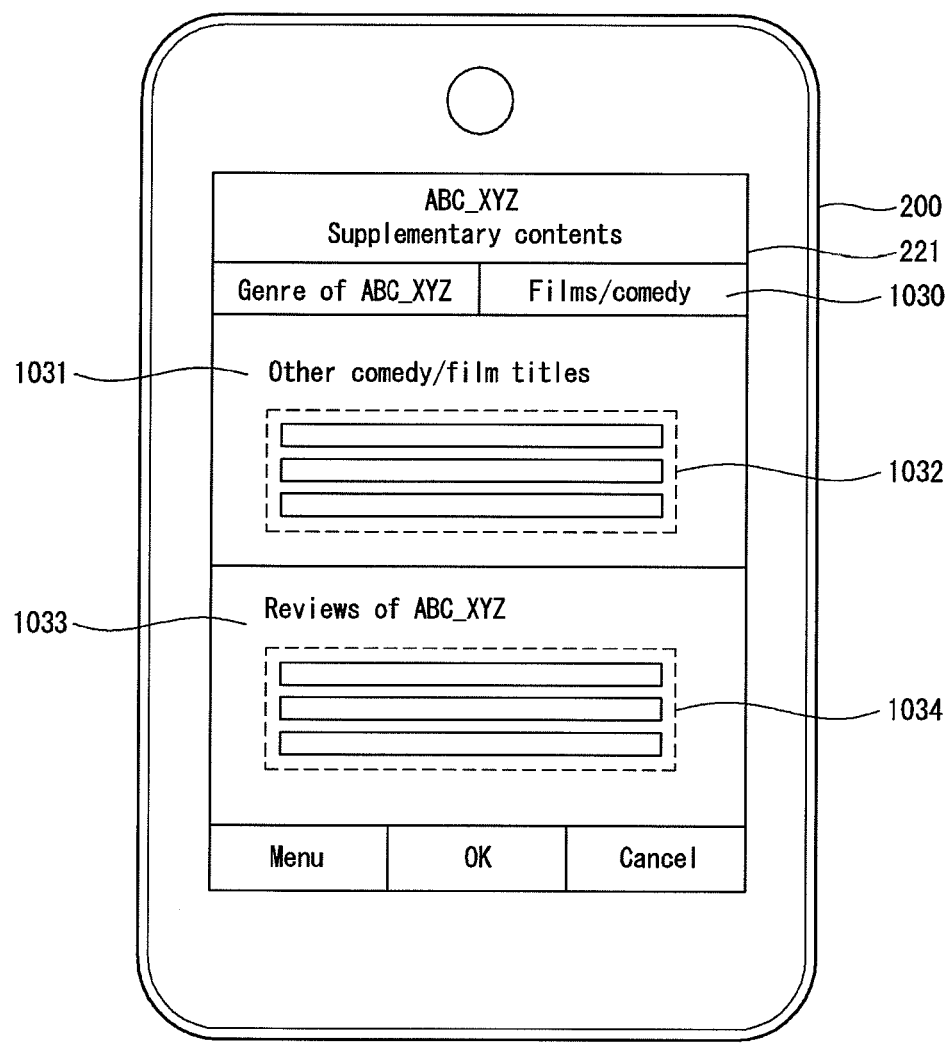
FIGS. 65 to 67 illustrate detailed examples in which the steps S130 and S140 of FIG. 64 are performed.
Figure 66:
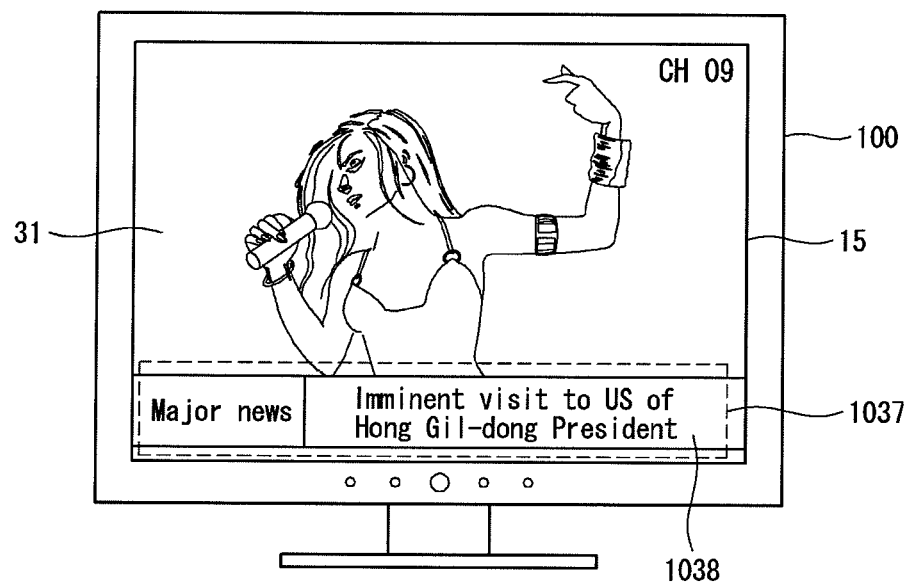
Figure 67:
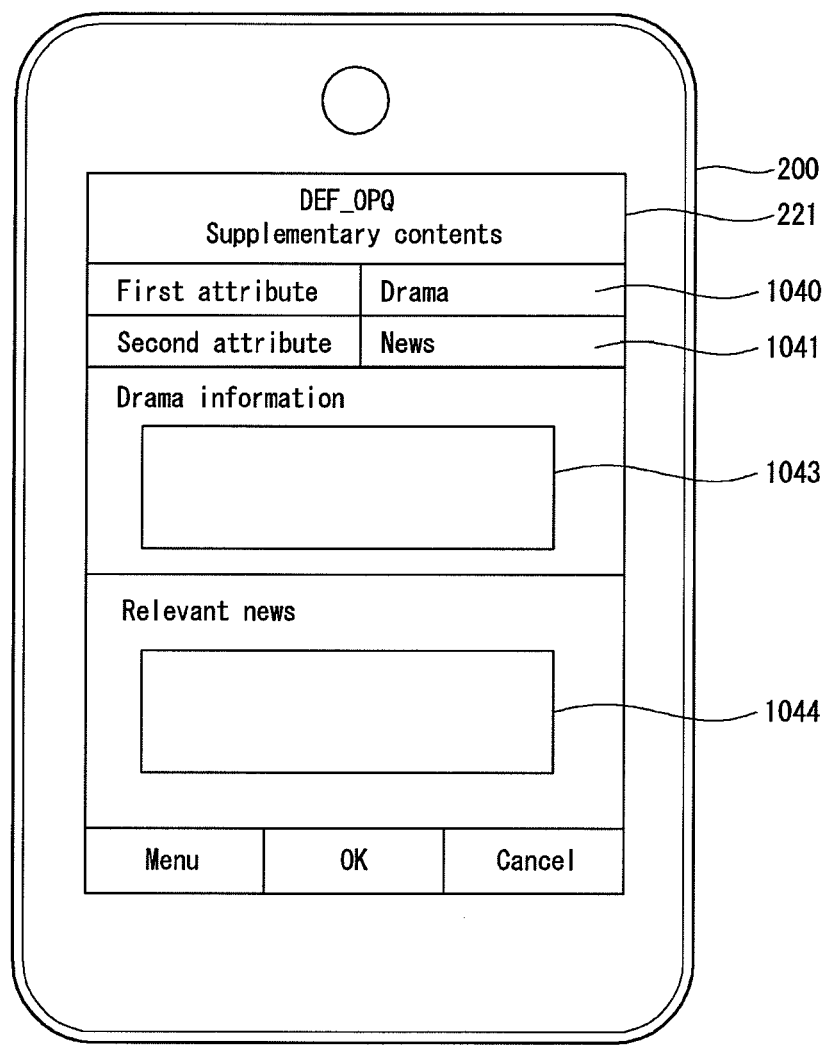

FIG. 64 is a detailed flowchart of the steps S130 and S140 and shows another example in which the steps S130 and S140 are performed. FIGS. 65 to 67 illustrate detailed examples in which the steps S130 and S140 of FIG. 13 are performed.

Referring to FIG. 64, the second electronic device 200 or the third electronic device 300 or both can acquire attributes of the multimedia contents being output by the first electronic device 100 at step S531.

The second electronic device 200 or the third electronic device 300 or both can acquire supplementary contents complying with the acquired attributes and output the acquired supplementary contents at step S532.

The attributes of the multimedia contents can be classified on the basis of various criteria. For example, the attributes of the multimedia contents can be classified on the basis of various criteria, such as the genre, type, field, etc. of the multimedia contents.

Information about the attributes of the multimedia contents can be transmitted from the first electronic device 100 as the supplementary information.

Further, the attribute information of the multimedia contents may be acquired by the second electronic device 100 or the third electronic device 300 or both although the attribute information is not transmitted by the first electronic device 100 as the supplementary information.

FIG. 65 shows an example in which the steps S531 and S532 are performed.

For example, referring to FIG. 65, a film/comedy 1030 which is the genre of multimedia contents ABC_XYZ being output by the first electronic device 100 can become the attribute information of the multimedia contents.

The controller 240 of the second electronic device 200 can provide supplementary contents corresponding to the film/comedy 1030 which is the attribute information of the multimedia contents.

For example, the controller 240, as shown in FIG. 65, can provide the display unit 221 with a region 1031 for providing different films/comedies 1032 from the film/comedy 1030 and a region 1032 for enabling users to express their reviews 1034 for the multimedia contents ABC_XYZ being output by the first electronic device 100.

FIGS. 66 and 67 show another example in which the steps S531 and S532 are performed.

Referring to FIG. 66, the first electronic device 100 can receive a broadcasting signal, comprising an image signal, through a specific broadcasting channel and play the received broadcasting signal. The image signal can be output through a display A/V and OSD 15, as shown in FIG. 66.

The first electronic device 100 can receive various data, such as news, over a broadcasting network or other networks and output the received data.

For example, referring to FIG. 66, the first electronic device 100 can provide an additional region 1037 to the display A/V and OSD 15 so that news information 1038 received via data or other channels can be displayed in the addition region 1037.

Accordingly, the first electronic device 100 (or DTV) shown in FIG. 66 is able to output broadcasting contents 31 comprising an image signal with the news information 1038 provided on the additional region 1037.

The second electronic device 200 or the third electronic device 300 or both can recognize that the broadcasting contents 31 and the news information 1038 are being output by the first electronic device 100 on the basis of the supplementary information received from the first electronic device 100.

For example, referring to FIG. 67, the controller 240 of the second electronic device 200 can acquire first attribute information 1040 about the broadcasting contents 31 and second attribute information 1041 about the news information 1038, in relation to the multimedia contents being output by the first electronic device 100.

The controller 240 can acquire supplementary contents relevant to the first attribute information 1040 and provide the acquired supplementary contents to a region 1043 corresponding to the first attribute information 1040. Further, the controller 240 can acquire supplementary contents relevant to the second attribute information 1041 and provide the acquired supplementary contents to a region 1044 corresponding to the second attribute information 1041.

Hereinafter, other embodiments of this document are described. The following embodiments of this document can adopt most of the embodiments of this document described above with reference to FIGS. 13 to 67. In particular, various embodiments in relation to the acquisition and output of supplementary contents can be applied to the following embodiments of this document in the same or similar way.

Figure 68:
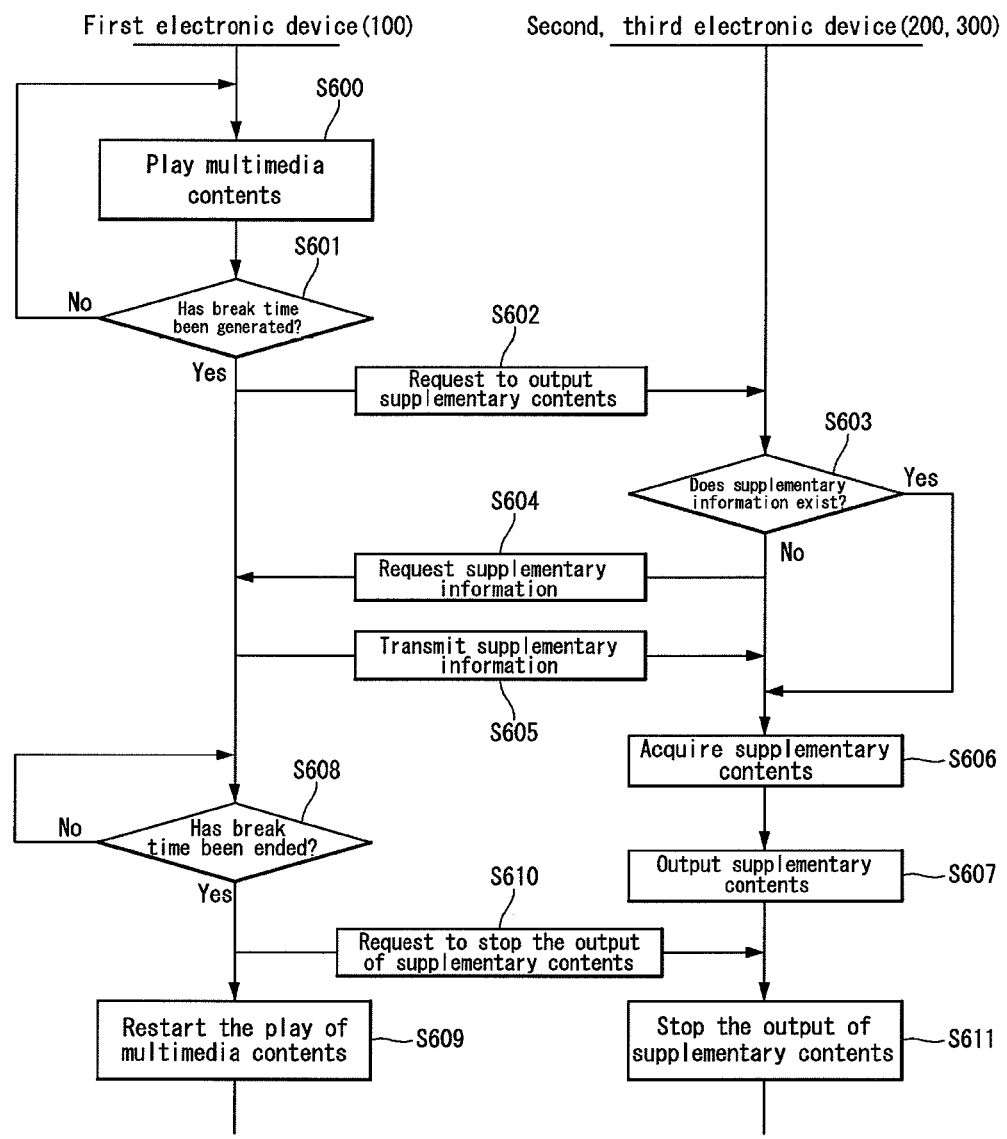
FIG. 68 is a flowchart illustrating a method of providing information according to a second embodiment of this document.

FIG. 68 is a flowchart illustrating a method of providing information according to a second embodiment of this document. The method of providing information according to the second embodiment of this document can be implanted using the system environment and various electronic devices described above with reference to FIGS. 1 to 12. Hereinafter, the method of providing information according to the second embodiment of this document and the operations of the first to third electronic devices 100, 200, and 300 for implementing the method are described in detail.

The first electronic device 100 can play multimedia contents at step S600. The step S600 corresponds to the step S100 of FIG. 13.

The first electronic device 100 can determine whether a break time has occurred during the play of the multimedia contents at step S601.

The break time corresponds to a case where the play of the multimedia contents is stopped and the break time can be generated in response to various events.

For example, in case where the multimedia contents are transmitted by a broadcasting station, the broadcasting station can temporarily stop the transmission of the multimedia contents and transmit a broadcasting signal comprising advertisements.

The time taken to receive and output the advertisements can correspond to the break time.

For another example, the first electronic device 100 can stop the play of the multimedia contents in response to a user's command or a control signal received from other electronic device. Even in case where, the time taken to restart the play of the multimedia contents can correspond to the break time.

If, as a result of the determination at step S601, the break time has occurred during the play of the multimedia contents, the first electronic device 100 can transmit a signal, requesting the output of supplementary contents related to the multimedia contents, to the second electronic device 200 or the third electronic device 300 or both at step S602.

When the request signal is received from the first electronic device 100, the second electronic device 200 or the third electronic device 300 or both can determine whether supplementary information about the multimedia contents being played in the first electronic device 100 exists therein at step S603.

The supplementary information has been described above and a further description thereof is omitted.

For example, before the break time is generated in the first electronic device 100, the second electronic device 200 can receive, from the first electronic device 100, supplementary information about supplementary contents which will be output in case where the break time is generated and store the received supplementary information.

For another example, the second electronic device 200 can receive and store all pieces of pertinent supplementary information from the first electronic device 100.

If, as a result of the determination at step S603, the supplementary information about the multimedia contents being played in the first electronic device 100 does not exist, the second electronic device 200 or the third electronic device 300 or both can transmit a signal, requesting the supplementary information, to the first electronic device 100 at step S604.

In response to the signal requesting the supplementary information, the first electronic device 100 can transmit the supplementary information to the second electronic device 200 or the third electronic device 300 or both at step S605.

If the supplementary information about the multimedia contents being played in the first electronic device 100 exists as a result of the determination at step S603 or the supplementary information has been received from the first electronic device 100 as a result of the step S605, the second electronic device 200 or the third electronic device 300 or both can acquire supplementary contents related to the multimedia contents on the basis of the supplementary information at step S606.

The supplementary contents themselves and the acquisition of the supplementary contents have been described above, and descriptions thereof are omitted.

The second electronic device 200 or the third electronic device 300 or both can output the acquired supplementary contents at step S607. The output of the supplementary contents has described above, and a further description thereof is omitted.

The first electronic device 100 can determine whether the break time is ended at step S608.

For example, when the advertisement time is ended, the first electronic device 100 can determine that the break time has been ended.

For another example, when a command signal to restart of the play of the multimedia contents is received, the second electronic device 200 can determine that the break time has been ended.

If, as a result of the determination at step S608, the break time has been ended, the first electronic device 100 can restart the play of the multimedia contents at step S609.

Meanwhile, if, as a result of the determination at step S608, the break time has been ended, the first electronic device 100 can transmit a command signal to stop the play of the supplementary contents, being output by the second electronic device 200 or the third electronic device 300 or both, to the second electronic device 200 or the third electronic device 300 or both at step S610.

In response to the command signal, the second electronic device 200 or the third electronic device 300 or both can stop the output of the supplementary contents at step S611.

Third and fourth embodiments of this document below are described, assuming that a new electronic device is included in the local network 401.

Figure 69:
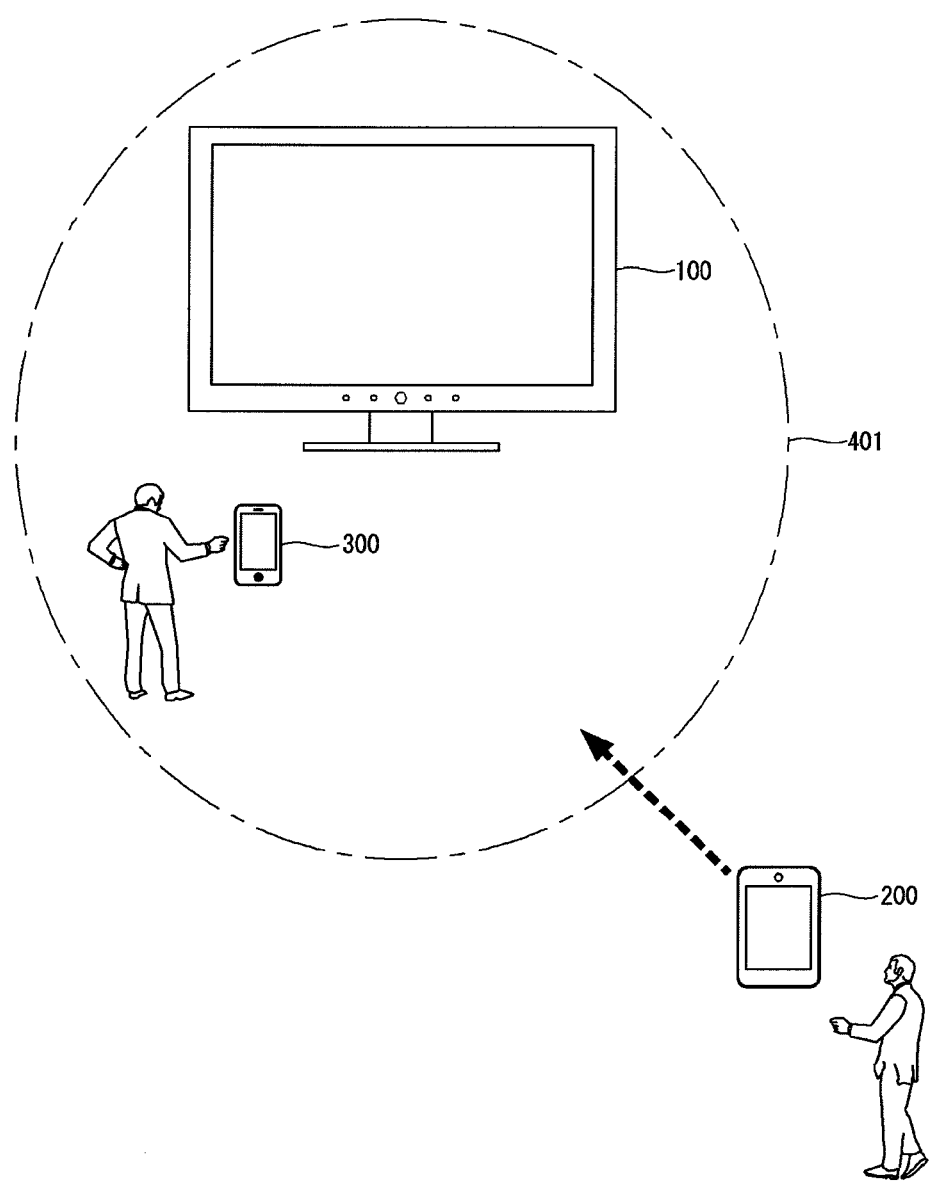
FIG. 69 illustrates an environment for third and fourth embodiments of this document.

FIG. 69 illustrates an environment for the third and fourth embodiments of this document. The environment for the third and fourth embodiments is simply described with reference to FIG. 69.

This environment corresponds to a case in which, in case where the first electronic device 100 and the third electronic device 300 are included within a local network 401, such as a DLNA network, the second electronic device 200 enters the local network 401.

For example, this environment can correspond to a case in which during the time for which a father views the DTV 100 with a handheld phone 300 carried on, a son comes back home from the school with his mobile device, that is, an MID 200 carried on.

For another example, this environment can correspond to a case in which during the time for which a father and a child view the DTV 100 in a living room, the child goes out from a house or the living room and then comes back. This can correspond to a case in which the MID 200 owned by the child goes out from the local network 401 and then enters the local network 401.

That is, the MID 200 is in a state in which MID 200 does not temporarily or fully receive the supplementary information from the DTV 100 before MID 200 newly enters the local network 401 or MID 200 enters the local network 401 again.

Figure 70:
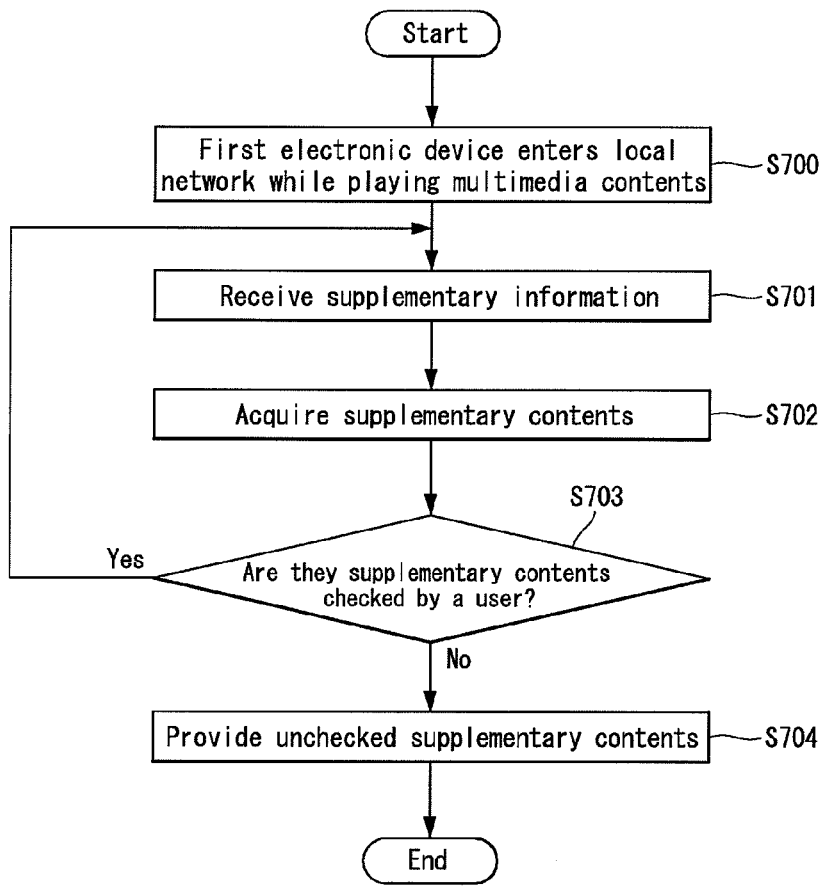
FIG. 70 is a flowchart illustrating a method of providing information according to a third embodiment of this document.
Figure 71:
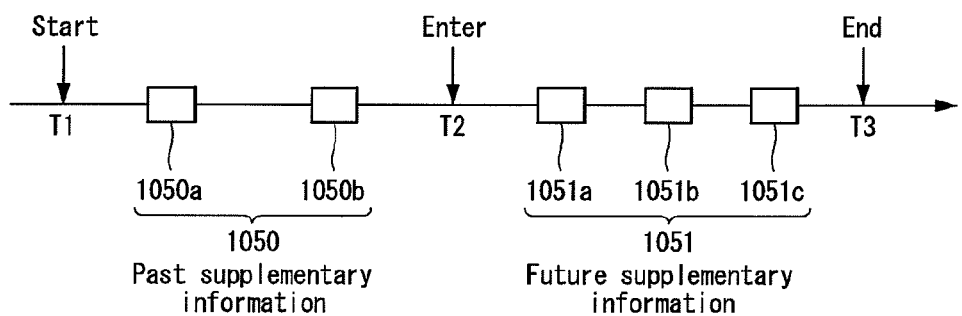
FIG. 71 illustrates a method of a mobile terminal providing information according to a third embodiment of this document.

FIG. 70 is a flowchart illustrating a method of providing information according to the third embodiment of this document. FIG. 71 illustrates a method of a mobile terminal providing information according to the third embodiment of this document.

The method of providing information according to the third embodiment of this document can be implemented through the system environments and various electronic devices described above with reference to FIGS. 1 to 12. The method of providing information according to the third embodiment of this document and the operations of the first to third electronic devices 100, 200, and 300 for implementing the method are described in detail with reference to pertinent drawings.

Here, the second electronic device 200 entering the local network 401 is chiefly described.

The second electronic device 200 can enter the local network 401 during the time for which multimedia contents are being played in the first electronic device 100 at step S700. As described above, the entry into the local network 401 at step S700 can comprise both new entry and reentry into the local network 401.

When the second electronic device 200 enters the local network 401, the first electronic device 100 (or DTV), the second electronic device 200, and the third electronic device 300 coexist within the local network 401.

The coexistence of the first electronic device 100 (or DTV), the second electronic device 200, and the third electronic device 300 within the local network 401 means that each of the electronic devices can recognize the existence of the remaining electronic devices and also communicate with each other.

The second electronic device 200 can receive the supplementary information which can have various technical characteristics described in connection with the above embodiments from the first electronic device 100 at step S701.

Meanwhile, in case where there is a time period in which the sub-supplementary information is not temporarily or fully received from the first electronic device 100, the second electronic device 200 can receive supplementary information (or sub-supplementary information), corresponding to the play period of the multimedia contents corresponding to the time period, from the first electronic device 100 at a time immediately after first electronic device 100 enters or reenters the local network 401.

The second electronic device 200 can acquire the supplementary contents which can have a variety of the technical characteristics described in connection with the above-described embodiments on the basis of the received supplementary information at step S702.

The second electronic device 200 can determine whether the acquired supplementary contents are supplementary contents checked by a user at step S703. If, as a result of the determination at step S703, the acquired supplementary contents are not supplementary contents checked by a user, the second electronic device 200 can provide the unchecked supplementary contents to the user at step S704.

For example, referring to FIG. 71, the multimedia contents being played in the first electronic device 100 are started at a point of time T1 and ended at a point of time T3. It is assumed that the second electronic device 200 has entered the local network 401 at the point of time T2 between the points of time T1 and T3.

The first electronic device 100 can transmit pieces of supplementary information 1050*a* and 1050*b* to the electronic devices within the local network 401 in the form of broadcasting between the point of time T1 and the point of time T2.

However, the second electronic device 200 could not have received the pieces of past supplementary information 1050*a* and 1050*b* because second electronic device 200 did not exist within the local network 401 between the point of time T1 and the point of time T2.

When the second electronic device 200 enters the local network 401 at the point of time T2, the second electronic device 200 can receive the pieces of past supplementary information 1050*a* and 1050*b* from the first electronic device 100 automatically or by request and can acquire supplementary contents corresponding to the pieces of past supplementary information 1050*a* and 1050*b*.

If the supplementary contents corresponding to the pieces of past supplementary information 1050*a* and 1050*b* are determined to be contents not checked by (or not provided to) the user, the second electronic device 200 can provide the unchecked supplementary contents to the user.

In the situation of FIG. 71, the second electronic device 200 can determine that the supplementary contents corresponding to the pieces of past supplementary information 1050*a* and 1050*b* have not been provided to the user and so provide them to the user.

Meanwhile, in FIG. 71, after the point of time T2 at which the second electronic device 200 enters the local network 401, the second electronic device 200 and the third electronic device 300 can be provided with future supplementary information 1051 corresponding to the future from the point of time T2.

Figure 72:
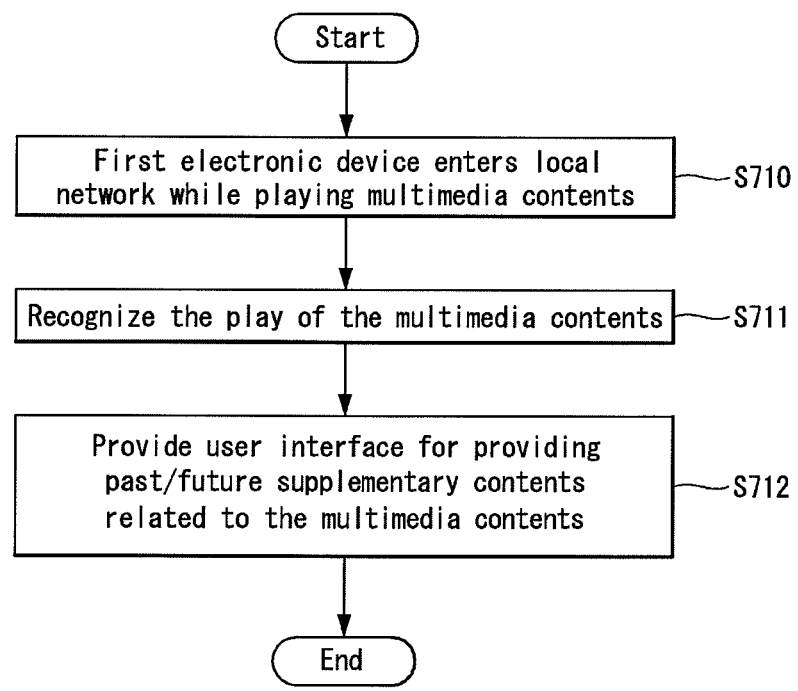
FIG. 72 is a flowchart illustrating a method of providing information according to a fourth embodiment of this document.

FIG. 72 is a flowchart illustrating a method of providing information according to a fourth embodiment of this document. FIGS. 73 to 78 are diagrams illustrating a method of a mobile terminal providing information according to a fourth embodiment of this document.

The method of providing information according to the fourth embodiment of this document can be implemented through the system environments and various electronic devices described above with reference to FIGS. 1 to 12. The method of providing information according to the fourth embodiment of this document and the operations of the first to third electronic devices 100, 200, and 300 for implementing the method are described in detail with reference to pertinent drawings.

Here, the second electronic device 200 entering the local network 401 is chiefly described.

The second electronic device 200 can enter the local network 401 during the time for which the first electronic device 100 plays multimedia contents at step S710. The step S710 is the same as the step S700.

As described above, the second electronic device 200 can recognize that the multimedia contents are being played in the first electronic device 100 at step S711.

The second electronic device 200 can provide a user interface for providing past or future supplementary contents or both which are relevant to the multimedia contents at step S712.

The past supplementary contents and the future supplementary contents have the same meaning as that described above in connection with the previous embodiment with reference to FIG. 71.

Implementation examples of the fourth embodiment of this document are described in detail with reference to FIGS. 73 to 78.

Figure 73:
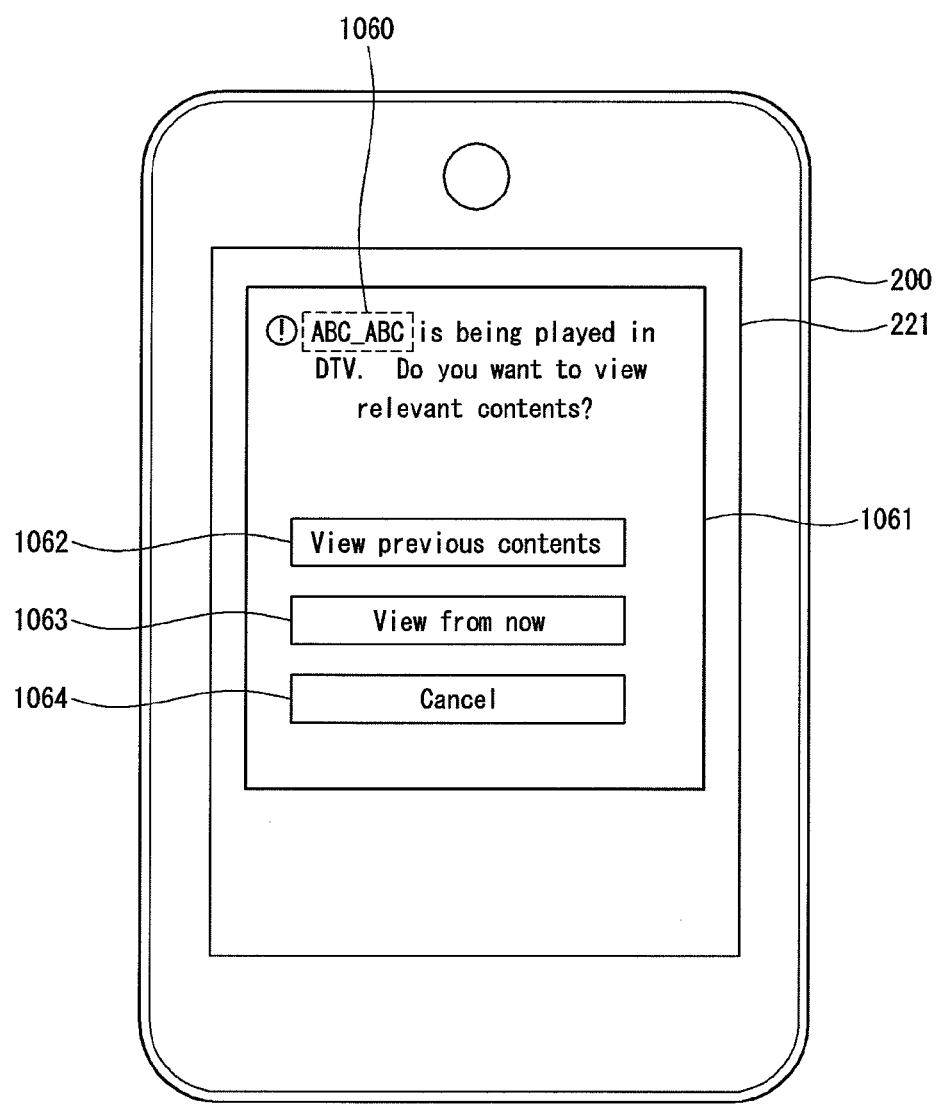
FIGS. 73 to 78 are diagrams illustrating a method of a mobile terminal providing information according to a fourth embodiment of this document.

For example, referring to FIG. 73, when recognizing that multimedia contents ABC_ABC 1060 are being played in the first electronic device 100, the second electronic device 200 can provide a user interface 1061 which can separate supplementary contents relevant to the multimedia contents ABC_ABC 1060 into supplementary contents before the second electronic device 200 enters the local network 401 and supplementary contents after the second electronic device 200 enters the local network 401 and provide the separated supplementary contents.

When <View previous contents> 1062 included in the user interface 1061 is selected, the second electronic device 200 can provide supplementary contents that could have been supplied before the second electronic device 200 enters the local network 401.

Further, when <View from now> 1063 included in the user interface 1061 is selected, the second electronic device 200 can provide supplementary contents that can be supplied after the second electronic device 200 enters the local network 401, in disregard of supplementary contents that could have been supplied before the second electronic device 200 enters the local network 401.

Meanwhile, when a <Cancel> 1064 included in the user interface 1061 is selected, supplementary contents relevant to the multimedia contents 1060 may not be provided.

Figure 74:
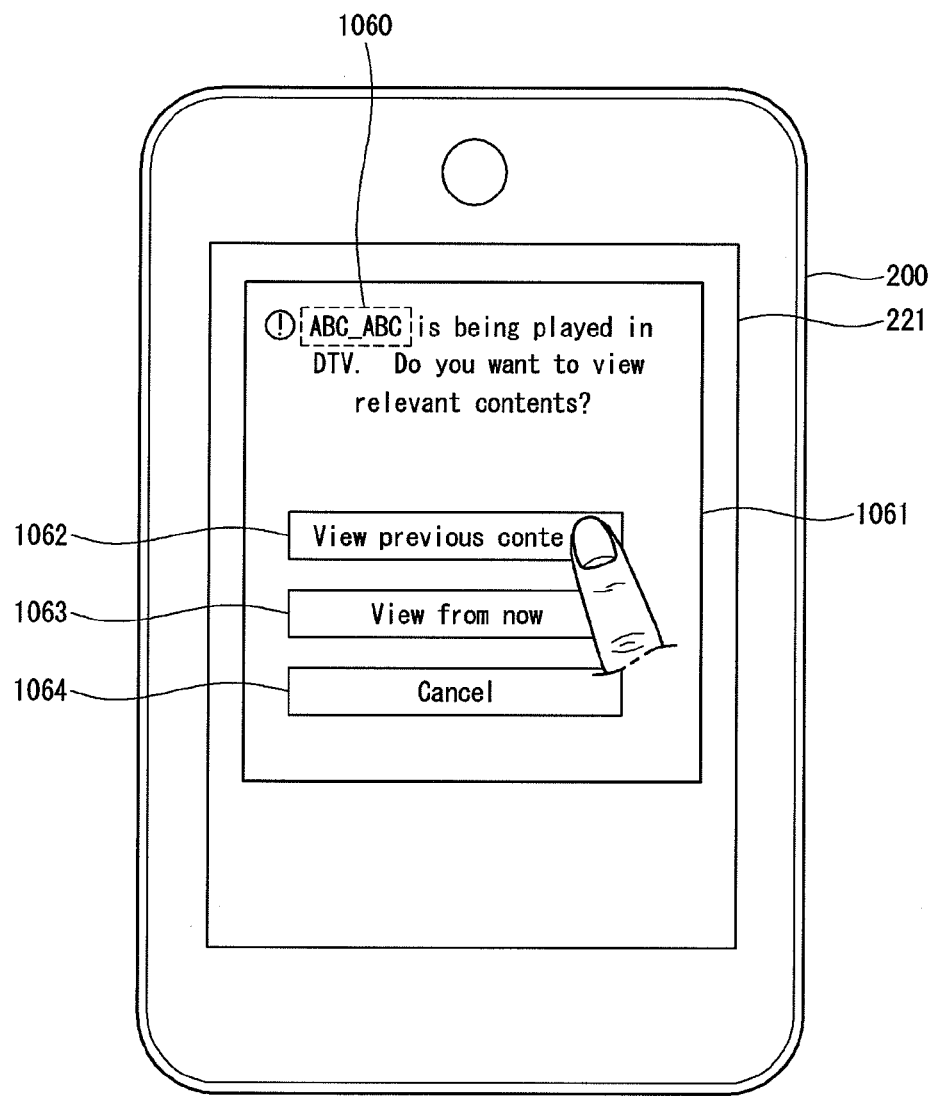
Figure 75:
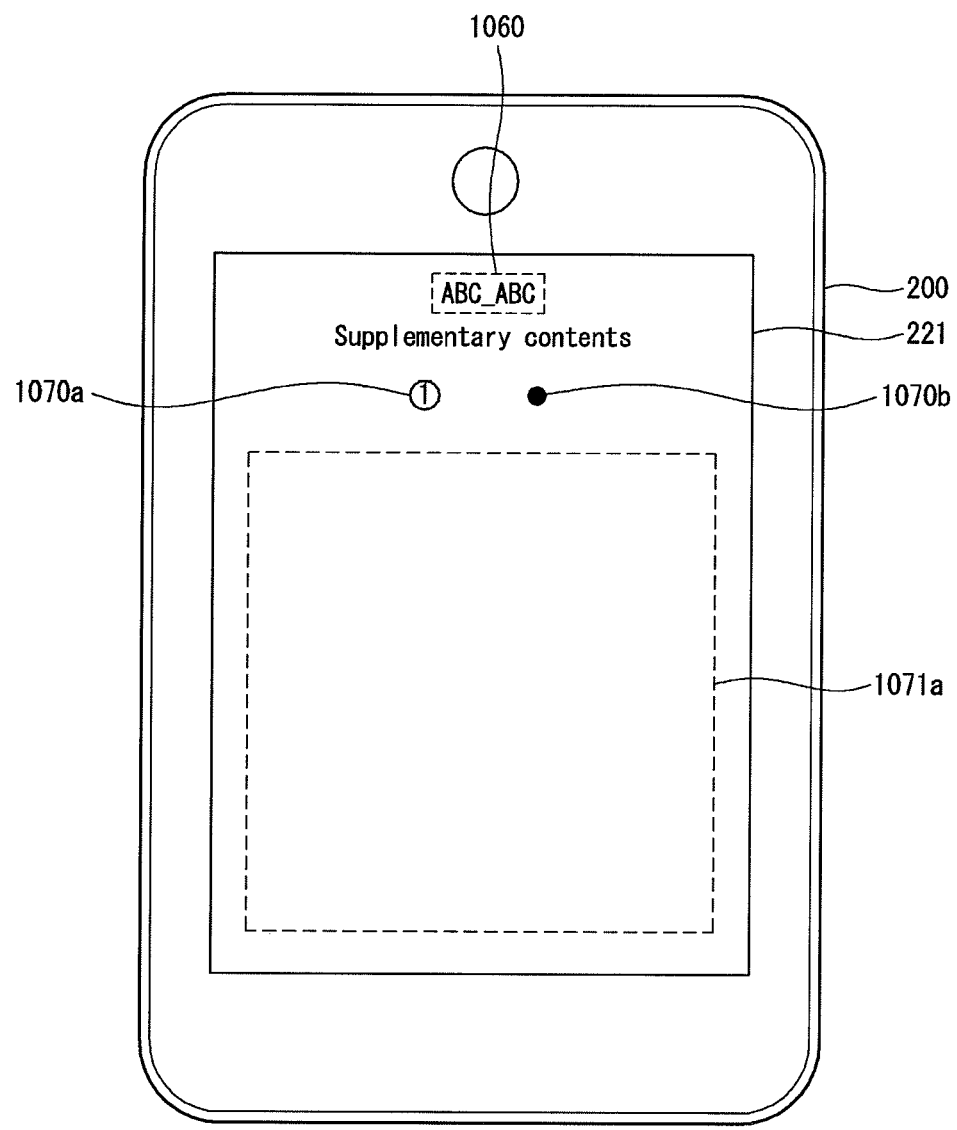

When a user selects the <View previous contents> 1062 included in the user interface 1061 as shown in FIG. 74, the second electronic device 200 can provide a screen, such as that shown in FIG. 75, to the display unit 221.

The screen of FIG. 75 shows an example of a screen for providing past supplementary contents of the multimedia contents 1060.

For example, reference numeral 1070*a* indicates a first page which provides supplementary contents corresponding to the first past supplementary information 1050*a* shown in FIG. 71. Furthermore, reference numeral 1070*b* indicates a second page which provides supplementary contents corresponding to the second past supplementary information 1050*b* shown in FIG. 71.

The first page 1070*a* and the second page 1070*b* can be switched.

In FIG. 75, the supplementary contents corresponding to the first past supplementary information 1050*a* can be provided through a first information region 1071*a* corresponding to the first page 1070*a*.

Figure 76:
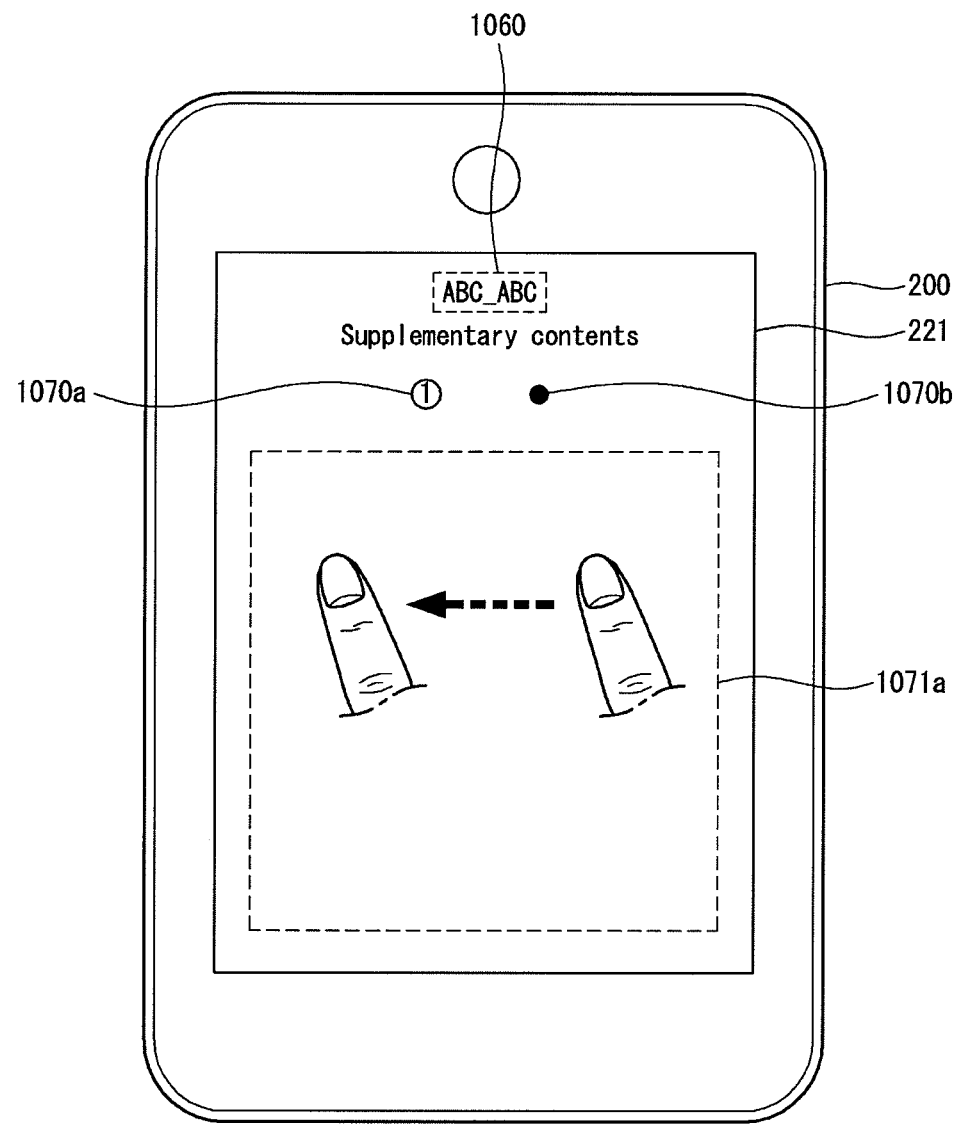
Figure 77:
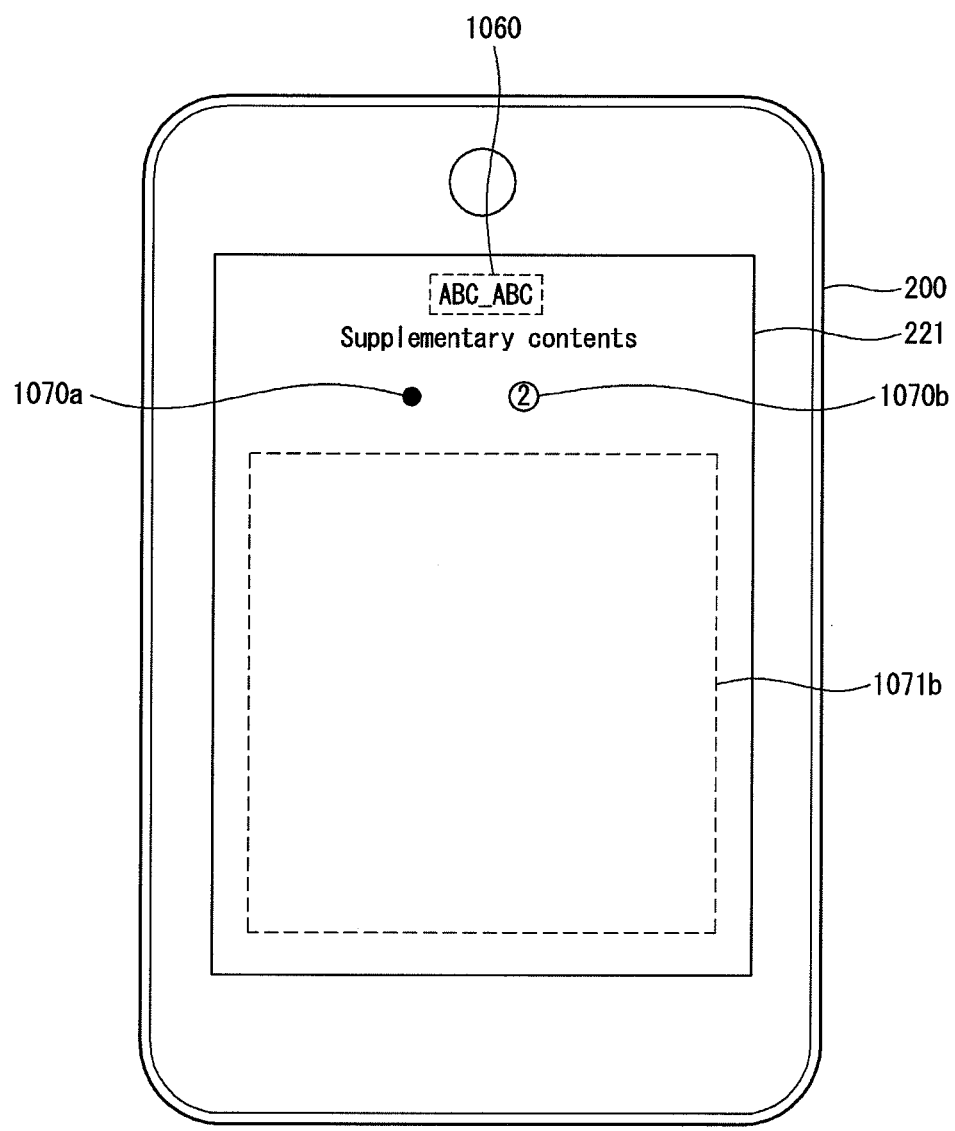

When the second page 1070*b* is selected in FIG. 75 or a user drags the screen to the left as shown in FIG. 76, the second electronic device 200 can switch the existing screen to a screen corresponding to the second page 1070*b*, as shown in FIG. 77, and provide the supplementary contents corresponding to the second past supplementary information 1050*b* through a the second information region 1071*b* corresponding to the second page 1070*b*.

Meanwhile, when the first page 1070*a* is selected in FIG. 77 or a user drags the screen to the right, the second electronic device 200 can provide the screen shown in FIG. 75 again.

Figure 78:
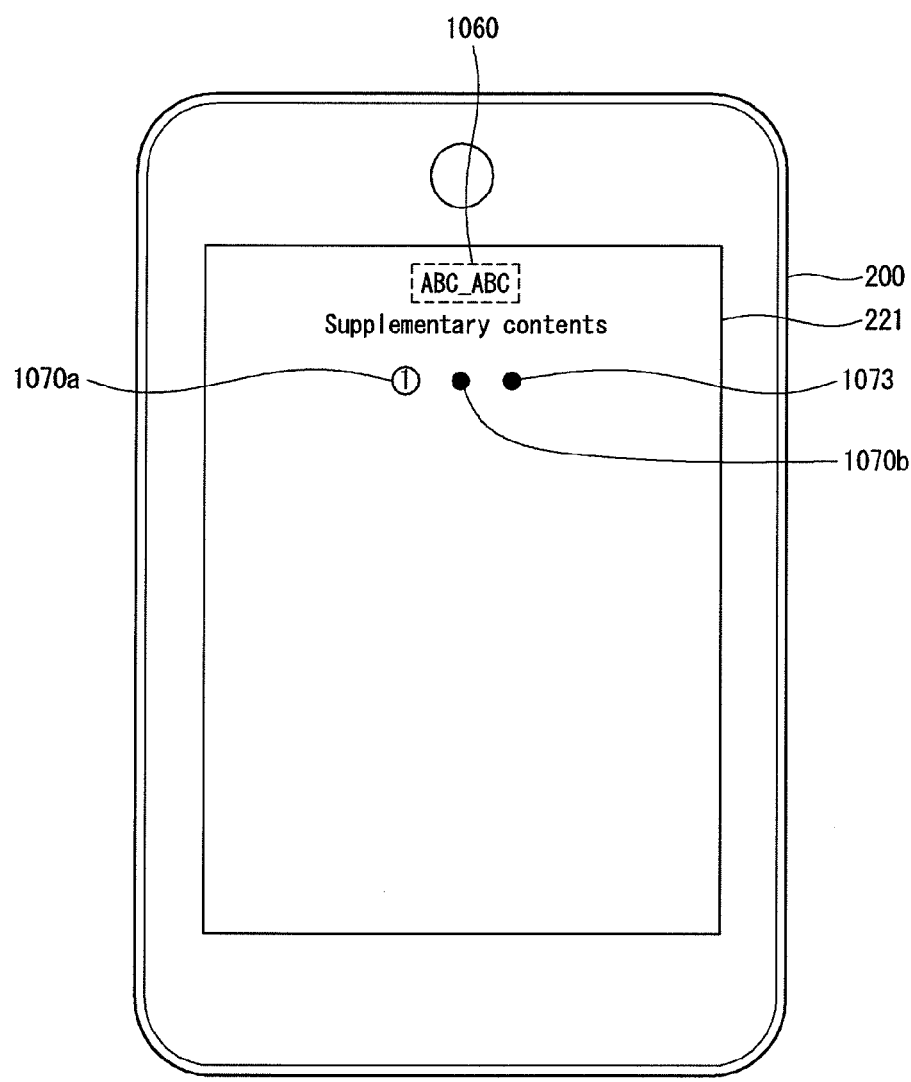

FIG. 78 shows an example in which the first future supplementary information 1051*a* is activated during the time for which the screens of FIGS. 75 to 77 are provided after the point of time T2 in FIG. 71.

Referring to FIG. 78, the second electronic device 200 can receive the first future supplementary information 1051a from the first electronic device 100 and acquire first future supplementary contents on the basis of the future supplementary information 1051a.

In FIG. 78, reference numeral 1073 indicates a third page for providing the first future supplementary contents. A user's access to the third page 1073 can be performed in the same manner as described with reference to FIGS. 75 to 77.

As describe above, in case where the number of supplementary information received from the first electronic device 100 is plural, a user interface can be provided which can access the pieces of received supplementary information or a plurality of supplementary contents respectively corresponding to the pieces of received supplementary information.

In a fifth embodiment of this document described herein, it is assumed that users include different electronic devices within the local network 401.

Figure 79:
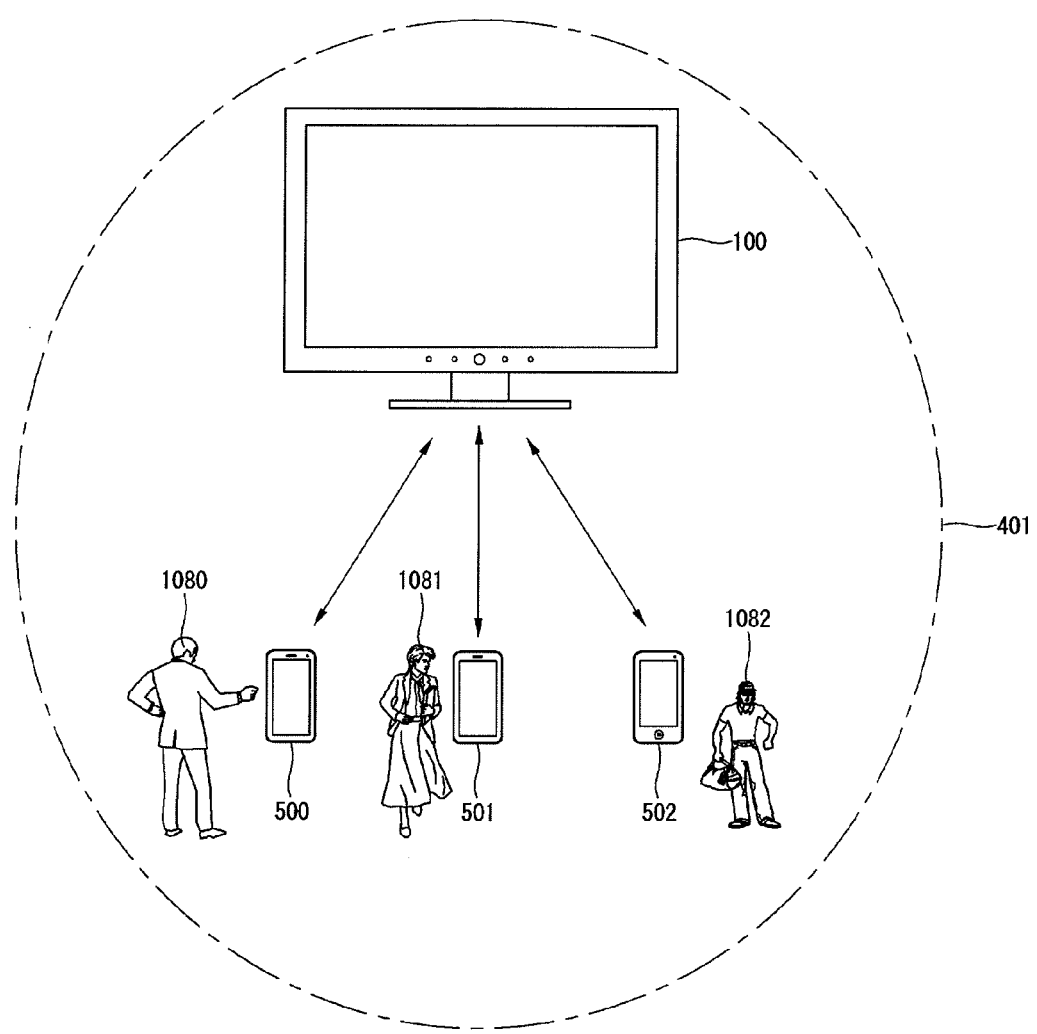
FIG. 79 illustrates an environment for a fifth embodiment of this document.

FIG. 79 illustrates an environment for the fifth embodiment of this document. The environment for the fifth embodiment of this document is described in short with reference to FIG. 79. This environment corresponds to a case in which the first electronic device 100 and a plurality of mobile terminals 500, 501, and 502 used by respective users are included within the local network 401, such as a DLNA network.

For example, it is assumed that the first mobile terminal 500 is an electronic device used by a father and the second and third mobile terminals 501 and 502 are electronic devices respectively used by a mother and a son.

Figures 80, 81:
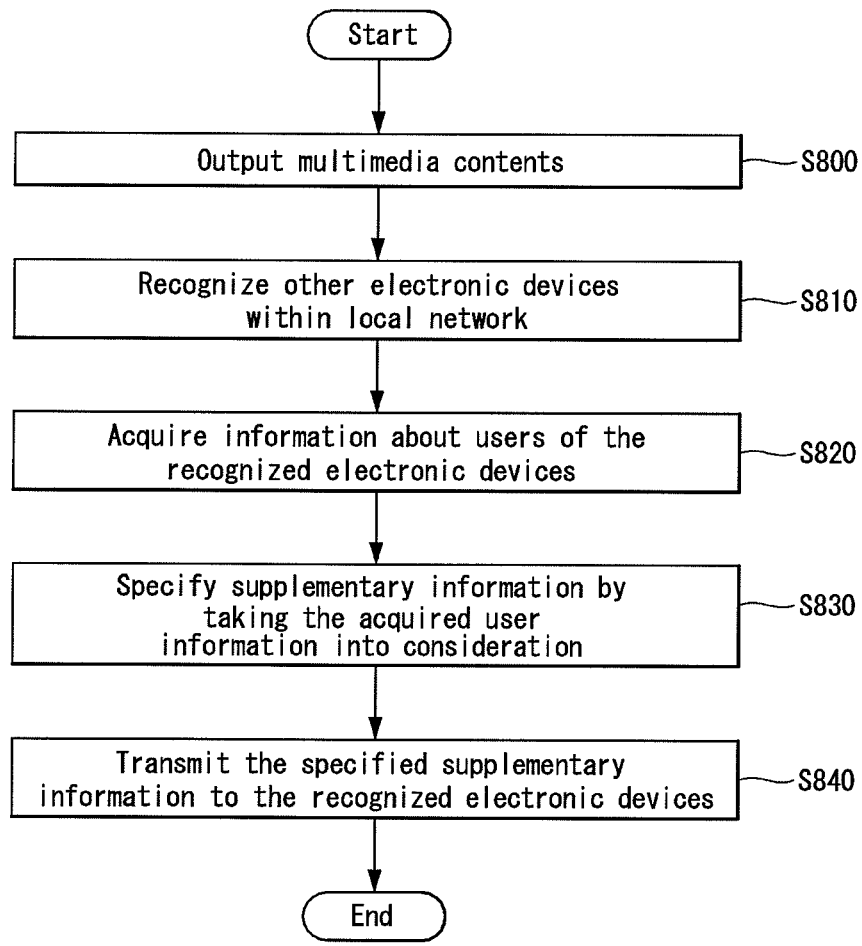
FIG. 80 is a flowchart illustrating a method of providing information according to a fifth embodiment of this document.
FIGS. 81 and 82 are diagrams illustrating a method of a mobile terminal providing information according to a fifth embodiment of this document.

FIG. 80 is a flowchart illustrating a method of providing information according to the fifth embodiment of this document. FIGS. 81 and 82 are diagrams illustrating a method of a mobile terminal providing information according to the fifth embodiment of this document.

The method of providing information according to the fifth embodiment of this document can be implemented through the system environments and various electronic devices described above with reference to FIGS. 1 to 12. The method of providing information according to the fifth embodiment of this document and the operations of the first electronic device 100 and the mobile terminals 500, 501, and 502 for implementing the method are described in detail with reference to pertinent drawings.

Embodiments in which the mobile terminals 500, 501, and 502 acquire supplementary information and provide supplementary contents on the basis of the supplementary information have been described above in various ways. The fifth embodiment of this document is described in detail from the viewpoint of the first electronic device 100 which transmits the supplementary information.

The first electronic device 100 can output multimedia contents at step S800. The first electronic device 100 can recognize other electronic devices existing within the local network 401 at step S810.

For example, referring to FIG. 79, the first electronic device 100 can recognize the existence of the mobile terminals 500, 501, and 502.

The first electronic device 100 can acquire information about a user of the recognized electronic device at step S820.

For example, the first electronic device 100 can acquire information, indicating that a user of the first mobile terminal 500 is a father, a user of the second mobile terminal 501 is a mother, and a user of the third mobile terminal 502 is a son.

In order to perform the step S820, the first electronic device 100 can have previously stored the information about the users of the first to third mobile terminals 500, 501, and 502 or can perform a process of the users registering with the local network 401.

Further, the first electronic device 100 may receive the user information from other electronic devices included in the local network 401.

The first electronic device 100 can specify different pieces of supplementary information for different electronic devices included in the local network 401 by taking the acquired user information into consideration at step S830. Furthermore, the first electronic device 100 can transmit the specified supplementary information to a corresponding electronic device at step S840.

The supplementary information specified for a specific electronic device at step S830 can be determined in various ways.

For example, when a specific electronic device is registered with the local network 401, preference contents or a preference field preferred by a user of the specific electronic device can be registered with the local network 401. When the specific electronic device enters the local network 401, the first electronic device 100 can specify supplementary information, corresponding to the registered preference contents or preference field, with respect to the specific electronic device.

For another example, the first electronic device 100 can recognize basic information about a user who uses the specific electronic device, such as a sex or age, and then specify the supplementary information on the basis of statistics based on the recognized basic information. For example, fields typically preferred by "men in their fifties" can be "news" and "historical dramas", and fields typically preferred by "women in their forties" can be "shopping", "culture", "dramas". The first electronic device 100 can specify the supplementary information on the basis of the statistics information.

FIG. 81 is a diagram showing that pieces of supplementary information which can be specified using various methods as described above are listed for the first to third mobile terminals 500, 501, and 502.

Furthermore, referring to FIG. 82, as time elapses while the multimedia contents are being played in the first electronic device 100, pieces of supplementary information 1090, 1091, 1092, and 1093 can be transmitted to the first to third mobile terminals 500, 501, and 502 within the local network 401.

Here, the first electronic device 100 does not transmit all pieces of supplementary information to a specific mobile terminal, but can transmit only supplementary information specific to a user of the specific mobile terminal, as shown in FIG. 82.

Although it is assumed that the mobile terminals 500, 501, and 502 receive only specific information complying with user information and transmit the supplementary contents on the basis of the specific information, the technical spirit of this document is not limited thereto.

For example, the mobile terminals 500, 501, and 502 can receive all pieces of supplementary information from the first electronic device 100 and then acquire or output the supplementary contents on the basis of the user information.

Meanwhile, in the above-described embodiments, the second electronic device 200 or the third electronic device 300 or both can be configured to output contents other than the supplementary contents, irrespective of the functions of providing the supplementary contents according to the technical spirit of this document.

For example, in case where the second electronic device 200 or the third electronic device 300 or both are turned on or the lock mode of the display unit included therein is released, the second electronic device 200 or the third electronic device 300 or both can be configured to provide a wallpaper (or an idle screen) or to again output contents which were being output before they are turned on or the lock mode is entered.

Here, the second electronic device 200 or the third electronic device 300 or both can output the supplementary contents instead of predetermined contents.

In other words, when an off state is changed to an on state or the lock mode of the display unit is released, the second electronic device 200 or the third electronic device 300 or both do not again output the wallpaper or the contents that were being output, but can output the supplementary contents.

Meanwhile, in the above-described embodiments, the electronic system, comprising the first electronic device 100, the second electronic device 200, and the third electronic device 300, may provide the supplementary contents on the basis of the usage history of a user.

For example, when the second electronic device 200 receives specific supplementary information from the first electronic device 100, the second electronic device 200 can acquire supplementary contents, corresponding to fields or types or both which are most preferred by a user, with reference to the search history of the user which is relevant to multimedia contents being output by the first electronic device 100 and provide the acquired supplementary contents.

The search history can be stored in the memory of at least one of the first to third electronic devices 100, 200, and 300.

In case where the second electronic device 200 does not store the search history, the second electronic device 200 can ask the first electronic device 100 or the third electronic device 300 or both to search for the search history or request the first electronic device 100 or the third electronic device 300 or both to transmit the search history.

For example, the second electronic device 200 can provide multimedia contents being played in the first electronic device 100 and e-mails relevant to the search history of the user, from among a plurality of e-mails stored in internal memory, as supplementary contents by using a method in which a method of acquiring the supplementary contents with reference to the search history of the user and a method of acquiring the supplementary contents through the above-described internal memory search are combined.

The method of the electronic device and the electronic system providing information according to this document can be recorded in a computer-readable recording medium in the form of a program to be executed in a computer and provided.

The method of the electronic device and the electronic system providing information according to this document can be executed through software. When the method is executed through software, the constituting means of this document are segments for executing necessary tasks. A program or code segments can be stored in a processor-readable medium or transmitted in the form of a computer data signal combined with carriers over a transmission medium or communication network.

A computer-readable recording medium may comprise all kinds of recording devices for storing data readable by a computer system. The computer-readable recording medium may comprise, for example, ROM, RAM, CD-ROM, DVD±ROM, magnetic tapes, floppy disks, hard disks, and optical data storages. Further, codes which are distributed into computer systems connected over a network and are readable by computers in a distributed manner may be stored and executed in the computer-readable recording medium.

In accordance with the electronic devices, the electronic systems, and the methods of providing information using the same according to this document, supplementary information or supplementary contents or both which are related to multimedia contents being output by a first electronic device can be provided by a second electronic device different from the first electronic device.

Accordingly, a user can use the first electronic device and the second electronic device for various purposes and can efficiently receive various pieces of information relevant to the multimedia contents.

Although some exemplary embodiments of this document have been described above, this document is not limited to the above embodiments. It will be apparent to those skilled in the art that this document can be modified in various ways from the above description. Accordingly, the scope of this document should not be limited to the above-described embodiments, but should be defined within the scope of the appended claims and equivalent thereof.

What is claimed is:

1. An electronic device, comprising:
a local memory;
an output unit;
a communication unit configured to wirelessly receive supplementary information from a second electronic device reproducing multimedia contents using a local area communication method, the supplementary information related to a selected item from among a plurality of items displayed in a reproduction screen of the multimedia contents displayed on a display unit of the second electronic device; and
a controller operatively connected to the output unit and the communication unit, the controller configured to
search the local memory or a remote website using the supplementary information to obtain supplementary contents related to the selected item of the multimedia contents, and
output the supplementary contents related to the selected item of the multimedia contents through the output unit based on the received supplementary information.

2. The electronic device of claim 1, wherein the controller is configured to wirelessly transmit, to the second electronic device via the communication unit, a control signal including a command to pause the reproduction of the multimedia contents by the second electronic device.

3. The electronic device of claim 1, wherein the communication unit is configured to receive the supplementary information in synchronism with the multimedia contents reproduced through the second communication device.

4. The electronic device of claim 1,
wherein the communication unit is configured to receive the supplementary information as a group and not in synchronism with the multimedia contents reproduced through the second communication device, and
wherein the supplementary information include a plurality of frame identifiers used by the controller to synchronize a time of outputting the supplementary contents through the output unit.

5. The electronic device of claim 1, wherein the supplementary information include a plurality of sub-supplementary information respectively corresponding to different reproduction times.

6. The electronic device of claim 5, wherein the controller is configured to receive all of the plurality of sub-supplementary information simultaneously from the second electronic device.

7. The electronic device of claim 5, wherein the controller is configured to sequentially receive the plurality of subsupplementary information from the second electronic device in response to the different reproduction times.

8. The electronic device of claim 5, wherein the controller is configured to output corresponding supplementary contents based on the sub-supplementary information.

9. The electronic device of claim 5, wherein when there is a time period in which the sub-supplementary information is not temporarily received from the second electronic device, the controller is configured to receive the sub-supplementary information corresponding to the time period at the same time from the second electronic device.

10. The electronic device of claim 1, wherein when the electronic device is turned on or a lock mode of a display unit included in the electronic device is released, the controller is configured to output the supplementary contents rather than contents which is preset to be output.

11. The electronic device of claim 1, wherein the controller is configured to receive the supplementary contents from the remote website through the communication unit.

12. The electronic device of claim 1,
wherein the output unit includes a touchscreen, and
wherein the controller is configured to search the remote website or the local memory in response to a user touch to an item of the supplementary information displayed on the touchscreen, and to display a corresponding search result on the touchscreen.

13. The electronic device of claim 1,
wherein the supplementary information include content category information, and
wherein the controller is configured to output an item of the supplementary infoli iation via the output unit based on a comparison of content category information of the item and a user set content output category.

14. The electronic device of claim 1,
wherein the supplementary information include output type information, and
wherein the controller is configured to output an item of the supplementary contents via the output unit based on a comparison of output type information of the item and a user set output type.

15. A method of controlling an electronic device including a local memory, an output unit, a communication unit and a controller, the method comprising:
wirelessly receiving supplementary information from a second electronic device reproducing multimedia contents using a local area communication method, the supplementary information related to a selected item from among a plurality of items displayed in a reproduction screen of the multimedia contents displayed on a display unit of the second electronic device;
obtaining supplementary contents related to the selected item of the multimedia contents based on the supplementary information by searching the local memory or a remote website using the supplementary information; and
outputting the obtained the supplementary contents related to the selected item of the multimedia contents through the output unit.

16. The method of claim 15, further comprising:
wirelessly transmitting, to the second electronic device via the communication unit, a control signal including a command to pause the reproduction of the multimedia contents by the second electronic device.

17. The method of claim 15, wherein the step of wirelessly receiving supplementary infoimation comprises:
wirelessly receiving the supplementary information in synchronism with the multimedia contents reproduced through the second electronic device.

18. A method for controlling an electronic system, the electronic system including a first electronic device and a second electronic device, the first electronic device including a first output unit, a first communication unit and a first controller, the second electronic device including a local memory, a second output unit, a second communication unit and a second controller, the method comprising:
reproducing multimedia contents via the first output unit;
selecting an item from among a plurality of items displayed in a reproduction screen of the multimedia contents displayed on first output unit;
automatically transmitting, by the first electronic device, the supplementary information via a wireless connection to the second electronic device using a local area communication method while reproducing the multimedia contents via the first output unit, wherein the supplementary information is related to the selected item of the multimedia contents;
wirelessly receiving, by the second electronic device using a local area communication method, the supplementary information related to the selected item;
obtaining supplementary contents related to the selected item of the multimedia contents based on the supplementary information by searching the local memory or a remote website using the supplementary information; and
outputting the obtained supplementary contents related to the selected item through the second output unit.

19. The method of claim 18, further comprising:
wirelessly transmitting, to the first electronic device from the second electronic device, a first control signal including a command to pause the reproduction of the multimedia contents by the first electronic device.

* * * * *